US008087983B2

(12) United States Patent
Longway

(10) Patent No.: US 8,087,983 B2

(45) Date of Patent: Jan. 3, 2012

(54) APPARATUS AND METHODOLOGY FOR ELECTRONIC TABLE GAME SYSTEM

(76) Inventor: Douglas Ronald Longway, Reno, NV (US)

(*) Notice: Subject to any disclaimer, the term of this patent is extended or adjusted under 35 U.S.C. 154(b) by 518 days.

(21) Appl. No.: 12/251,411

(22) Filed: Oct. 14, 2008

(65) Prior Publication Data

US 2009/0098932 A1 Apr. 16, 2009

Related U.S. Application Data

(60) Provisional application No. 60/979,807, filed on Oct. 13, 2007.

(51) Int. Cl.
*G06F 17/00* (2006.01)

(52) U.S. Cl. .......................................................... 463/7

(58) Field of Classification Search ................ 463/9–13, 463/16–25; 273/148 A, 148 R, 149 R, 149 P, 273/309

See application file for complete search history.

(56) References Cited

U.S. PATENT DOCUMENTS

| | | | |
|---|---|---|---|
| 4,837,728 | A | 6/1989 | Barrie et al. |
| 5,249,800 | A | 10/1993 | Hilgendorf |
| 5,472,194 | A | 12/1995 | Breeding et al. |
| 5,594,471 | A | 1/1997 | Degran et al. |
| 5,623,280 | A | 4/1997 | Akins |
| 5,655,961 | A | 8/1997 | Acres et al. |
| D383,171 | S | 9/1997 | Hanscom |
| 5,702,304 | A | 12/1997 | Acres et al. |
| 5,741,183 | A | 4/1998 | Acres et al. |
| 5,752,882 | A | 5/1998 | Acres et al. |
| 5,766,076 | A | 6/1998 | Pease et al. |
| 5,796,389 | A | 8/1998 | Bertram et al. |
| 5,820,459 | A | 10/1998 | Acres et al. |
| 5,836,817 | A | 11/1998 | Acres et al. |
| 5,855,515 | A | 1/1999 | Pease et al. |
| 5,885,158 | A | 3/1999 | Torango et al. |
| 5,951,397 | A | 9/1999 | Dickinson |
| 6,135,884 | A | 10/2000 | Hedrick et al. |
| 6,210,279 | B1 | 4/2001 | Dickinson |
| 6,232,846 | B1 | 5/2001 | Hirano et al. |
| 6,257,981 | B1 | 7/2001 | Acres et al. |
| 6,315,666 | B1 | 11/2001 | Mastera et al. |
| 6,368,216 | B1 | 4/2002 | Hendricks et al. |
| 6,454,649 | B1 | 9/2002 | Mattice et al. |
| RE37,885 | E | 10/2002 | Acres et al. |
| 6,476,798 | B1 | 11/2002 | Bertram |
| 6,498,590 | B1 | 12/2002 | Dietz et al. |
| 6,599,193 | B2 | 7/2003 | Baerlocher et al. |
| 6,656,052 | B2 | 12/2003 | Abramopoulos et al. |
| 6,712,698 | B2 | 3/2004 | Paulsen |
| 6,734,843 | B2 | 5/2004 | Bertram |
| 6,776,715 | B2 | 8/2004 | Price |

(Continued)

*Primary Examiner* — Ronald Laneau

(74) *Attorney, Agent, or Firm* — John D. Long

(57) ABSTRACT

One possible embodiment of the invention could be an electronic table game system, and a process for operating the system, generally comprising of an electronic gaming table whose playing surface supports one or more gaming elements of a table game generally played in a gaming establishment; with one or more dealer's electronic interfaces proximate to the playing surface to generally allow input of data substantially regarding gaming action of the table game; with one or more the player's electronic interfaces proximate to the playing surface to generally input data substantially regarding information on one or more wagers placed on the table game; and a computer system connected to the electronic interfaces to substantially process the inputted data to generally identify a winner of the table game. The system could further provide two or more electronic table games with a progressive bonus jackpot with or without a cap.

27 Claims, 27 Drawing Sheets

U.S. PATENT DOCUMENTS

| | | | | |
|---|---|---|---|---|
| 6,832,958 | B2 | 12/2004 | Acres et al. | |
| 6,852,031 | B1 | 2/2005 | Rowe | |
| 6,888,536 | B2 | 5/2005 | Westerman et al. | |
| RE38,812 | E | 10/2005 | Acres et al. | |
| 6,968,511 | B1 | 11/2005 | Robertson et al. | |
| 7,023,427 | B2 | 4/2006 | Kraus et al. | |
| 7,053,887 | B2 | 5/2006 | Kraus et al. | |
| 7,198,571 | B2 | 4/2007 | Lemay | |
| 7,219,302 | B1 | 5/2007 | O'Shaughnessy et al. | |
| 7,221,357 | B2 | 5/2007 | Von Essen et al. | |
| 7,249,327 | B2 | 7/2007 | Nelson et al. | |
| 2006/0293099 | A1 | 12/2006 | Cooper | |
| 2007/0060318 | A1 * | 3/2007 | O'Halloran et al. | 463/26 |
| 2008/0261682 | A1 * | 10/2008 | Phillips et al. | 463/25 |
| 2009/0017888 | A1 * | 1/2009 | Kuhn et al. | 463/13 |
| 2009/0082079 | A1 * | 3/2009 | Kuhn et al. | 463/13 |
| 2009/0253503 | A1 * | 10/2009 | Krise et al. | 463/31 |
| 2010/0004051 | A1 * | 1/2010 | Walker et al. | 463/22 |

* cited by examiner

APPARATUS AND METHODOLOGY FOR ELECTRONIC TABLE GAME SYSTEM

CROSS-REFERENCES TO RELATED APPLICATIONS

This application claims the benefit under 35 U.S.C. §119 (e) of U.S. Provisional Patent Application No. 60/979807, filed on Oct. 13, 2007, contents of which are relied upon and incorporated by reference.

STATEMENT REGARDING FEDERALLY SPONSORED

Research or Development

Not Applicable.

REFERENCE TO A "MICROFICHE APPENDIX"

Not Applicable.

FIELD OF THE INVENTION

The present invention generally relates to an electronic table game system that may have one or more dealer's electronic interfaces connected to a computer system 38 that could allow the input and processing of table game play and wagering by one or more dealers. More specifically, an electronic table gaming system that generally provides table game play with a single/multi-tier progressive bonus jackpot, which optionally could further feature a predetermined maximum payout amount or "cap".

BACKGROUND

For most of history, many gaming establishments have provided a category of gaming that utilized some form of a gaming table. This category of games, known as table games, could employ one or more dealers and include one or more game elements (e.g., playing cards, dice, balls, and the like) employed upon a playing surface of a gaming table. This category could include card games (e.g., blackjack, pai gow, poker, baccarat, and the like) and non-card games (e.g., roulette, craps, and the like). This category of games, unlike the gaming of electronic gaming machines (EGMs) (e.g., slot machines, fully automated dealer-less electronic table games and the like) and the like, provided players with the warm touch of human interaction encapsulated within the bonds of gaming camaraderie, in which intelligent players gathered socially to match wits against other worthy opponents (e.g., players) as well as the dealer.

Despite the wonderful human bonding experience of table-based games, the cold, hand-pulling world of electronic gaming machines (e.g., slot machines) is beginning to seriously displace table-based games (e.g., craps, roulette, and card games such as blackjack, pai gow, poker, and baccarat) in many gaming establishments. One reason for this displacement could be that electronic gaming machines (and the like), through their now electronic operating systems, can be coupled into a unifying computer-based system, which can offer either single or a multi-tier progressive bonus jackpot features that are very popular with the players. These single/multi-tier progressive bonus jackpot games can collect small percentages of the players' bets (or wagers) from numerous slot machines located over a wide area of locations and diverts them into a "larger payout pool" or jackpot, which may accumulate quite quickly. This "larger payout pool" or jackpot is won when a player bets the required maximum bet amount and the wheels of the slot machine land on a predetermined winning criterion on the machine. These single/multi-tier progressive jackpots can offer to the individual players of a networked electronic gaming machine (and the like) a chance of winning a much greater payout than could be practical through an isolated electronic gaming machine (and the like).

For example, a progressive jackpot for electronic gaming machines (and the like), known as "MEGABUCKS®", enables players to win in excess of seven million dollars; however, players are only eligible for this large jackpot if they wager the maximum bet. If the players wager less than the maximum bet and the winning MEGABUCKS® symbols appear on the pay line, he or she wins a much smaller jackpot.

Large payoff single/multi-tier bonuses (e.g., MEGABUCKS® or POWERBALL®) are accumulated progressively, and it usually takes a considerable length of time (such as weeks or even months) for a player to win the large MEGABUCKS® award. This is generally because the mathematical odds of winning the MEGABUCKS® award are in excess of thirty million to one (30,000,000:1). In contrast, other progressive electronic gaming machines (and the like) (e.g., WHEEL OF FORTUNE®, TOTEM POLE®, and video draw poker) offer what are known as "instant bonus payouts" where a player can win after each spin of the reels; however, the bonus amounts are usually quite small. Table gaming on the other hand, has traditionally been unable to be electronically networked together because table gaming has generally relied upon human interaction for providing one or more actions of the game, which may determine the outcome of the play (e.g., a dealer rolling a ball on a roulette wheel, a dealer dealing out cards, a player rolling dice in the game of craps, and the like) generally making it hard to convert or report such actions or corresponding results into an electronic data format that can be readily electronically processed/analyzed/stored/and/or retrieved. An electronic gaming machine (and the like) on the other hand, having game play generated within an electronic environment generally uses electronic means to report play outcome and can thus readily have the play outcome and the like presented in an electronic data format for electronic processing/analyzing/storing and/or retrieving. Because of the limitations that may be found in many current technologies in trying to passively convert the game action and wagering of a table game into an electronic data format that can be handled by an computer system 38, it has been difficult to provide table games with the exciting and game-enhancing benefits that a computer system 38 can provide, such as single/multi-tier progressive bonus jackpot features, smart card technologies, player-loyalty reward systems, player tracking systems, game play wager tracking, and the like.

Although table games have, in the past, had the limited ability to put forth (and receive) electronic data relating to their action and wagering (e.g., like the capability of electronic gaming machines [and the like] and their associated electronic system), gaming establishments have not been able to make use of this already-collected data to its fullest extent or much less expand on the types of data mined (as they do with electronic gaming machines and the like). If data mining capacity, and the data mining expansion capability could be associated with information obtained through the invention, then there could be the creation of one or more databases for table game play and wagering (along with its associated inner-gaming establishment commerce possibilities). This data mining could become a very powerful and important tool in the gaming industry because it could allow a gaming establishment to obtain much needed player and game information to properly suit or alter the table gaming environment, action, wagering, and the like to generally provide a tremendous increase in the gaming enjoyment of its table-game-playing patrons. Furthermore, such an expanded dataset and data collection capability may be altered and applied beyond the gaming table arena (e.g., gaming table data and gaming table analysis models and methodologies could be applied to electronic gaming machines and/or other gaming devices within any gaming establishment). This data mining may include recording and processing immediate and historical game play (e.g., how often certain card combinations occur; player strategies, how fast a dealer is "running" a table [e.g., "game turnover"]; the overall performance of the various types of gaming tables (e.g., average bet by player, table, pit, game etc); headcount data (e.g., players playing per hour, day, month, year, etc); wagering (e.g., how profitable the game is to the gaming establishment; what types of game wagers are most popular with players (e.g., in craps, many players may like to place field bets rather than bets on the "don't pass" area, so gaming establishment operators might use this information to invoke special incentives in order to encourage players to bet on other table options offered by the table [rather than field bets]); determination of the individual player's wagering habits (e.g., betting and/or strategy data and the like) and/or player preferences/dislikes (e.g., building a player profile to best serve that player, etc.); and the like.

Such database building could provide the gaming establishment with the ability to tremendously increase the players' enjoyment of gaming tables (and thereby gaming establishment operators' profits), even more so than could generally be accomplished with electronic gaming machines (and the like). Wherein electronic gaming machines (and the like) are generally seen as a solitary relation (e.g., one player to one electronic gaming machines [and the like]), gaming tables can accommodate several players at once thereby providing a gaming environment whereby human psychology of group dynamics may occur (e.g., a "fire" or "hot action" craps table often draws in more players, something which an electronic gaming machine [and the like], with its one-to-one dynamic, generally does not). If a gaming table could be provided with electronic data capacity and networking capability similar to that of an electronic gaming machine (and the like) system, then theoretically, the gaming establishment could possibly better manage the gaming environment of a group of players through one electronic gaming table machine both on collective and on individual levels. For example, if a craps table could have the electronic data capacity and networking capability similar to that of an electronic gaming machine (and the like) system, then gaming establishments could possibly detect a hot action craps table and then possibly electronically alter the payback odds (in accordance with applicable regulatory and jurisdictional laws and regulations) (e.g., lowering the payback odds from 40 to 1 to 7 to 1) for or against the house to possibly control or guide the "fire" to maximize its effect on increasing player gaming enjoyment.

Additionally, if gaming tables could be electronically interfaced or otherwise linked to a central server, the gaming establishment could place a whole host of services, comps, gratuities, and the like at the fingertips of gaming table players (as is possible with electronic gaming machines). These enticements could enhance immediate gaming pleasure as well as provide incentives for the player to share information with the gaming establishment (to help the gaming establishment improve their services and/or further bolster their data processing/analyzing/storing and/or retrieving activities) and to improve the player's long term gaming experience at the gaming establishment as well.

However, in the past, when gaming innovators have attempted to incorporate various types of electronic features and/or interfaces, these electronic features and/or interfaces acted more as an interference force—seriously disrupting the flow of play and substantially leading to serious diminishment of the players' gaming enjoyment thereby resulting in decreased player participation as well as gaming establishments' profitability.

As electronic gaming machines (and the like) continue to cut into areas of table-based gaming, gaming establishments could see a continued resulting economic loss of those revenues traditionally bought in by those players who value games that require skill (e.g., card games, craps, and roulette) or those players who value the human social interaction that may be provided by traditional table gaming.

In an attempt to aid gaming establishments in their efforts to reduce the costs of operating gaming tables, gaming manufactures have been steadily employing the use of electronic means while simultaneously reducing the importance and even the presence of human interaction (which is generally provided in gaming table action). Generally speaking, the current trend for multiplayer gaming (e.g., gaming tables) technology is to try for full automation and control of gaming tables to the point where the use of an actual human dealer is eliminated. These attempts try to use various electronic technologies to translate physical human activities of the game play into electronic data that can be processed/analyzed/stored and/or retrieved by a computer system 38. Some of these systems also attempt to use one or more different variations of a game element reader (e.g., the Shufflemaster® iShoe™, and the like) and player recognition technology in their products.

Current electronic table gaming technology, even while employing the most current, up-to-date, state-of-the-art, high-tech game element readers 36 (e.g., the Shufflemaster® iShoe™, Microsoft® Surface™ or other surface computing platforms, and the like) and player recognition technologies, is still in the developmental stage. These technologies generally lack the capabilities needed to consistently and correctly determine which player or dealer has received what cards (or other game elements). This general inability may be seen as a potentially severe limitation to successful deployment and use of such computer system 38*s* with gaming table play and wagering. Present efforts appear to try to primarily rely on technology alone to solve the problems associated with gaming table automation. It appears that full automation of gaming tables may not yet be successful without some deployment of sound human judgment, facilitation, and management within the gaming table play and wagering.

Another aspect of gaming tables is the utilization of gaming chips for wagering activities. The gaming industry has invested enormous resources toward the process of evolving yesteryears' lowly gaming establishment chip into today's technological betting marvel. Chips of the past were manufactured from everything from clay composite to plastic to acrylic composite. Today's chips employ everything from invisible ultraviolet bar codes, computer chips, radio frequency identification chips (RFID), and the like. Additionally, all gaming establishments utilize sophisticated in-house logistic, accounting, and security measures composed of (but not limited to) pit personnel, accountants, and security agents for the transfer, accounting, and tracking of these gaming chips. This all in contrast to the accounting systems of many electronic gaming machines (and the like) that can electronically process and reconcile all associated electronic gaming machine (and the like) wagering.

Another limitation in not having gaming tables being electronically linked to a gaming establishment's system can be seen when a player, in order to access his or her electronic account within the gaming establishment, must physically hand over to a dealer or other employees of the gaming establishment their electronic player's club card, smart card, and the like. The gaming establishment employee then has to take the card (generally to another location in the gaming area having an electronic card interface [e.g., a player's monetary device] to the computer system 38) to properly access the player's account within the gaming establishment and, if needed, to provide an accreditation to the account for the player's gaming action at the gaming table. Additionally, a player must also discontinue their gaming action at a gaming table (which equates to lost revenue for the gaming establishment) and go to other parts of the gaming establishment whenever the player wishes to engage in non-gaming related establishment services such as: restaurant reservations, room reservations, venue reservations (show, sporting, special events, etc.), cashing out, ordering drinks, recalling their valet-parked vehicle, and the like.

What is needed therefore is generally a system and methodology for an electronic gaming system, wherein the system utilizes a human dealer to observe game table play and/or wagering and to actively transmit one or more of such observations or actions of the dealer to computer system 38 through one or more dealer's electronic interfaces (e.g., touch screen, touch-sensitive screen, etc.) thus generally allowing the computer system 38 to process the game play generally in real time. The system may further provide one or more electronic interfaces for a respective player of the gaming table for the identification of the player to the system; the placement of wagers (thereby eliminating physical gaming establishment betting chips) by the player at the gaming table; and the processing of player requests for non-gaming associated services (e.g., ordering a drink, buying tickets to a show, etc) and the like. The invention, in providing one or more of these elements, may allow one or more such electronic gaming tables to be electronically connected or otherwise networked to a computer system 38 and the coupling of gaming tables with electronic system-based features such as a single/multi-tier progressive bonus jackpot and the like. The invention may further provide for a table game associated single/multi-tier progressive bonus jackpot further featuring a predetermined maximum payout amount or "cap" which may generate greater game play interest and excitement.

SUMMARY OF ONE EMBODIMENT OF THE INVENTION

Advantages of One or More Embodiments of the Present Invention

The various embodiments of the present invention may, but do not necessarily, achieve one or more of the following advantages:

- to provide one or more electronic interfaces designed for a human dealer that will allow him or her to actively enter data in real time without interrupting or slowing down the flow of a gaming table's play;
- the ability to automatically fund, through a computer system 38 and without the need of an additional bet (e.g., side bet) from the players, a single/multi-tier progressive bonus jackpot for an electronic gaming table;
- the ability to process/analyze/store and/or retrieve data associated with a single/multi-tier progressive bonus jackpot on any one or more electronic gaming tables and a computer system 38 without interrupting or slowing the flow of game play activities or such actions associated with a gaming table;
- to provide gaming tables with many of the same gaming benefits associated with electronic-based gaming and electronic gaming machines and the like (e.g., a single/multi-tier progressive bonus jackpot with or without a predetermined cap and the like);
- the ability to add on a predetermined cap to a single/multi-tier progressive bonus jackpot feature(s) associated with an electronic gaming table and/or any one or more electronic table gaming systems without the need of an additional bet (e.g., side bet);
- the ability to process/analyze/store and or retrieve data associated with a predetermined cap on any single/multi-tier progressive bonus jackpot associated with any one or more electronic gaming table and/or on any electronic table gaming system without interrupting or slowing the flow of game play activities or such actions associated with a gaming table;
- to provide one or more electronic interfaces designed for a player that will allow the player to actively enter data in real time (e.g., a bet amount, game play choices, cashing out, non-gaming activities, and the like) related to his or her choices on any electronic gaming table (networked or not) without interrupting or slowing the flow of game play activities or such actions associated with a gaming table;
- the ability to create inter-gaming establishment commerce on any one of the electronic gaming tables;
- to provide a player one or more electronic interfaces through which players may be further encouraged to participate in non-gaming activities;
- the ability to allow players to purchase real time services while playing a table game without having to leave the table game; provide the player additional time to participate in further gaming action while still being able to obtain non-gaming services;
- to provide to a table game player one or more player's monetary devices 34 that may speed up the process of converting cash into an electronic format known as "game play credits";
- to provide table game players the ability to utilize their player's club card or smart card in the same manner as they currently do at an electronic gaming machine;
- to provide a table game player with self-service capability such as, at will printing of print coupons, comps, tip tickets, valet tickets, cash out capabilities, transfer of funds and the like;
- the ability to employ one or more game element readers 36 (e.g., the Shufflemaster® iShoe™, Microsoft® Surface™ or other surface computing platforms, and the like) into a table gaming system and transmitting the playing data that is collected by one or more of these game element readers 36 to and from a computer system 38 where it can then be processed/analyzed/stored and/or retrieved;
- the ability to gather and process data from elements of the table game that could be networked into the computer system 38;
- the ability to upload, download, and/or transfer table game data to one or more central processing servers for the purpose of, but not limited to, data processing/analyzing/storing and/or retrieval;
- the ability to enhance table games with a player tracking system having extensive data mining capability that processes and analyzes vast amounts of electronic data relating to players' gaming and non-gaming actions and/or activities from an electronic gaming table and other gaming establishment activities;

the ability to include table gaming within a gaming establishment with the ability to; collect, process and analyze data about a player, gaming and wagering data needed to properly suit or alter the gaming establishment's environment;

the ability to automatically and electronically provide gaming table players with reserve entitlements normally provided to electronic gaming machine players;

to provide the gaming establishment with the means to increase customer loyalty by offering table game players the chance to win the single/multi-tier progressive bonus jackpot (with or without a predetermined cap) in return for participating in the gaming establishment's players club card program;

the ability to maintain the integrity of the gaming tables by sustaining the need for real playing cards, a live dealer, and the human interaction which is needed for that Vegas-style experience while providing for electronic recording, processing, and analysis of table game play and wagering;

the ability to make any gaming table much more profitable and efficient by continuing to allow the live human dealer to control the speed of a hand or the speed of a round of betting (e.g., roll of the dice, a ball on a roulette wheel [something that an electronic gaming device is currently unable to accomplish on a periodical basis]);

the ability to bring an electronic monetary converting methodologies (e.g., converting cash to electronic game play credits and the like) to each table game player; allowing the game to proceed naturally without interruption (e.g., to change a player's cash into electronic game play credits); and the ability to eliminate the costs of providing, maintaining, transferring, guarding, counting, and tracking gaming establishment chips used in table games.

These and other advantages may be realized by reference to the remaining portions of the specification.

These and other advantages may be realized by reference to the remaining portions of the specification, claims, and abstract.

BRIEF DESCRIPTION OF ONE EMBODIMENT OF THE PRESENT INVENTION

One possible embodiment of the invention could be an electronic table game system generally comprising of one or more electronic gaming tables, each gaming table having a playing surface that supports one or more game elements of a table game; one or more dealer's electronic interfaces, the dealer's electronic interface being proximate to the playing surface and allowing one or more dealers to input data, the data containing information on one or more actions of game play for a table game being played upon the playing surface; one or more player's electronic interfaces, the player's electronic interface being proximate to the playing surface and allowing one more players to input data, the data containing information on one or more wagers on the table game being played upon the playing surface; and a computer system 38 connected to the dealer's electronic interface and the player's electronic interface to process the inputted data to indentify a winner of the table game.

One possible embodiment of the invention could be a method of operating an electronic table game system comprising of the steps, but not necessarily limited to the order shown, providing one or more electronic gaming tables, each gaming table having a playing surface for supporting game elements for the play of a table game with one or more player's electronic interfaces and one or more dealer's electronic interfaces, the interfaces being proximate to the playing surface, the electronic interfaces being further connected to a computer system 38; transmitting through the dealer's electronic interface by a human to the computer system 38 data concerning one or more actions of game play for the table game; transmitting through the player's electronic interface to the computer system 38 data concerning one or more wagers placed by the player in the table game; and processing the inputted data to indentify any winning player for the table game.

One possible embodiment of the invention could be a method of operating an electronic table game system comprising of the steps, but not necessarily limited to the order shown, providing one or more electronic gaming tables, each gaming table having a playing surface for supporting game elements for the play of a table game with one or more player's electronic interfaces and one or more dealer's electronic interfaces, the interfaces being proximate to the playing surface, the electronic interfaces being further connected to a computer system 38, humans inputting data through the dealer's and player's electronic interfaces; transmitting through the dealer's electronic interface to the computer system 38 data concerning one or more actions of game play for the table game; transmitting through the player's electronic dealer's electronic interfaces, the interfaces being proximate to the playing surface, the electronic interfaces being further connected to a computer system 38; transmitting through the dealer's electronic interface to the computer system 38 data concerning one or more actions of game play for the table game; transmitting through the player's electronic interface to the computer system 38 data concerning one or more wagers placed by the player in the table game; funding a single/multi-tier progressive bonus jackpot payout account from wagering activities at the table game; processing the inputted data to indentify any winning player for the table game; and processing the inputted data to further indentify any winning player for the table game as being a winner of the single/multi-tier progressive bonus jackpot.

One possible embodiment of the invention could be a method of operating an electronic table game system comprising of the steps, but not necessarily limited to the order shown, providing two or more electronic gaming tables, each electronic gaming table having a playing surface for supporting game elements for the play of a table game with one or more player's electronic interfaces and one or more dealer's electronic interfaces, the interfaces being proximate to the playing surface, the electronic interfaces being further connected to a computer system 38; transmitting through the dealer's interface to the computer system 38 data concerning one or more actions of game play for the table game; transmitting through the player's electronic interface to the computer system 38 data concerning one or more wagers placed by the player in the table game; funding a single/multi-tier progressive bonus jackpot payout account until the single/multi-tier progressive bonus jackpot payout account reaches a cap; funding a surplus account after the single/multi-tier progressive bonus jackpot account after the payout account reaches the cap, processing the inputted data to indentify any winning player for the table game; and processing the inputted data to indentify any winning player for the table game as being a winner of the single/multi-tier progressive bonus jackpot.

One possible embodiment of the method of operating an electronic game system comprising of the steps, but not necessarily limited to the order shown, providing two or more electronic gaming machines, with each gaming machine having one or more player's electronic interfaces, the electronic interfaces being further connected to a computer system 38 that creates the game play for the gaming being conducted on the machine, the game play occurring without the interaction of a human dealer; transmitting through the player's electronic interface to the computer system 38 data concerning one or more wagers placed by a player at the electronic gaming machine; funding a single/multi-tier progressive bonus jackpot payout account until the amount of a single/multi-tier progressive bonus jackpot payout account reaches a cap; funding a surplus account after the single/multi-tier progressive bonus jackpot account reaches the cap, indentifying any winning player for the table game; and indentifying any winning player for the table game as being a winner of the single/multi-tier progressive bonus jackpot.

One possible embodiment of the present invention could be at least one or more dealer's electronic interfaces allowing the dealer to input data (e.g., where the cards are being dealt, game play results, facilitate wagering periods [start/stop], and the like) regarding any aspect of game play; one or more player's electronic interfaces allowing the player to input numerous types of data (e.g. game play wagering data, inner gaming establishment commerce data, and the like); one or more game element readers 36 (e.g., the Shufflemaster® iShoe™, Microsoft® Surface or other surface computing platforms, and the like) for the purpose of reading, identifying (e.g. recognizing a card's, face value and suit, the pips of a die [or dice], the location of an element of a gaming table that is specific to a game [e.g., the location of a ball landing on a specific location on a wheel], and the like) and transferring data to/from the electronic gaming table to/from one or more electronic table gaming systems; one or more players' monetary devices (e.g., to assist the player in the process of converting cash into an electronic format known as "game play credits;" to provide players the ability to utilize their player's club card or smart card; to aid the player in self-service activities [e.g., print coupons, comps, tip tickets, valet tickets, cash out (e.g., ticket-in/ticket-out ticket or smart card), and/or transfer funds to other smart cards, etc. at will]); an electronic gaming table comprised of a playing surface to support one or more playing elements (e.g., dice, cards, and the like) of a gaming table; and a system having data processing/analyzing/storing and/or retrieving capability.

One possible embodiment of the present invention could be at least one or more dealer's electronic interfaces allowing the dealer to input data (e.g., where the cards are being dealt, game play results, facilitate wagering periods [start/stop], and the like) regarding any aspect of game play; one or more player's electronic interfaces allowing the player to input numerous types of data (e.g. game play wagering data, inner gaming establishment commerce data, and the like); one or more game element readers 36 (e.g., the Shufflemaster® iShoe™, Microsoft® Surface™ or other surface computing platforms, and the like) for the purpose of reading, identifying (e.g. recognizing a card's, face value and suit, the pips of a die [or dice], the location of an element of a gaming table that is specific to a game [e.g., the location of a ball landing on a specific location on a wheel], and the like) and transferring data to/from the electronic gaming table to/from one or more electronic table gaming systems; one or more players' monetary devices (e.g., to assist the player in the process of converting cash into an electronic format known as "game play credits;" to provide players the ability to utilize their player's club card or smart card; to aid the player in self-service activities [e.g., print coupons, comps, tip tickets, valet tickets, cash out (e.g., ticket-in/ticket-out ticket or smart card), and/or transfer funds to other smart cards, etc. at will]); an electronic gaming table comprised of a playing surface to support one or more playing elements (e.g., dice, cards, and the like) of a gaming table; and a system having data processing/analyzing/storing and/or retrieving capability (continuously and in real-time). In this embodiment, a gaming table or tables utilizing this invention in one or more gaming establishments could be networked (either within the same gaming establishment or across many different locations) for the purpose of data processing/analyzing/storing and/or retrieving capability.

One possible embodiment of the present invention could be at least one or more dealer's electronic interfaces allowing the dealer to input data (e.g., where the cards are being dealt, game play results, facilitate wagering periods [start/stop], and the like) regarding any aspect of game play; one or more player's electronic interfaces allowing the player to input numerous types of data (e.g. game play wagering data, inner gaming establishment commerce data, and the like); one or more game element readers 36 (e.g., the Shufflemaster® iShoe™, Microsoft® Surface™ or other surface computing platforms, and the like) for the purpose of reading, identifying (e.g. recognizing a card's, face value and suit, the pips of a die [or dice], the location of an element of a gaming table that is specific to a game [e.g., the location of a ball landing on a specific location on a wheel], and the like) and transferring data to/from the electronic gaming table to/from one or more electronic table gaming systems; one or more players' monetary devices (e.g., to assist the player in the process of converting cash into an electronic format known as "game play credits;" to provide players the ability to utilize their player's club card or smart card; to aid the player in self-service activities [e.g., print coupons, comps, tip tickets, valet tickets, cash out (e.g., ticket-in/ticket-out ticket or smart card), and/or transfer funds to other smart cards, etc. at will]); an electronic gaming table comprised of a playing surface to support one or more playing elements (e.g., dice, cards, and the like) of a gaming table; and a system having data processing/analyzing/storing and/or retrieving capability. In this embodiment, a gaming table or tables utilizing this invention in one or more gaming establishments could be networked (either within the same gaming establishment or across many different locations) for the purpose of data processing/analyzing/storing and/or retrieving capability. Once the networking capability (infrastructure) has been established, this invention could allow the formulation of a gaming table with a single/multi-tier progressive bonus jackpot system. This single/multi-tier progressive bonus jackpot system could be installed either on one table, on one or more tables within the same gaming establishment, or across many different locations (e.g., either in one country or across multiple countries in accordance with jurisdictional and international laws and regulations). The programming needed to establish the installation of this computer system 38 with a single/multi-tier progressive bonus jackpot is known to those having ordinary skill in the art and could be generally analogous in nature to those systems that are currently offered through electronic gaming machines, electronic lottery machines, and the like.

One possible embodiment of the present invention could be at least one or more dealer's electronic interfaces allowing the dealer to input data (e.g., where the cards are being dealt, game play results, facilitate wagering periods [start/stop], and the like) regarding any aspect of game play; one or more player's electronic interfaces allowing the player to input numerous types of data (e.g. game play wagering data, inner gaming establishment commerce data, and the like); one or more game element readers 36 (e.g., the Shufflemaster® iShoe™, Microsoft® Surface™ or other surface computing platforms, and the like) for the purpose of reading, identifying (e.g. recognizing a card's, face value and suit, the pips of a die [or dice], the location of an element of a gaming table that is specific to a game [e.g., the location of a ball landing on a specific location on a wheel], and the like) and transferring data to/from the electronic gaming table to/from one or more electronic table gaming systems; one or more players' monetary devices (e.g., to assist the player in the process of converting cash into an electronic format known as "game play credits;" to provide players the ability to utilize their player's club card or smart card; to aid the player in self-service activities [e.g., print coupons, comps, tip tickets, valet tickets, cash out (e.g., ticket-in/ticket-out ticket or smart card), and/or transfer funds to other smart cards, etc. at will]); an electronic gaming table comprised of a playing surface to support one or more playing elements (e.g., dice, cards, and the like) of a gaming table; and a system having data processing/analyzing/storing and/or retrieving capability. In this embodiment, a gaming table or tables utilizing this invention in one or more gaming establishments could be networked (either within the same gaming establishment or across many different locations) for the purpose of data processing/analyzing/storing and/or retrieving capability. Once the networking capability (infrastructure) has been established, this invention could allow the formulation of a gaming table with a single/multi-tier progressive bonus jackpot system. This single/multi-tier progressive bonus jackpot system could be installed either on one table, on one or more tables within the same gaming establishment, or across many different locations (e.g., either in one country or across multiple countries in accordance with jurisdictional and international laws and regulations). The programming needed to establish the installation of this computer system 38 with a single/multi-tier progressive bonus jackpot is known to those having ordinary skill in the art and could be generally analogous in nature to those systems that are currently offered through electronic gaming machines, electronic lottery machines, and the like. This single/multi-tier progressive bonus jackpot could also offer a predetermined cap (and the like). The purpose of the cap could be twofold: first, it could limit the amount of funds awarded to a winning player/pool of players and two, it could allow the operator to possibly electronically alter the payback odds of the single/multi-tier progressive bonus jackpot (in accordance with jurisdictional laws and regulations) (e.g., lowering the payback odds from 40 to 1 to 7 to 1) in such a way as to favor the players. This then may award the single/multi-tier progressive bonus jackpot sooner rather than later, which in turn could increase the game play urgency, player participation, and player excitement.

The above description sets forth, rather broadly, a summary of a series of embodiments of the present invention so that the detailed description that follows may be better understood and the contributions of the present invention to the art may be better appreciated. Some of the embodiments of the present invention may not include all of the features or characteristics listed in the above summary. There are, of course, additional features of the invention that will be described below. In this respect, before explaining at least one preferred embodiment of the invention in detail, it is to be understood that the invention is not limited in its application to the details of the construction and to the arrangement of the components set forth in the following description or as illustrated in the drawings. The invention is capable of other embodiments and of being practiced and carried out in various ways. Also, it is to be understood that the phraseology and terminology employed herein are for the purpose of description and should not be regarded as limiting.

BRIEF DESCRIPTION OF THE DRAWINGS

FIG. 21 is substantially shows a view of the wireless gaming device.

DESCRIPTION OF CERTAIN EMBODIMENTS OF THE PRESENT INVENTION

In the following detailed description of the preferred embodiments, reference is made to the accompanying drawings, which form a part of this application. The drawings show, by way of illustration, specific embodiments in which the invention may be practiced. It is to be understood that other embodiments may be utilized and structural changes may be made without departing from the scope of the present invention.

It could be understood that while the present description may only illustrate a single gaming table version, the present invention could also be implemented with many different versions of gaming tables at one venue as well as with different multiple versions of gaming tables at multiple venues.

Figure 1:
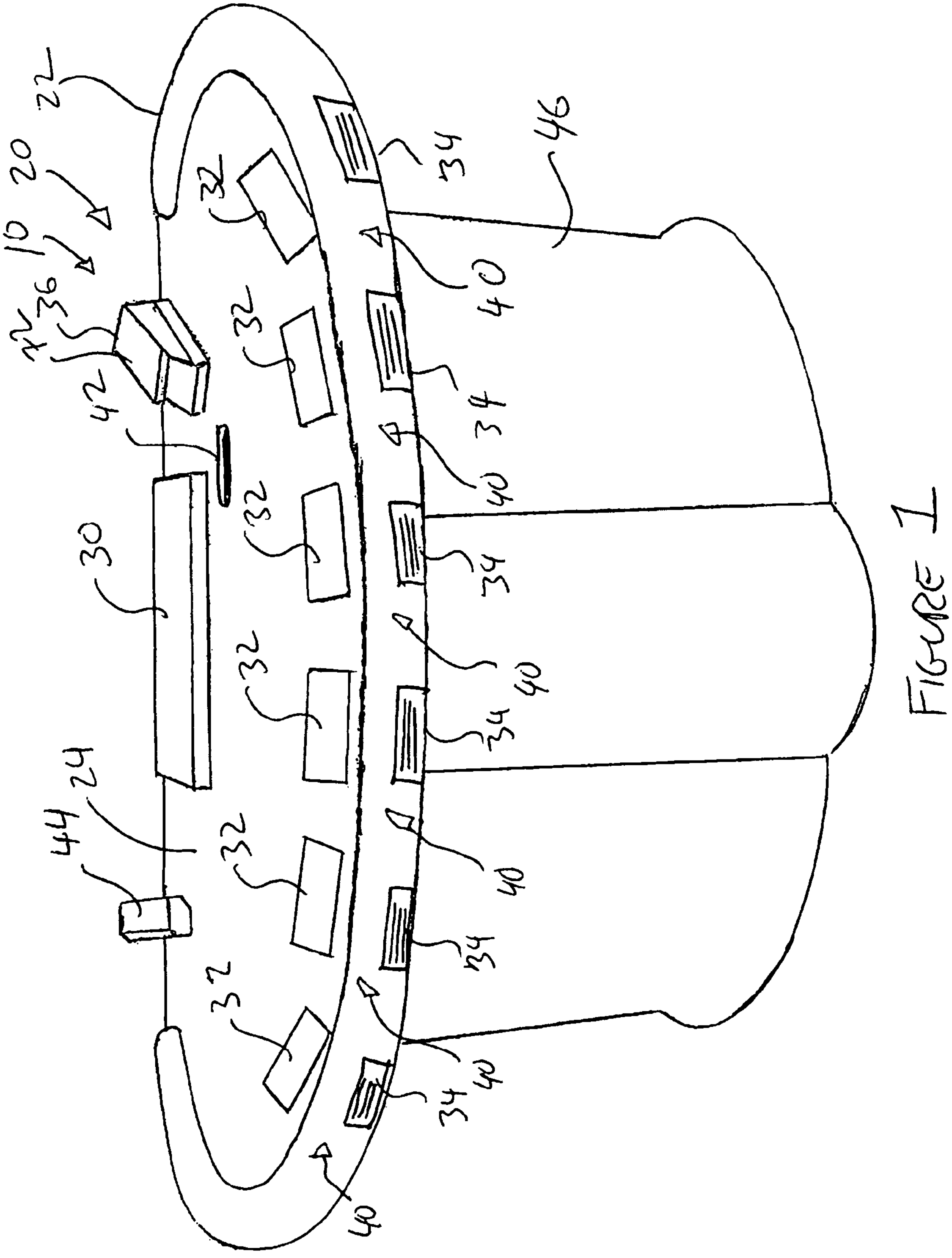
FIG. 1 is substantially shows a perspective view of the playing card electronic gaming table of the invention.
Figure 2:
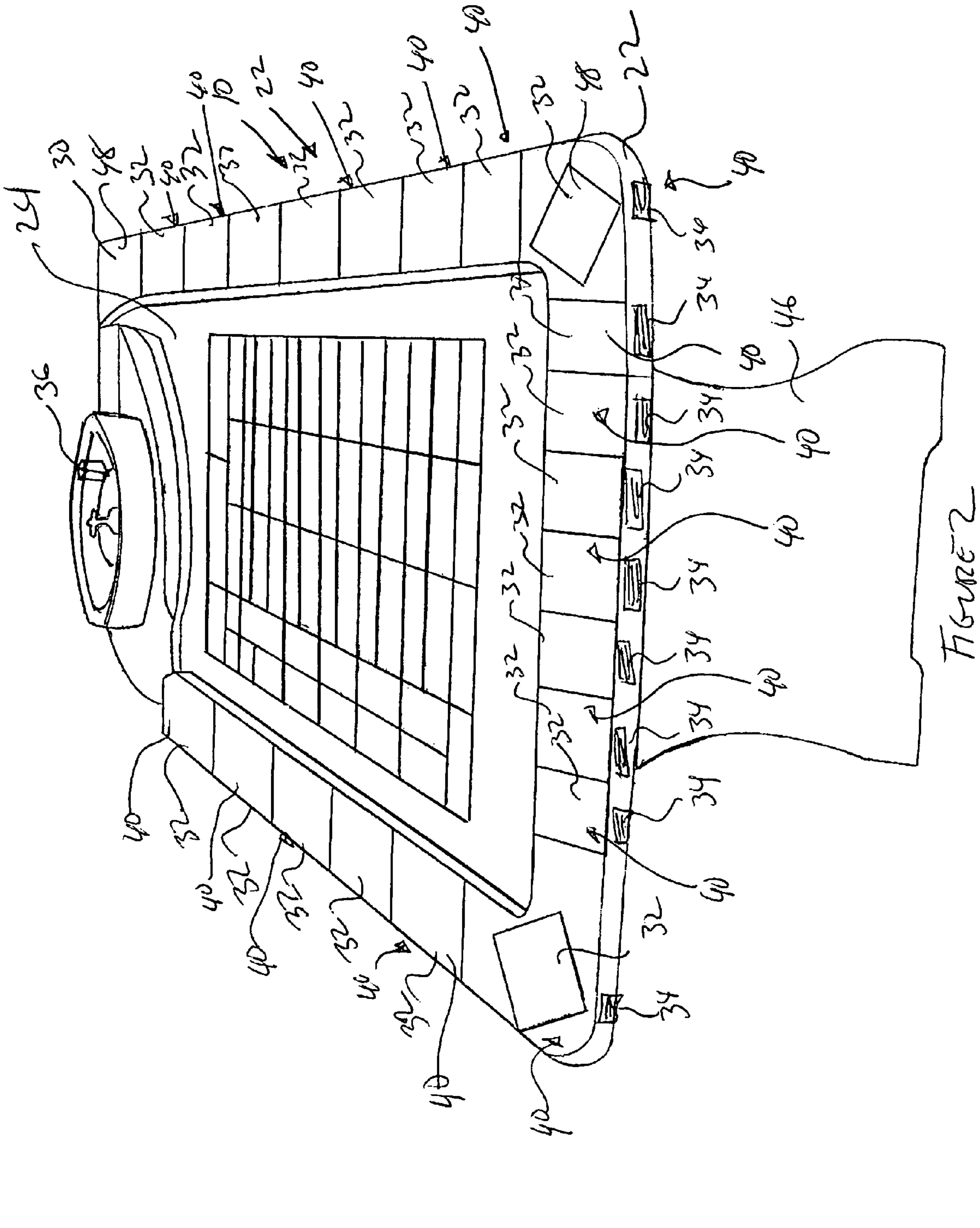
FIG. 2 is substantially shows a perspective view of the roulette electronic gaming table of the invention.
Figure 3:
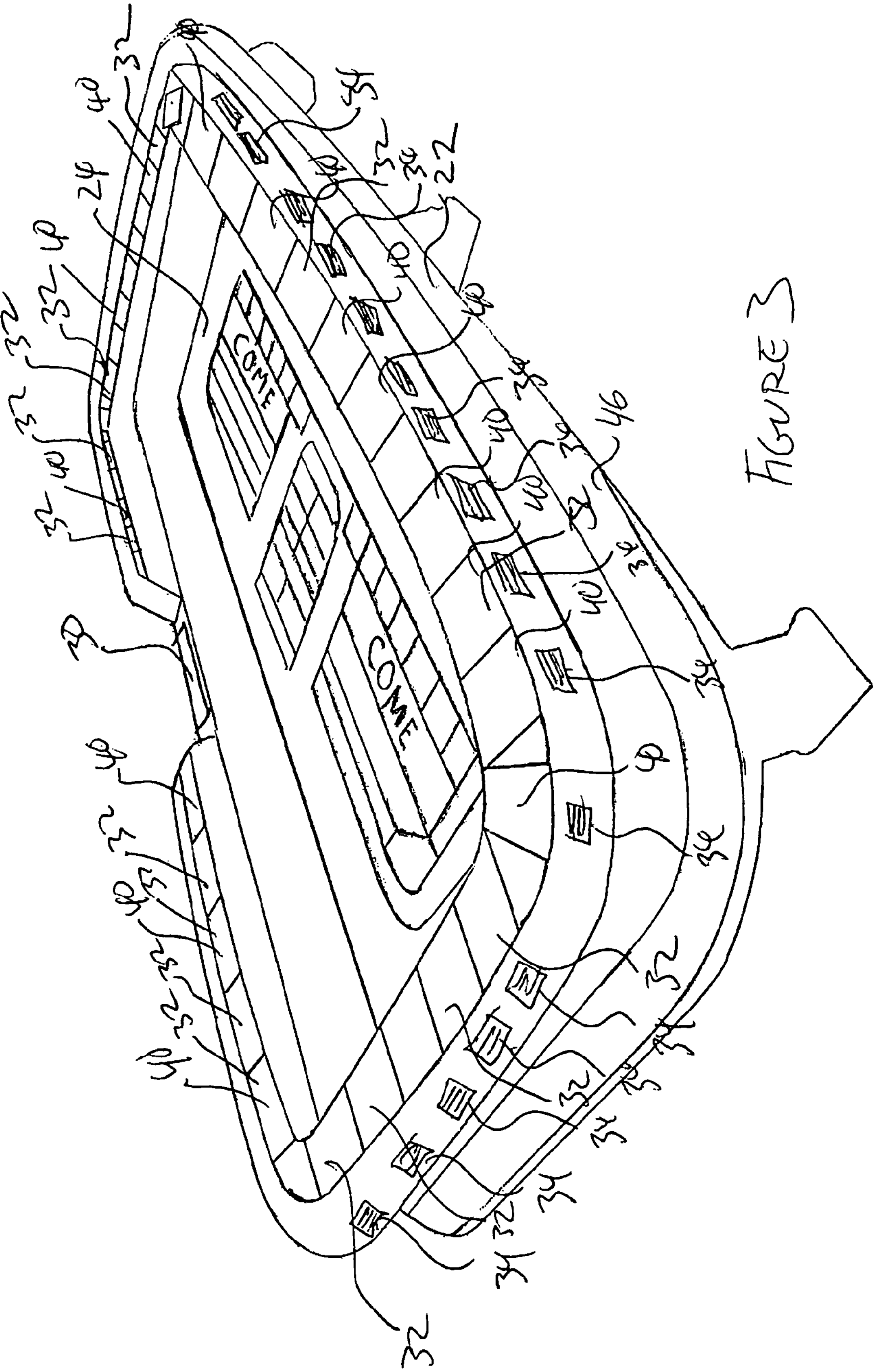
FIG. 3 is substantially shows a perspective view of craps embodiment electronic gaming table of the invention.
Figure 4:
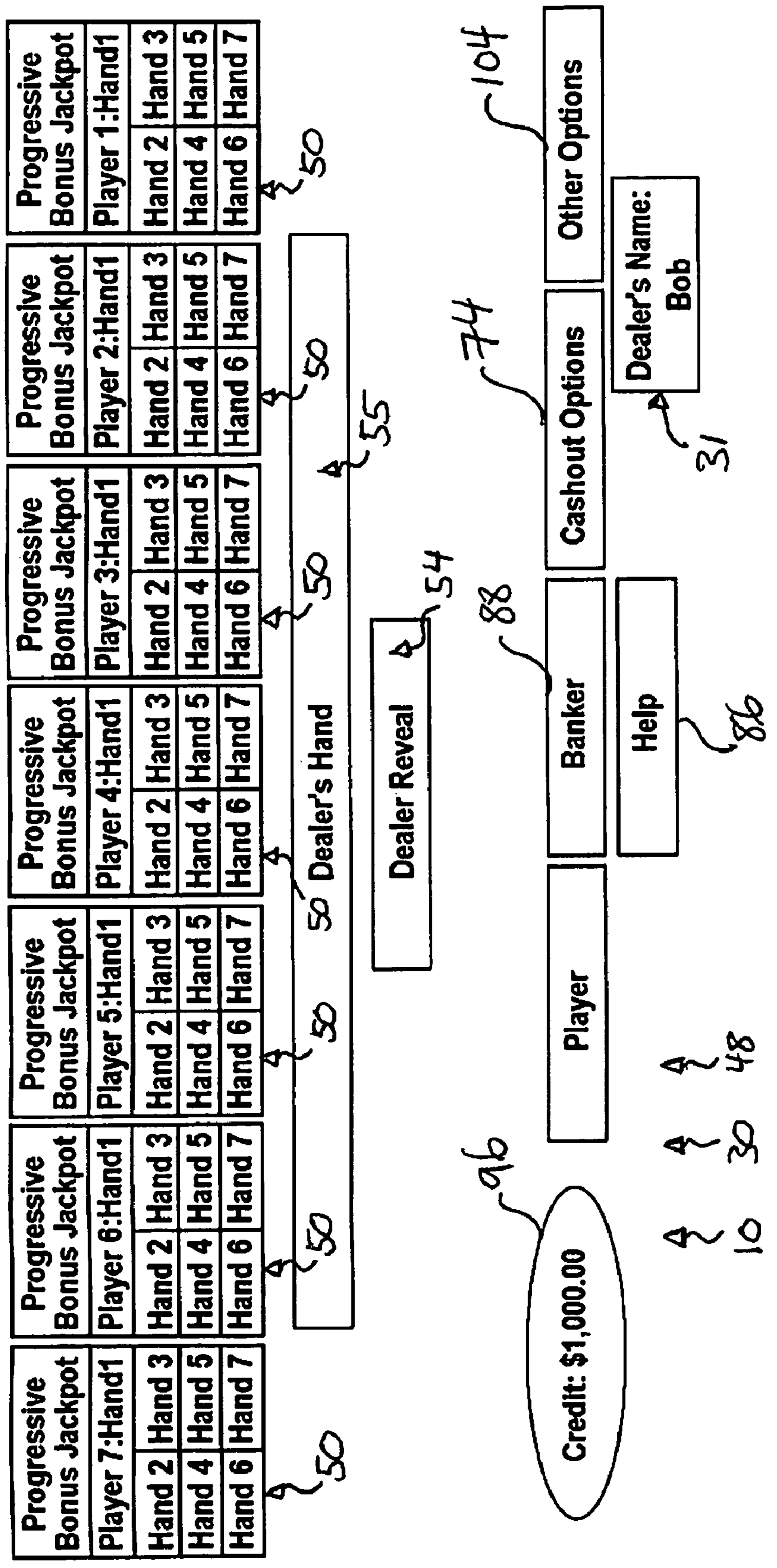
FIG. 4 is substantially card game embodiment of the player's electronic interface for player operating as dealer.

One possible embodiment of the invention 10 could be an electronic table game system 20 and a methodology or process 500 for its operation. As substantially shown in FIGS. 1, 2, 3, one embodiment, an electronic table game system 20 could be comprised of one or more electronic gaming tables 22, of the type generally found within a gaming establishment. Each electronic gaming table 22 having a playing surface 24 that could support one or more game elements 26 (e.g., dice, cards, roulette ball, and the like) for the play of a table game. Proximate to the playing surface 24 could be one or more dealer's electronic interfaces 30 as well as one or more player's electronic interfaces 32, the interfaces being connected to a computer system 38 (substantially shown in FIGS. 22 and 23) that could process data inputted through the interfaces. The dealer's electronic interface 30 could generally define the dealer's position and substantially allow a human dealer to at least input data regarding observed actions of the game play of the table game being played upon the electronic gaming table 22. The player's electronic interface 32 could allow a human player to at least input data regarding one or more wagers made by the human player on the table game 28 being played upon the electronic gaming table 22.

In at least one embodiment, the invention 10 could further comprise of one or more player's monetary devices 34 generally located proximate to the player's electronic interfaces 32, (so defining a player position 40) and one or more game element readers 36 generally located proximate to the dealer's electronic interface 30. The player's monetary device(s) 34 and game element reader(s) 36 are also connected to the computer system 38. The player's monetary device 34 could be used by the player to generally input monetary data that could support the player's wagering activity while the game element reader 36 could be used to generally input data regarding such factors as; identity, value, time and location of game element(s) 26 in relation to game play.

The invention 10, in providing real time data input capability for game play, wagering, and the like for table games, wherein the data is processed by a computer system 38, could allow multiple electronic table games to be electronically linked together forming network that could provide a single/multi-tier progressive bonus jackpot for the linked games. The single/multi-tier progressive bonus jackpot could be further played with a cap or limit, which in combination with the operator's actions could generally increase the chances of winning the single/multi-tier progressive bonus jackpot, and could substantially increase players' participation in the invention 10. Furthermore, the invention's data input and processing capability could provide for substantially increased data mining of table games and table game players.

The electronic gaming table 22 could comprise of a body 46 that supports a playing surface 24 upon which game elements 26 of the table game could be deployed or otherwise supported for the play of the table game. The structure of the gaming table could be generally configured in two types. One type could be configured for the playing of table games using playing cards (e.g., a blackjack, a pai gow, a baccarat, or a poker table and the like) while the other type could be configured for the playing of table games not using playing cards (e.g., a roulette table, a craps table, and the like).

In at least one embodiment, the playing surface 24 could generally be of traditional construction (e.g., a felt surface with game-specific indicia for either playing card or non-playing card table games). In at least one embodiment, the playing surface 24 could be further adapted to support one or more dealer's electronic interfaces 30, one or more game element readers 36, one or more player electronic interfaces, one or more player's monetary devices 34, and the like.

The electronic gaming table 22 could further provide for traditional non-gaming accessories. An example of such accessories could include, but not be limited to: one or more chairs for players to sit (not shown), a slot in the table so a dealer could deposit currency 24 (e.g., cash) into a cash box, a device for storing game elements 44 (e.g., discarded playing cards), signage or other indicia for communicating to players various information like, but may not be limited to gaming and wagering rules (e.g., minimum/maximum bet requirements, house rules, and the like) (not shown).

The dealer's electronic interface(s) 30 (e.g., a touch screen 48) could be designed to allow a human dealer to actively enter in real time data concerning dealer-observed table game play and/or wagering (e.g., where the game elements 26, such as cards, are being dealt, game play results, facilitate wagering periods [start/stop], and the like) occurring at a gaming table under the dealer's control. The dealer's electronic interface 30 could be so configured to allow the dealer's action of inputting the data to occur without otherwise interrupting or slowing down the flow of gaming table's play (e.g., shuffling of the cards, offering the new shooter the dice, and the like) or the data being processed/analyzed/stored and/or retrieved by an electronic table gaming system.

This dealer's electronic interface 30 could be a touch screen 48 programmed to provide buttons 50, icons 52 (and the like) for the computer illiterate and/or for data entry accuracy/expediency and/or for the ease of training new dealers.

Embodiments of the dealer's electronic interface 30 may further be configured and programmed through the computer system 38 and include various communication devices such as audible indicators (e.g., alarms, bells, and the like); visual indicators (e.g. error messages, statistical data displays [hands per hour, game recall in the case of system malfunction or player dispute, and the like], and the like); password/radio-frequency identification (RFID)-protected screens/screensavers with automatic timeouts; customizable art displays/and or screensavers; various types of overrides based on standardized computer security schemas (e.g., the pit boss could have certain override capabilities to, but not be limited by, the ability to re-boot an individual gaming table and/or certain gaming table components; to transfer a player's or players' current game/game status/gaming history/and the like to a specific gaming table; to fix a dealer's/player's data-entry error; to credit a player's account in the case of a system malfunction/player dispute; and the like); and the like.

Additional embodiments of the Dealer's electronic interface 30 may include dealer identification/security features 31 that may include, but not be limited to, voice-recognition/activation, biometric interfaces (e.g., fingerprint/retina/DNA scanning), other RFID implementations, and the like.

In this manner, the present invention 10 may generally avoid one of the stumbling blocks for incorporating gaming tables into a computer system 38: attempting to substitute a human dealer with passive electronics that attempt to identify and interpret the actions of the players and the dealer as they relate to gaming table activities.

In at least one embodiment, wherein the gaming table's playing surface 24, that itself was a touch screen 48, a surface computing platform (e.g., Microsoft® Surface™ and the like) could also be incorporated into computer system 38. This combination of technologies could allow the gaming establishment (utilizing server based technology) to convert the gaming table to from one table game to another (e.g. the playing surface 24 could change from a blackjack game configuration to one for a pai gow game) simply by downloading/changing to a new game indicia program and the game program.

In operating a table game, the human dealer could be given specific tasks, including but not necessarily limited to: to identify the destination of a game element 26 (e.g., which player is dealt a specific card); to set up the game (e.g., in the game of craps, offering a tray of dice to the shooter so that he or she may choose a pair, retrieving the dice after the dice have been thrown, and the like. In roulette, these tasks could include spinning the ball on the wheel and the like. In playing card table games, these tasks could include shuffling the cards and placing them into the shoe, and the like); to record the results of game play (e.g., the pips of a die/pair of dice, the number associated with the final resting spot of a ball on a roulette wheel and the like. The dealer could also offer to the player(s) the traditional Vegas-style experience (e.g., companionship and basic human socialization based on the gaming interaction between a dealer and player). Other responsibilities could be tasked to the dealer as deemed necessary by the gaming establishment. To accomplish one or more most of these tasks with the present invention 10, the dealer could interact with his or her one or more electronic dealer interfaces (e.g., the dealer inputs the appropriate task-associated data).

In another embodiment of this invention 10, all of the tasks assigned to a dealer could be automated with the same type of components as that of an electronic gaming device (e.g., slot machines, fully automated dealer-less electronic table games and the like) with the exception that multiple players could play on one machine as opposed to what occurs on an electronic gaming device, which is a one player-to-one machine interaction. Technology thereby could eliminate the need for a human dealer.

Similarly, in at least one embodiment of the invention 10, the computer system 38 could be programmed so that the functions of the game element reader 36 (e.g., the determination of what cards the player and dealer are dealt; the final destination of a ball landing on a roulette wheel, the results of thrown dice on a craps table; and the like) could be performed by the electronic devices of the invention 10 (e.g., the dealer's electronic interface 30). Like an electronic gaming machine, the results of the determination could then be displayed as animation/static display, and the player's account could be credited or debited appropriately. Due to the fact that all of the game elements 26 (e.g., cards, dice, ball, and the like) could be removed (e.g., they could all be animated), no set up (e.g., the ball being rolled on a roulette wheel, a tray of dice being offered to a shooter, the retrieval of dice after they have been thrown, and the like) of a game is required, and all activities of the game are recorded (as well as processed/analyzed/stored/and/or retrieved) by the computer system 38 in real-time. Both dealer-based and full computer animated versions of the invention 10 could provide for the formulation and implementation of a single/multi-tier progressive bonus jackpot with or without a cap. Those with ordinary skill in the art could implement these aforementioned embodiments.

As substantially shown in FIG. 4, 5, 5A, 6, 7, the dealer's electronic interface(s) 30 (e.g., touch screens 48) could be designed for a human dealer to allow the dealer to actively enter data in real time (e.g., where the cards are being dealt and/or if they have been discarded; game play results [e.g., location of a ball landing on a roulette wheel's space, the pip of a die, and the like]; facilitate wagering periods [e.g., start/stop]; and the like) related to his or her observations regarding an action (e.g., game play) at the electronic gaming table 22 under the dealer's control without interrupting or slowing down the flow of gaming table's play (e.g., shuffling of the cards, offering the new shooter the dice, and the like). Furthermore any data entered by the dealer could be processed/analyzed/stored and/or retrieved by a computer system 38. These one or more electronic interfaces could be flush with the top of the playing surface 24 and located in proximity to the dealer's ordinary position at the gaming table.

Various versions of the dealer's electronic interface 30, in conjunction with the appropriate programming of the computer system 38 could be configured to show buttons 50, icons 52 (and the like) for the computer illiterate and/or for data entry accuracy/expediency and/or for the ease of training new dealers. By pressing a button/icon and the like, the dealer could indicate his or her future actions and then take those actions (e.g., in card games, by pressing a button/icon and the like, the dealer could denote the player to whom the card is to be dealt and then deal the card. The dealer could then repeat this action for each player. In non-card games, the dealer could press a button/icon and the like for the purpose of recording game action play).

This dealer's electronic interface 30 may further include, but are not limited to: a dealer reveal icon/button 54 (which could allow the dealer to indicate to the computer system 38 that it is time for that dealer to reveal his card(s); a wager lockout button/icon 56 to manage wagering periods (which could allow the dealer to indicate to players when bets are allowed and when they are not during the game); a point number button/icon 58 (which could allow the dealer to identify which number is the point number in craps); a blackjack button/icon 60 (which could allow the dealer to indicate to the system that he or she has a blackjack); a no blackjack button/icon 62 (which could allow the dealer to indicate to the system that he or she does not have a blackjack); a pit boss button/icon (which could allow the dealer to call the pit boss over to the gaming table for assistance); a dealer override button/icon (which could allow the dealer to take control of the table as a dealer either when a player is finished with his or her turn of being the game's banker or in the event of a system malfunction/player error during the player's turn of being the game's banker); 12 buttons 50 listing the numbers 1 through 12 individually (which could allow the dealer to enter the results of the roll of a dice 64 (e.g., a player rolls a 3 and a 4, the dealer could then press the 7 button/icon) 66; hard ways buttons 50/icons 52 (e.g., two 2s, two 3s, two 4s, two 5s) (which could allow the dealer to enter rolls of the dice which result in specific number combinations [also known as "hard way rolls]); two is (e.g., "snake eyes") button 50/icons 52 (which allow the dealer to enter rolls of the dice which result in the specific number combination of two single pips on each die); and two 6s (which allow the dealer to enter rolls of the dice which result in the specific number combination of 6 pips on each die) 68.

The dealer's electronic interface 30 could further feature: audible indicators (e.g., alarms, bells, and the like); visual indicators (e.g. error messages, statistical data displays [e.g., hands per hour, game recall in the case of system malfunction or player dispute, and the like], and the like); password/radio-frequency identification (RFID)-protected screens and/or screensavers (with automatic timeouts) for the purpose of dealer login/logoff security; customizable art displays/and or screensavers; various types of overrides based on standardized computer security schemas (e.g., the pit boss, from a remote location [e.g., the pit boss' terminal located in the center of the gaming pit] could have certain override capabilities to, but not be limited by, the ability to re-boot an individual gaming table and/or certain gaming table components; to transfer a player's or players' current game/game status/gaming history/and the like to a specific gaming table; to fix a dealer's/player's data-entry error (e.g., if the cards were dealt out of sequence according to standard game play rules); to credit a player's account in the case of a system malfunction/player dispute; and the like); and the like.

Other functions of the dealer's electronic interface 30 could include, but not be limited to, voice-recognition/activation; biometric interfaces (e.g., fingerprint/retina/DNA scanning/and the like); other RFID implementations; Microsoft® Surface or other surface computing platforms; and the like. This technology may provide the dealer's electronic interface 30 to be completely automated so that, rather than manually inputting information; the dealer's actions/thoughts/eye motions/and the like could be automatically read and translated into an electronic format (or automated all together so that a human is not a necessity) to which the system could respond appropriately.

For example, surface computing platform technology (e.g., Microsoft® Surface™ and the like) could scan currency as it is placed on the table and, if appropriate, based on the dealer's indications, the system could convert it into electronic game play credits and attribute those credits to the correct player's account. The Microsoft® Surface™ could scan and the system could record all pertinent data about cards as they are withdrawn from a manual shoe/Shufflemaster® iShoe™ or the like and could identify to which player they were dealt and/or whether they were discarded. The Microsoft® Surface™ could automatically scan the bottom pip of a die/dice and the system's servers could calculate the upside pip of the same die/dice. The computer system's servers could then transmit this data back to the computer system's various displays (e.g., electronic signage, Microsoft® Surface™, and the like) and credit/debit the appropriate players' accounts.

The present invention 10, in using a human dealer to input action of a table game into a computer system 38, may help avoid one of the stumbling blocks for incorporating gaming tables into a computer system 38: passive electronics that attempt to identify and interpret the actions of the players and the dealer as they relate to gaming table activities.

Figure 8:
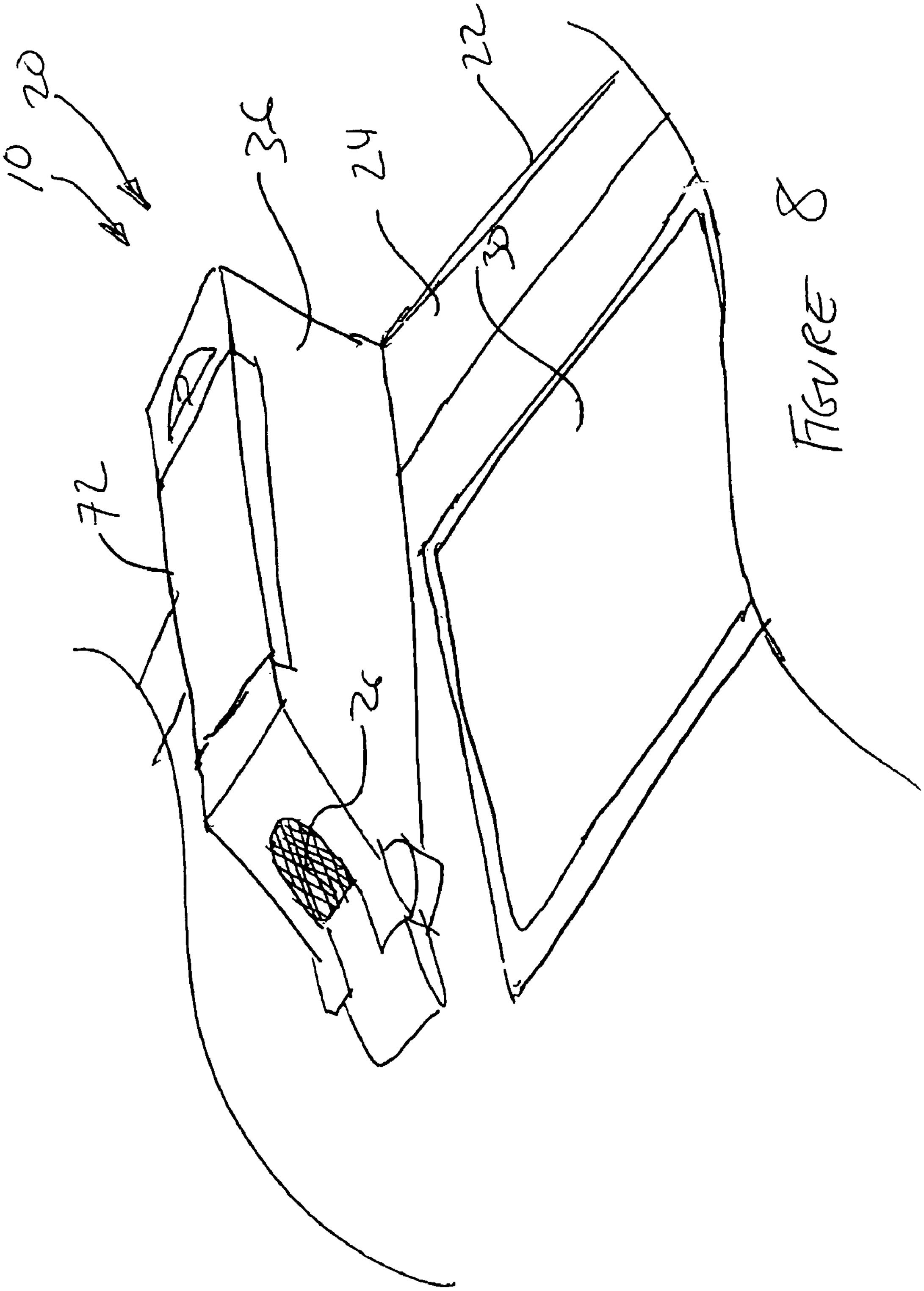
FIG. 8 is substantially shows a view of game element reader.
Figure 9:
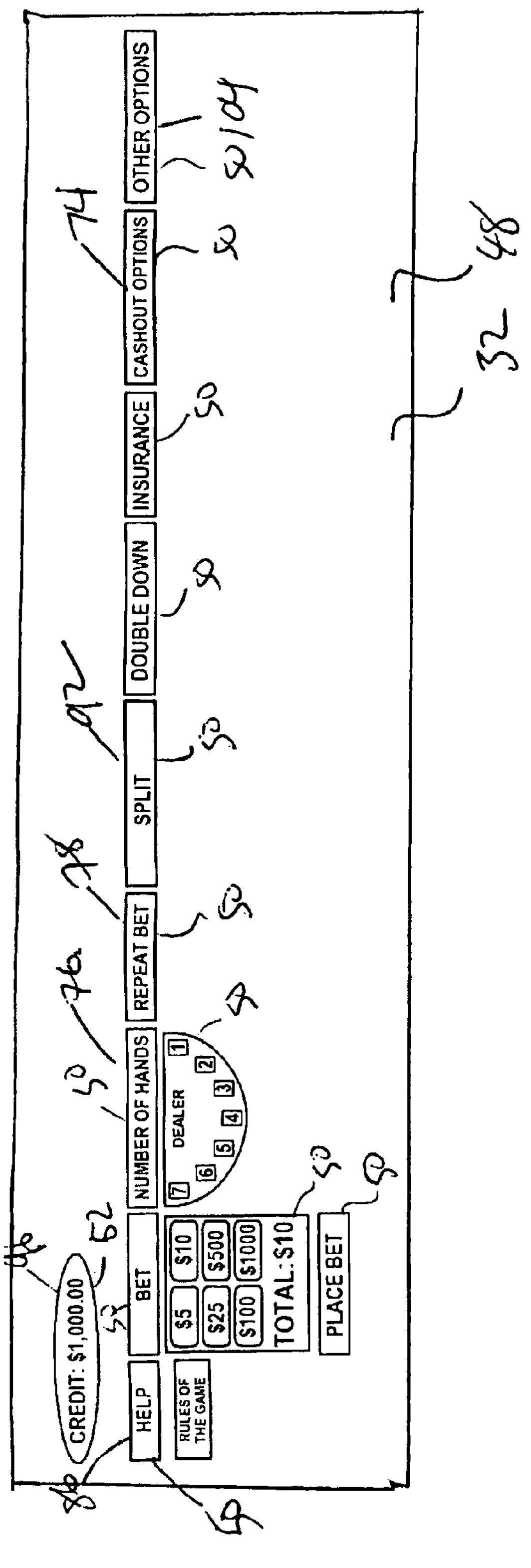
FIG. 9 is substantially shows a view of the blackjack embodiment of the Player's electronic interface.
Figure 10:
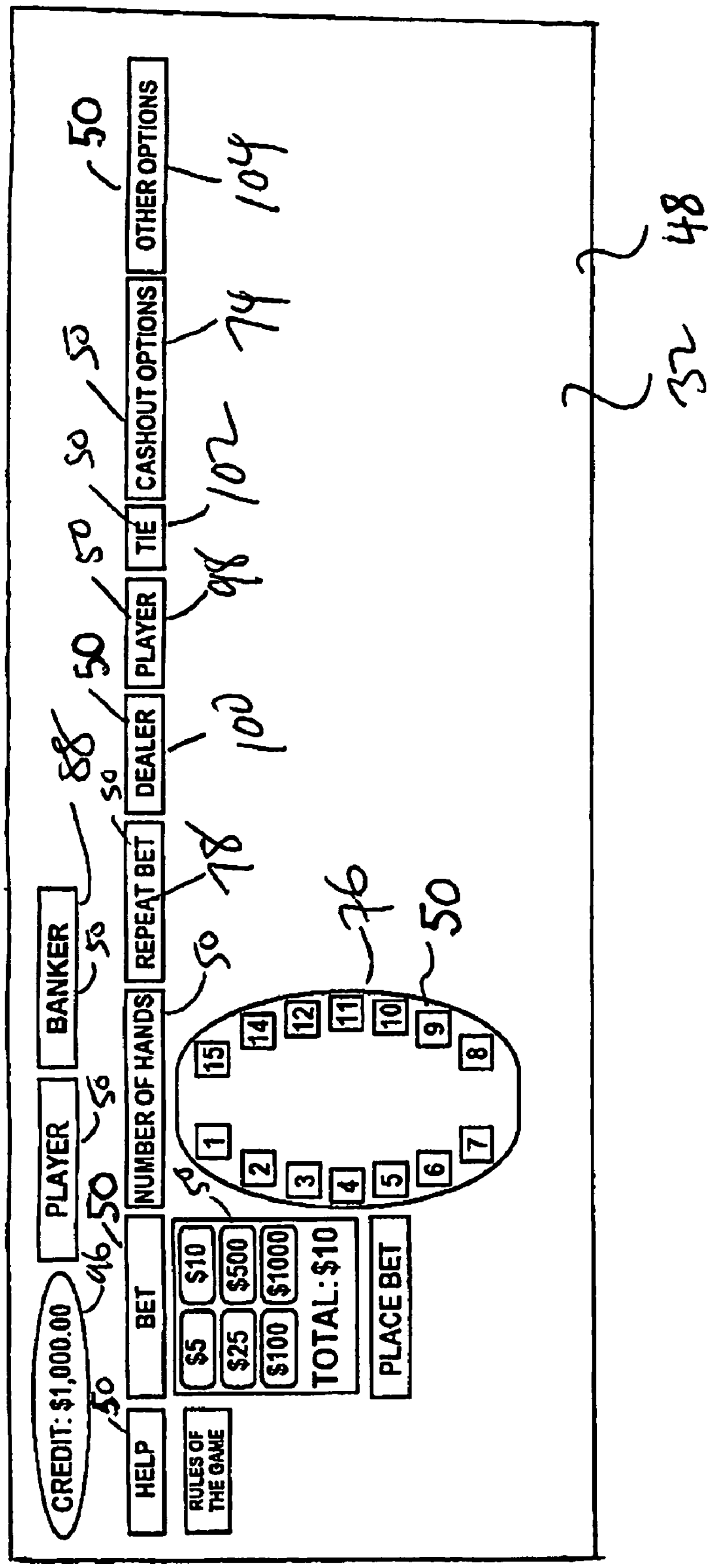
FIG. 10 is substantially shows a view of the baccarat embodiment of the Player's electronic interface.
Figure 11:
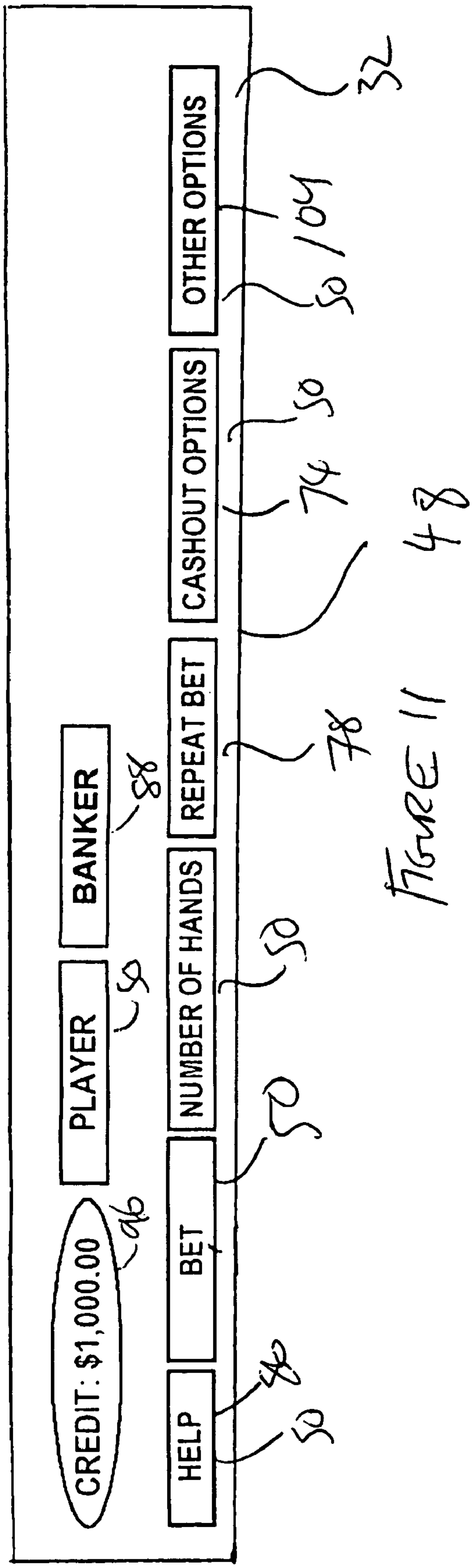
FIG. 11 is substantially shows a view of pai-gow embodiment of the players' electronic interface.
Figure 12:
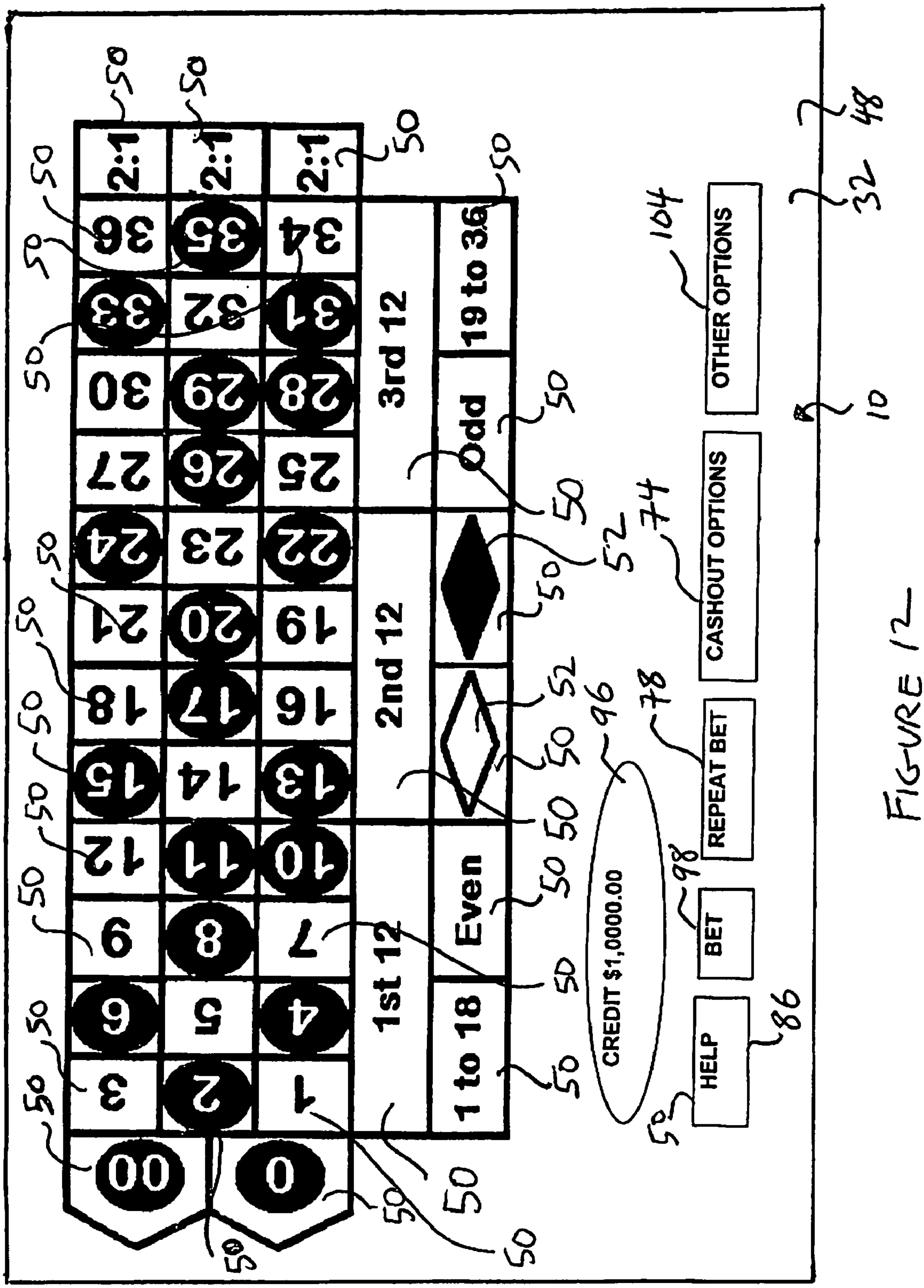
FIG. 12 is substantially shows a view of roulette embodiment of the player's electronic interface.
Figure 13:
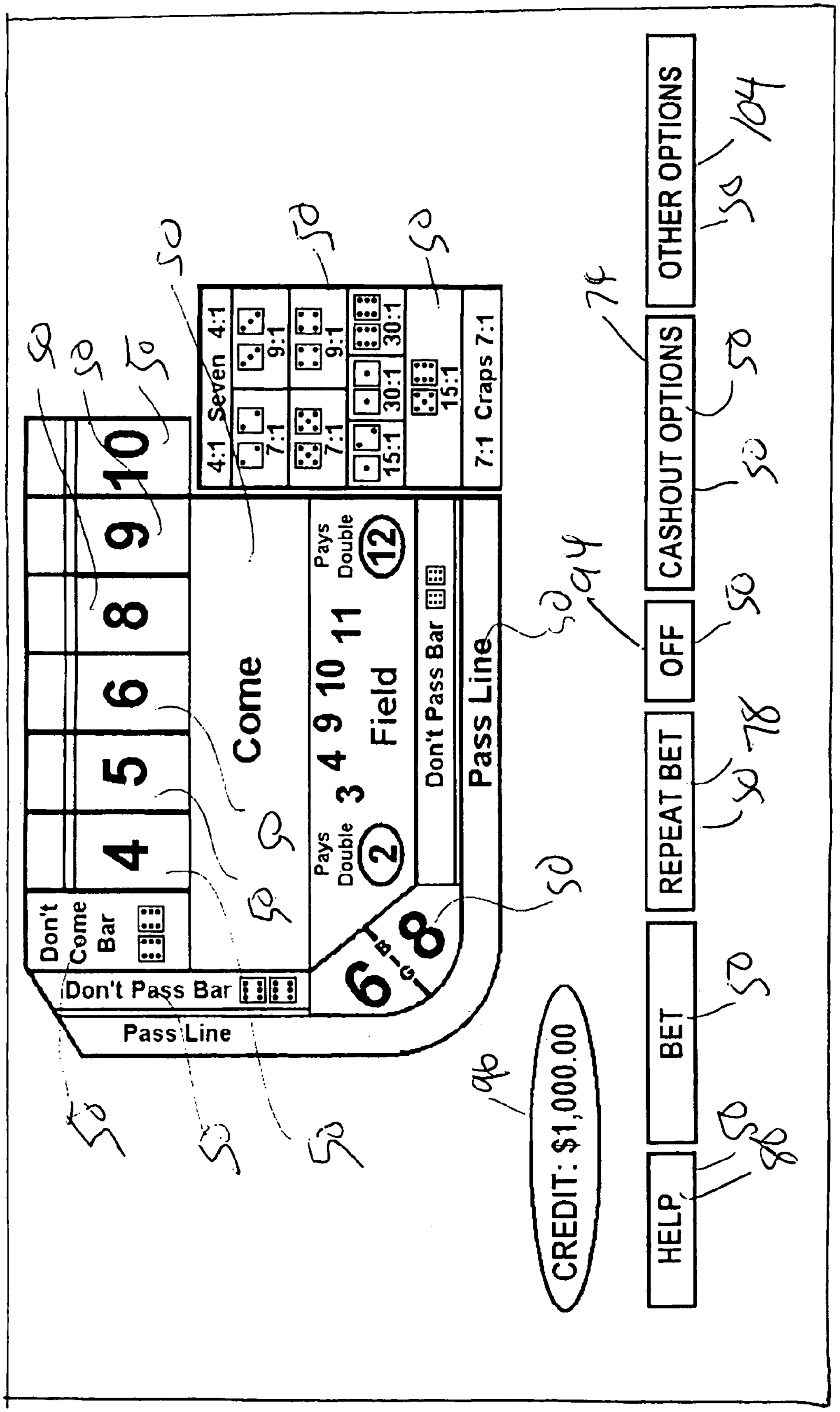
FIG. 13 is substantially shows a view of craps embodiment of the player's electronic interface.
Figure 14:
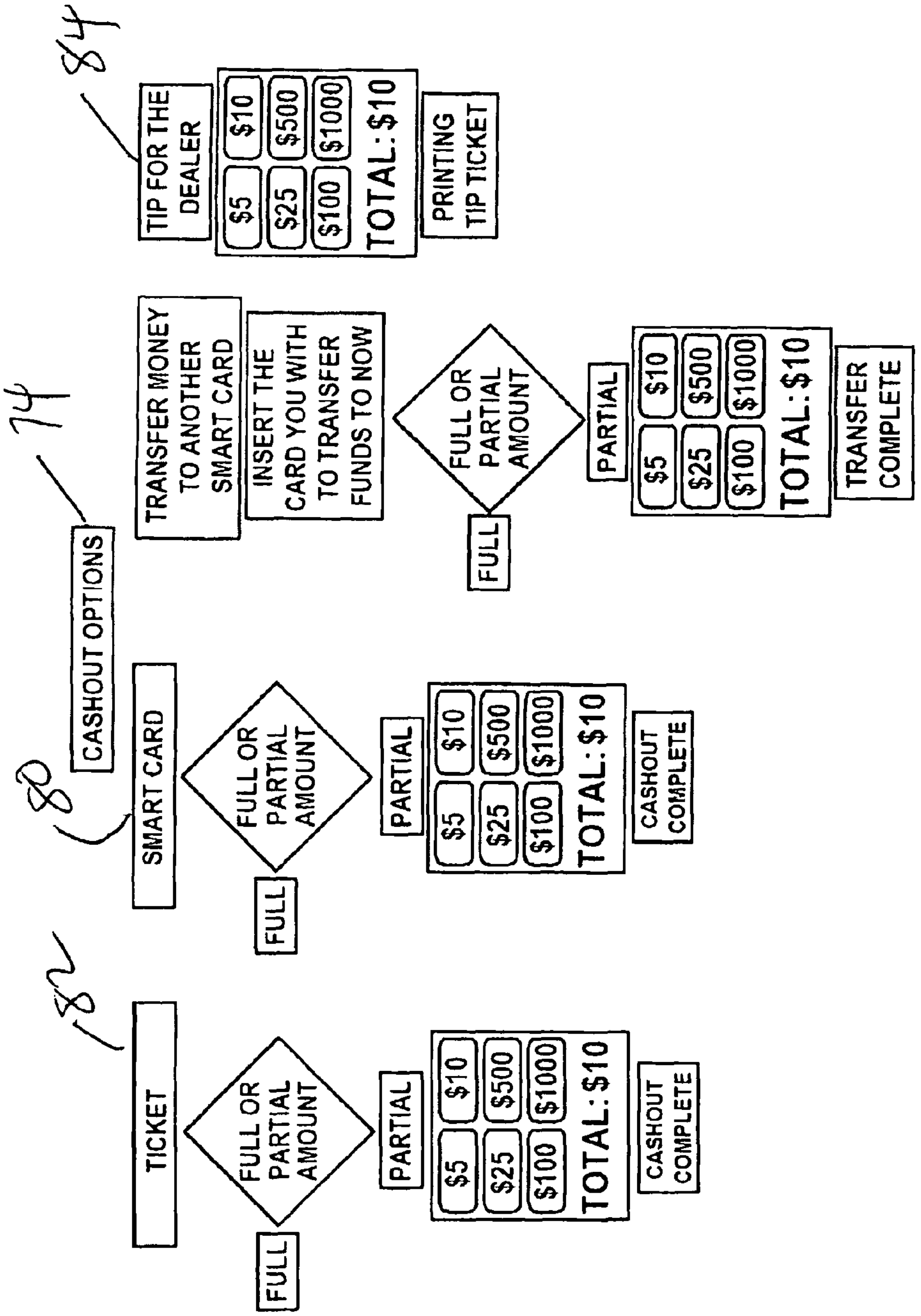
FIG. 14 is substantially shows a view of the cashout options of the player's electronic interface.
Figure 15:
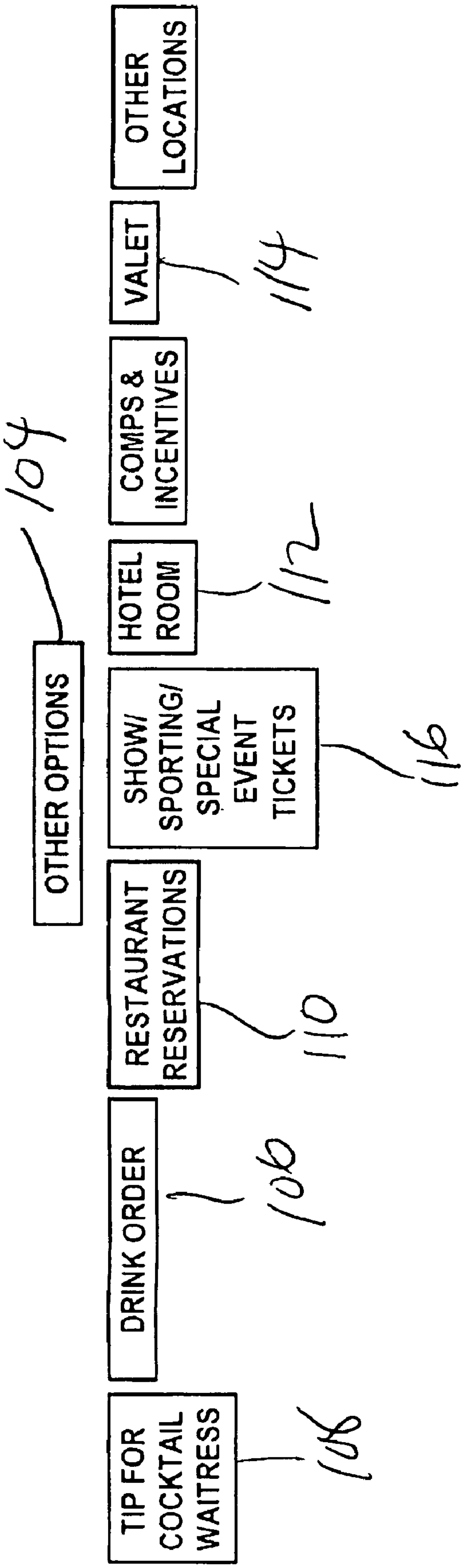
FIG. 15 is substantially shows a view of the other options of the player's electronic interface.
Figure 16:
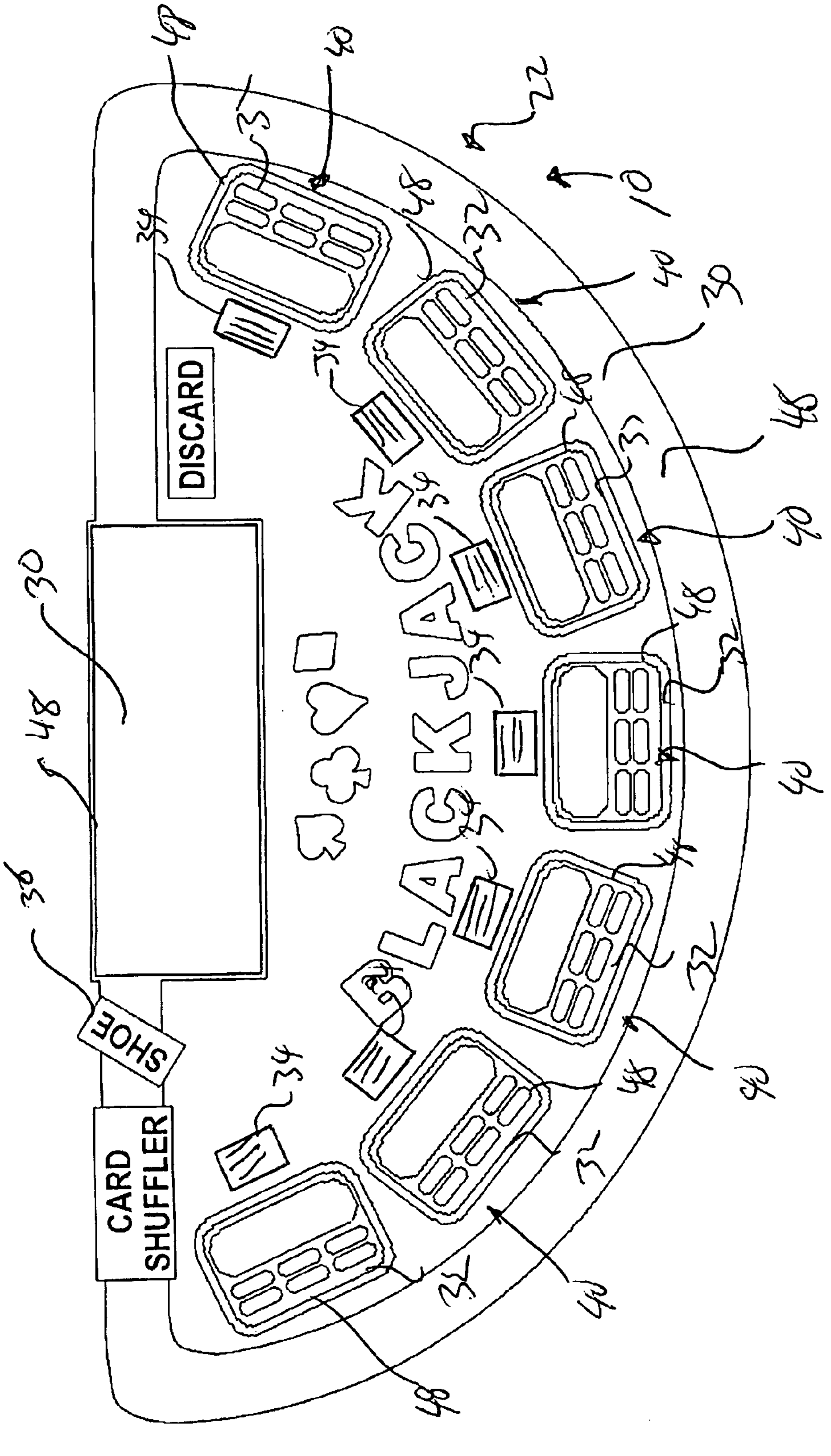
FIG. 16 is substantially shows a view of the blackjack version of the electronic gaming table with a touch screen playing surface integral with a surface computing platform.
Figure 17:
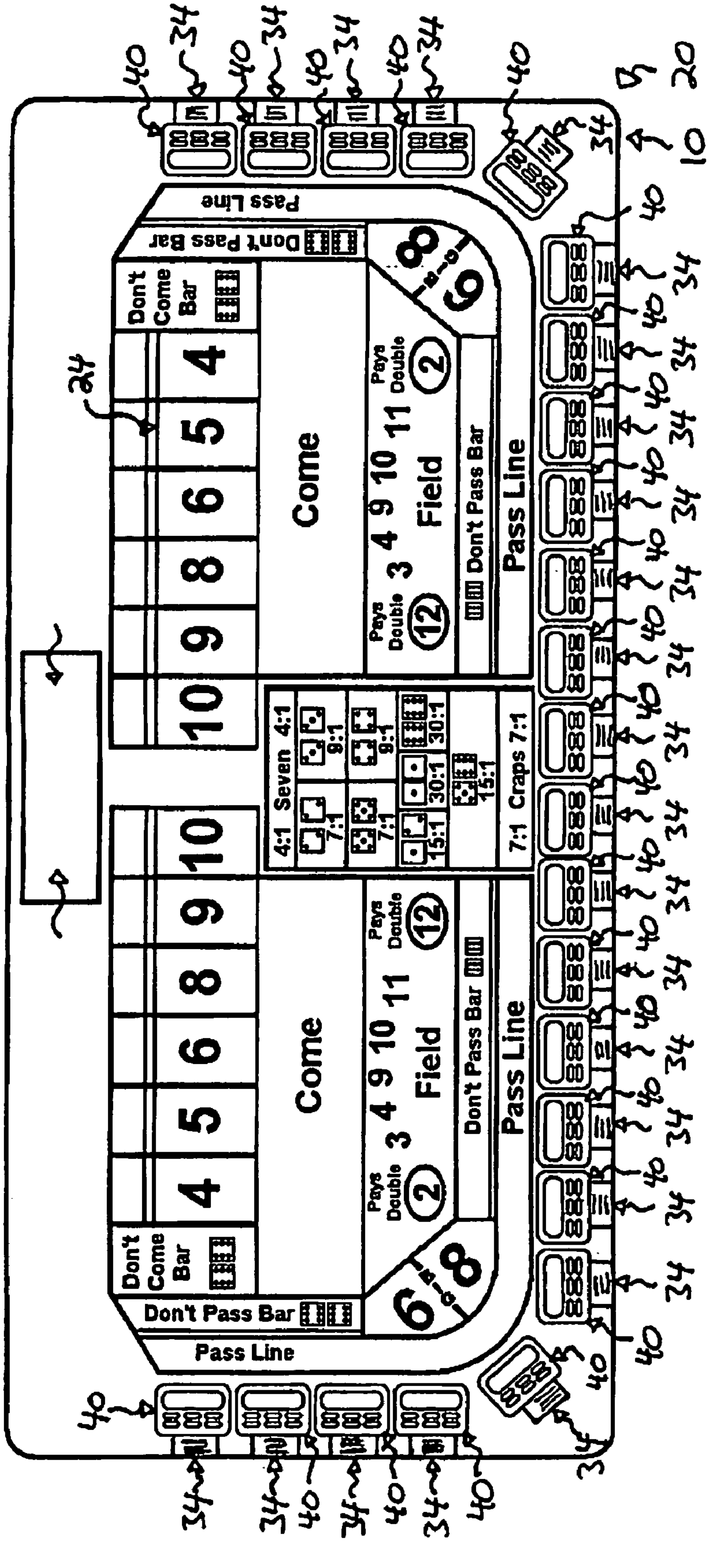
FIG. 17 is substantially shows a view of the craps version of the electronic gaming table with a touch screen playing surface integral with a surface computing platform.
Figure 18:
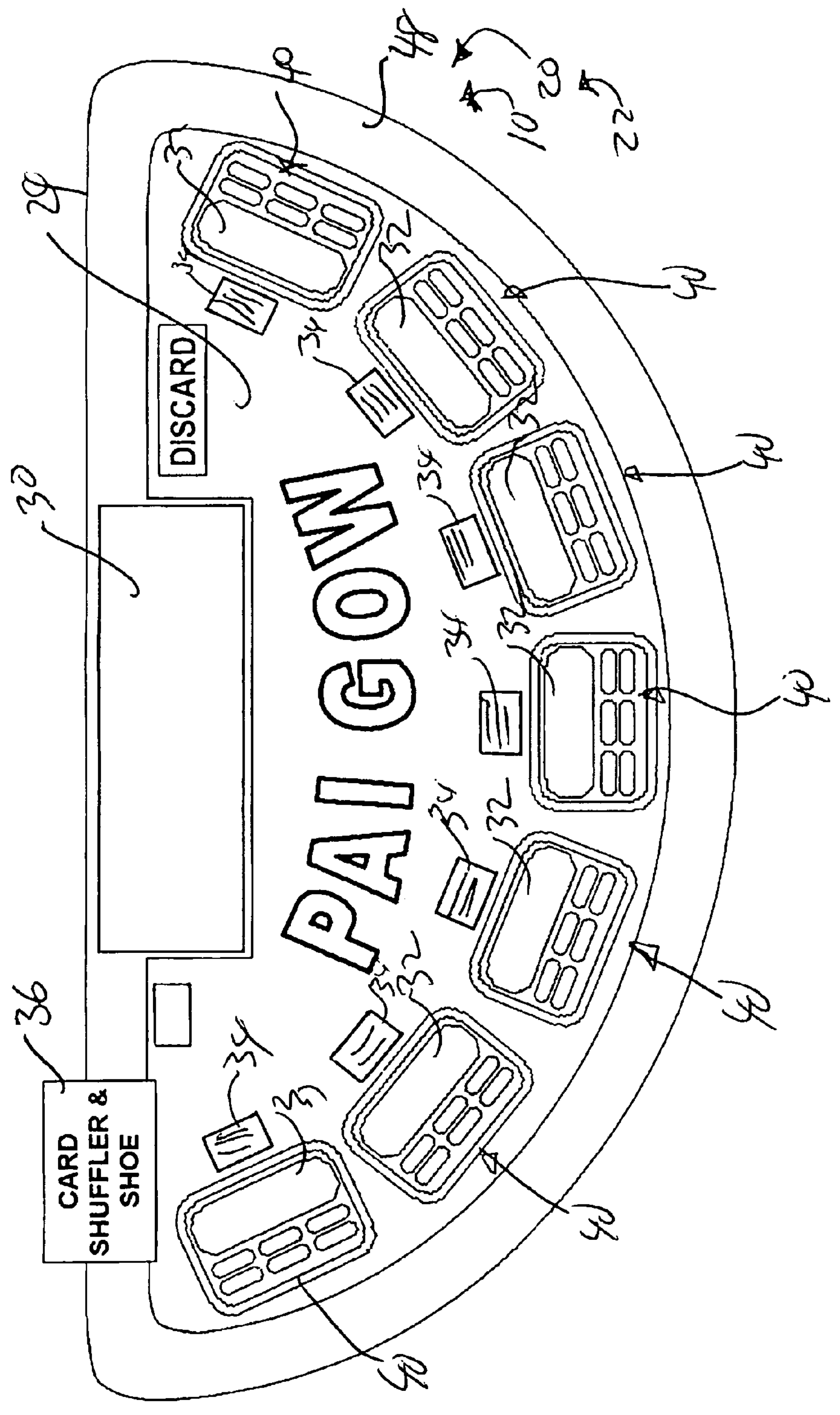
FIG. 18 is substantially shows a view of the pai-gow version of the electronic gaming table with a touch screen playing surface integral with a surface computing platform.
Figure 19:
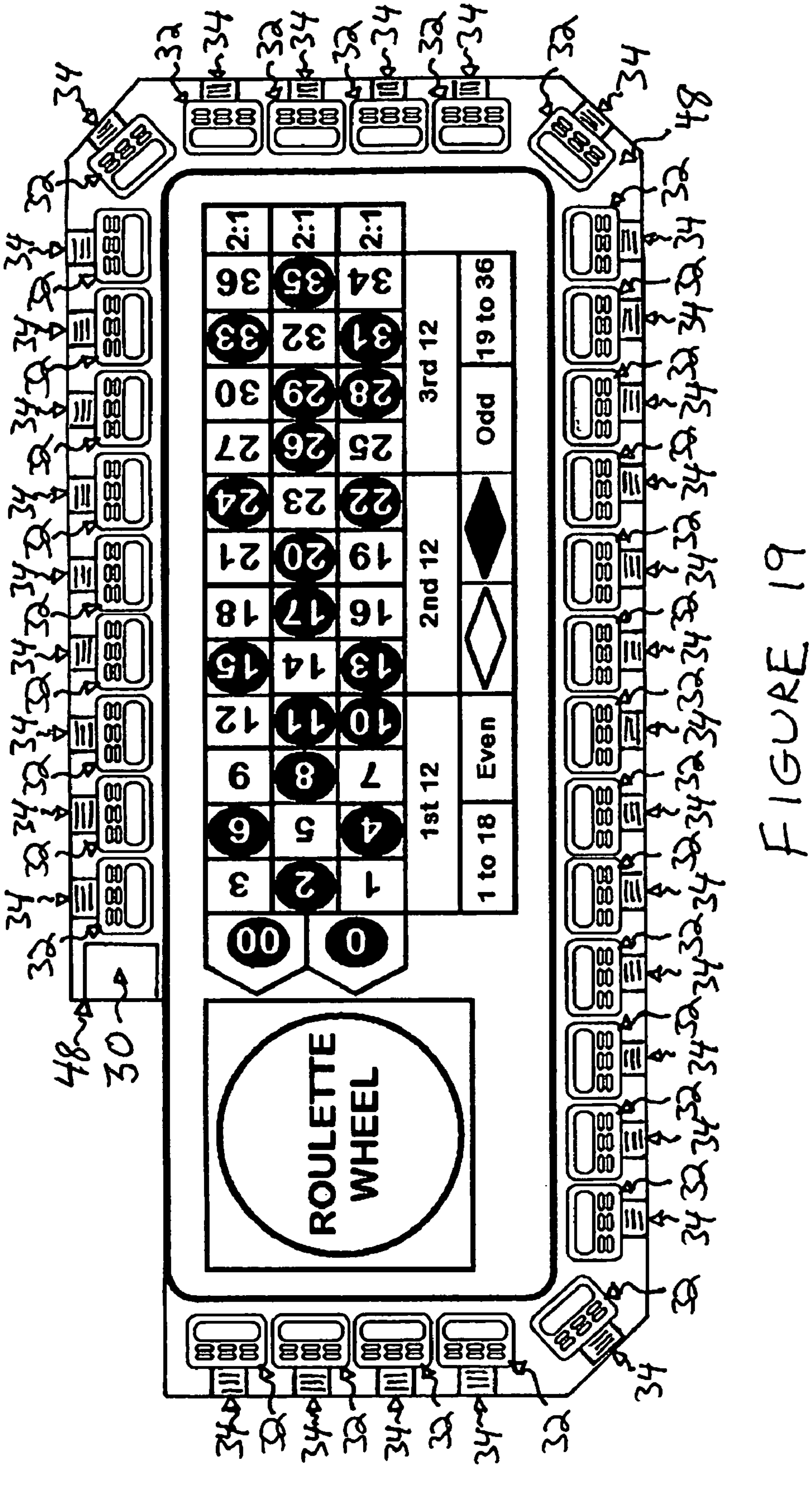
FIG. 19 is substantially shows a view of the roulette version of the electronic gaming table with a touch screen playing surface integral with a surface computing platform

As substantially shown in FIG. 8, the game element reader 36 could be any device that can read, transmit, and possibly display game element-related data in real time (the game element 26 may refer to, but is not limited to, cards from one or more decks of playing cards, a pair of dice, a ball, and the like either in physical or electronic format). This device may be the Shufflemaster® iShoe™, the Microsoft® Surface™ (or some other compatible surface computing platform), and the like.

The location where this device could be installed depends upon its form and function for game play. For example, if the game element reader 36 is an iShoe™, it could be located on the table surface in proximity to the dealer. However, if the game element reader 36 is the Microsoft® Surface™, then it could be the table/playing surface 24 itself. Once a game element 26 has been read by the game element reader 36, the reader could create an electronic data packet, which could contain, but not be limited to, pertinent game information (e.g., a card's value and suit as it is being removed from a shoe [e.g., the iShoe™], the spot on which a ball landed on the roulette wheel, the displayed pips of a rolled die/dice, and the like) and a date and time stamp of exactly when the game element 26 had been read by the game element reader 36. This data packet could then be transmitted, in real time, to the computer system 38 for processing/analyzing/storing and/or retrieving. Through the computer system 38, this data could be transferred to/from the electronic gaming table 22 to/from a different electronic gaming table 22 or to one or more electronic table game systems 20 at one or more gaming establishments located locally or across the world.

The game element reader 36 may also incorporate additional capabilities such as surface computing technology (e.g. the Microsoft® Surface™) to obtain/scan and/or create data from items placed proximate to the device (e.g., read smart cards, player's club card, a coupon bar-coded cards, paper or coin currency, a ticket [e.g., ticket-in/ticket-out ticket] and the like). The reader could then send this data to the computer system 38, at which, time the computer system 38 could respond appropriately. Furthermore, surface computing technology (e.g., Microsoft® Surface™) could be adapted to take various forms (e.g., the roulette wheel could either be partially or wholly composed of surface computing technology in order to scan the speed, direction, and/or final landing spot [and the like] of the ball and then transmit this data to the computer system 38 for processing/analyzing/storing/retrieval purposes and/or debiting/crediting players' accounts and the like).

If the game element reader 36 is further equipped with a date/time stamp 72 (e.g., a means of producing a date and time stamp of the type that is well known by those who have ordinary skill in the art), then the game element reader 36 could further transmit to the computer system 38 the date and the time (e.g., Greenwich Mean Time, also referred to as Greenwich Meridian Time) of significant events relating to activities in which the game element(s) 26 are used such as, but not be limited to, when a card is removed from the shoe (e.g., read and drawn), when a pair of dice has landed on a craps table, when a ball lands on a specific spot on a roulette wheel, and/or the like. This date and time stamp information could be used, processed/analyzed/stored and/or retrieved by the computer system 38 (e.g., the server[s]) for various purposes.

For example, if a single/multi-tier progressive bonus jackpot (and/or other bonuses, complementary items ["comps"] and the like) with or without a cap is provided to players of an electronic gaming table 22, this date and time stamp data (along with other data such as, but not necessarily be limited to; the information a player has given regarding his/her specific wager; the date and time stamp of when a pair of dice has been recorded on a craps table, when a ball lands on a specific spot on a roulette wheel, the exact moment when a dealer has dealt a specific card to a player, and the like) could be crucial information for the operator of this invention 10 to verify the existence of an undisputed winner among multiple potential winning players who have achieved the predetermined winning criteria of a single/multi-tier progressive bonus jackpot with or without a cap within the same timeframe. In such of an event, the operator of this invention 10 could access this data from the computer system 38 (e.g., the server) and, in a quick and efficient manner, determine which player obtained the predetermined winning criteria first to resolve any player disputes.

As substantially shown in FIGS. 4, 9, 10, 11, 12, and 13, the player's electronic interface 30, in at least one embodiment of the invention 10, could be a touch screen 48 similar to the dealer's electronic interface 30. The player's electronic interface(s) 32 could be placed proximate to the playing surface 24 (e.g., be flush with the top of the playing surface 24 and located where players could normally position themselves at the gaming table). The dealer's electronic interface 30 could be connected to the computer system 38 to generally allow the computer system 38 to process data regarding player identification, wager information and the like.

The player's electronic interface 30, with suitable programming of the computer system 38 could feature and display functional buttons 50, icons 52, and the like for the computer illiterate and/or for data entry accuracy/expediency. By pressing a button/icon 50, 52 and the like, these player's electronic interfaces 32 could give players the ability to: place wagers (e.g., bets) using electronic game play credits; place one or more wagers at once (e.g., on non-card game tables [e.g., craps, roulette and the like] the player has the ability to place a large number of bets for each round); play one or more hands at once 76; repeat a wager without having to manually type in the amount 78; cashout 74 (e.g., receiving a ticket-in/ticket-out ticket for a partial or full amount 82, transferring the funds to one or more smart cards 80, printing out a monetary reward [e.g., a "tip"] for the dealer, the cocktail waitress, and/or the valet attendant, and the like); obtain gaming/wagering help (which could allow the player to access information about the game [e.g., house rules, how to play/place bets, and the like]); play banker (which could allow the player to play the part of the banker [e.g., the dealer] if certain criteria has been met); place insurance (which could allow the player to purchase insurance in the case that the dealer has been dealt blackjack) 90; make a split 92 (which could allow the player, in the game of blackjack, to split his or her cards into two or more hands providing the house rules allow it); double down a bet (which could allow the player, in blackjack, to double his or her bet in accordance with house rules); play a number of hands (which could allow the player to play multiple hands at one time at the same table); provide a tip for the dealer (which could allow the player to give the dealer a monetary reward [e.g., a "tip"] in the form of a ticket-in/ticket-out ticket/coupon/electronic game play credits which can then be redeemed for currency at the gaming establishment's cashier); place a bet as off 94 (which could allow a player in craps to remove a specific bet off of the playing surface 24 in accordance with house rules); monitor player's credit 96 (a credit counter, which could provide the player the visual [or audible] means of determining how many electronic game play credits he/she has in their account); bet as dealer 100 (which, in baccarat, could allow a player to bet on the dealer); bet as player 98 (which, in baccarat, could allow a player in to bet on the player); bet on tie 102 (which, in baccarat, could allow a player to bet that the dealer and the player's hand will tie).

Other button options (e.g., an "other options" button) could allow the player to participate in non-gaming activities such as, but limited to: ordering drinks from the bar 106; printing out a monetary reward (e.g., a "tip") for the cocktail waitress in the form of a ticket/coupon/electronic game play credits 108; placing restaurant reservations within the gaming establishment; obtain comps and incentives 110; make hotel accommodations 112; buy show and sporting events tickets 116; order retrieval of the player's car from valet 114; printing out a monetary reward (e.g., a "tip") for valet in the form of a ticket/coupon/electronic game play credits; and the like. In this manner, the player may not need to leave the gaming table to conduct such non-gaming-related activities.

The player's electronic interface 32 could receive data from the computer system 38 concerning, but not be limited to, gaming establishment information sent to the individual player about offers (e.g., "teaser advertisements") or actual receipt of services, bonuses, comps, prizes, enticements, gratuities, and the like.

Other data the player's electronic interface 32 could collect could include, but not necessarily be limited to, data about the players that the gaming establishment could collect and subsequently data mine such as: player wagering (e.g., history and patterns); gaming preferences; behavioral gaming patterns; buying patterns; and the like. In this manner, the gaming establishment could receive through the invention 10 a tremendous amount of information regarding the player (and, in a networked system situation, a vast number of players) that the computer system 38 could record and/or process into a data base that could be subsequently used by the gaming establishment or other operators to make its operations more efficient and profitable.

As substantially shown in FIGS. 16, 17, 18, and 19, the invention 10 could utilize a surface-computing platform (e.g., Microsoft® Surface™ or other surface-computing platforms and the like) to wherein the entire playing surface 24 could be an touch screen 48 which could then allow the dealer's electronic interface 30 to be part of, integral to, the playing surface 24 without having to install separate electronic interfaces as individual electronic devices for each of the individual players. Various embodiments of the dealer's electronic interface 30 could feature, but not be limited to, such elements as: visual/audible indicators (e.g. error messages [e.g., out of order, please bet the minimum bet, and the like]; statistical data displays [e.g., how many comp points the player has been awarded by the gaming establishment and the like]; and customizable art displays/and or screensavers. Other elements may include, but not be limited to: radio frequency identification (RFID) implementations; biometric interfaces, which could offer unique identifying security measures (e.g., unique identifiers could include, but not be limited to, fingerprints, hand geometry, earlobe geometry, retina and iris patterns, voice waves, DNA, and signatures which could allow for almost instantaneous personal identification that could be used separately, as a pair, or three or more collectively); and the like. These elements could allow the player's electronic interface 32 to become very automated so that, rather than having a player manually inputting information; the player's actions/thoughts/eye motions/and the like could be automatically read by the electronic player interface and subsequently translated into an electronic format to which the computer system 38 could respond appropriately (e.g., the Microsoft® Surface™ could scan currency as it is placed on the table and, if appropriate, based on the dealer's indications, the computer system 38 could convert it into electronic game play credits and attribute those credits to the correct player's account.

In at least one embodiment where the playing surface 24 could be touch screen 48 enabled through the computer system 30 with one or more surface computing platforms (e.g., Microsoft® Surface™ and the like), the playing surface 24 could be assigned into sections, wherein a section could be given functionality, such as the dealer's electronic interface 30. In this manner, the dealer's electronic interface 30, the player's electronic interface 32, the game element reader 36, the player's monetary device 34, and the like, could be built (and displayed) into the playing surface 24 itself. For example, a surface computing platform (e.g., Microsoft® Surface™ and the like) first could serve as the gaming table's actual playing surface 24 (e.g., presenting indicia and programmed for the games of craps, roulette, blackjack, and the like) while the second surface computing platform (e.g., Microsoft® Surface™ and the like) could be located on the lip of the table. The second surface computing platforms (e.g., Microsoft® Surface™ and the like) could serve as the player's electronic interface 32 as well as the player's monetary device 34. The second surface computing platform, located on the lip of the table, could have the same functionality and options as the previously described for providing one or more player's electronic interface 32 and one or more player's monetary devices 34. In this manner, the computer system 38 could be programmed to alter the displays of the playing surface 24 (utilizing server based technology), thus changing the type of table games (e.g., from a blackjack format to a pai gow format) that could be presented on the electronic gaming table 22.

Figure 20:
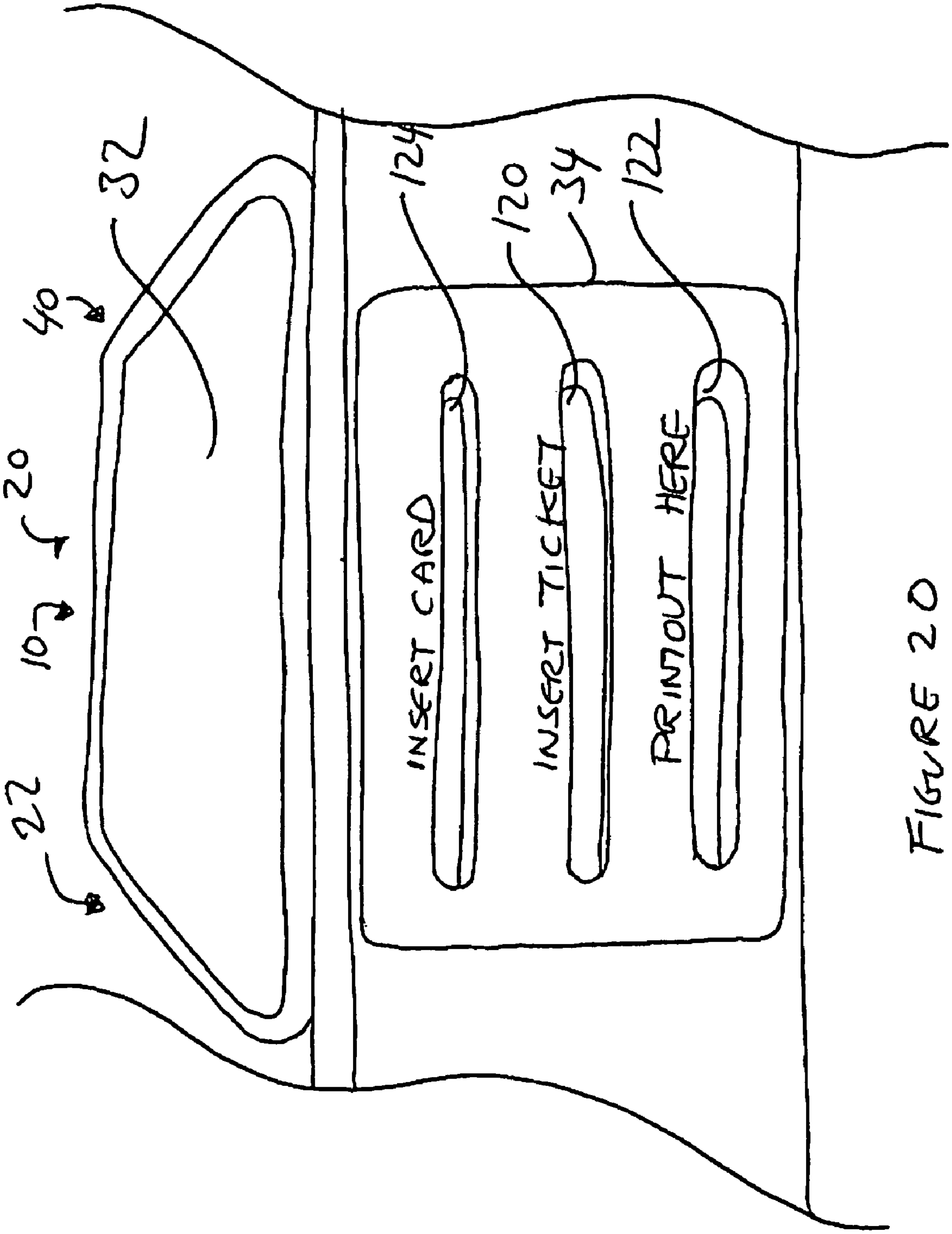
FIG. 20 is substantially shows a view of the player's monetary device.
Figure 24:
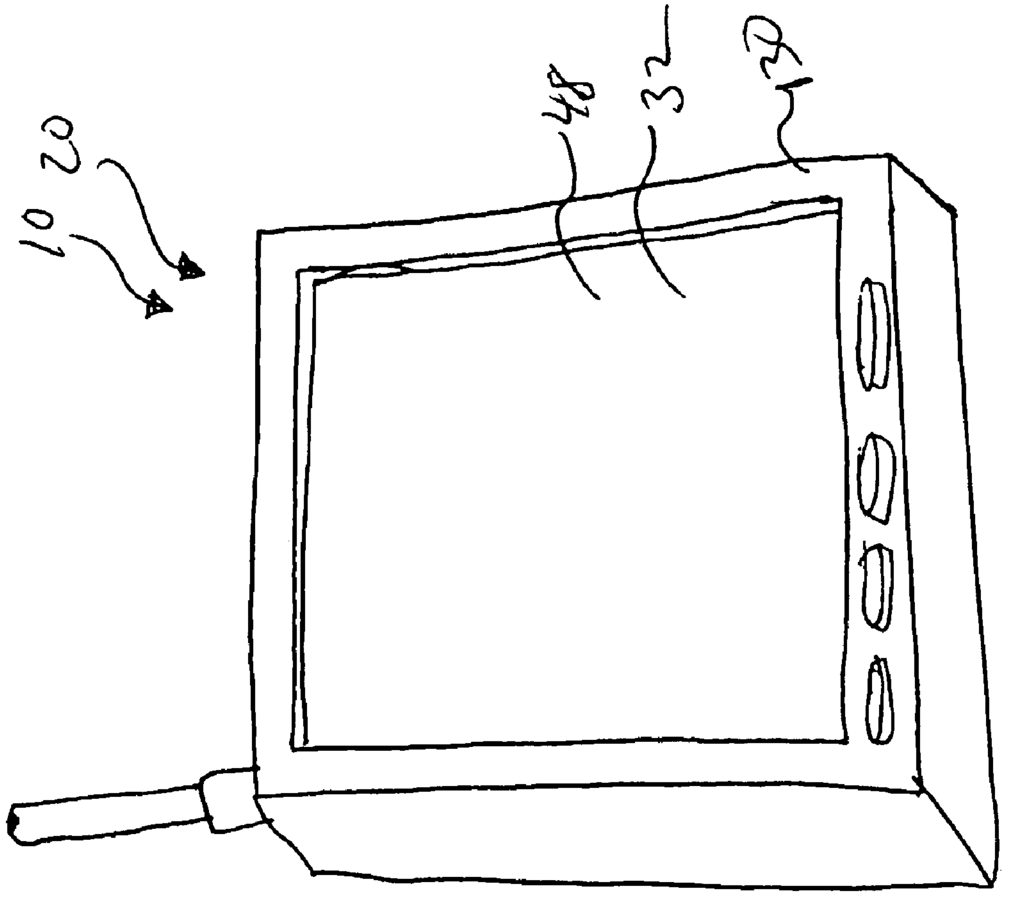
FIG. 24 is substantially shows the communication means.

As substantially shown in FIG. 20, the player's monetary device 34 could include, but should not be limited to, a bill/gaming ticket acceptor (e.g., ticket-in-ticket-out ticket); a printer (for issuing coupons, tickets, receipts, and the like), a card reader device that could accept smart cards (e.g., a smart card being a card wherein data is stored upon the card's embedded integrated circuit), player's club cards, and currency (to generally speed up the process of converting currency into an electronic format known as game play credits). The one or more player's monetary devices 34 could be installed in proximity of the player's electronic interface 32 (e.g., next to it, beneath it, and the like) relative to the table structure.

The player's monetary device 34 could handle several processes including, but not be limited to, the ability to: cashout 74 with full or partial amounts; transfer funds to various medias (e.g., other smart cards, various types of tickets and coupons, and the like); print monetary reward (e.g., "tip") tickets; printing reservation tickets and receipts; printing inner-casino commerce coupons; accepting valet tickets for the purpose of vehicle retrieval; and the like.

The player's monetary device 34 could be connected to the computer system 38, and the computer system 38 could be programmed to generally allow the player's electronic interface 32 to be able to display electronic game play credits available for the player, which could used for; wagering purposes (and the like), the electronic means for cashing out, and to provide players the ability to utilize their player's club card or smart card in the same manner as they currently do at an electronic gaming machine (e.g., they could now have the ability to insert their card and begin game play rather than insisting the dealer stop game play in order to let the pit boss insert their card at a centralized pit terminal).

The invention 10, by enabling the player with self-service activities (e.g., print coupons, comps, monetary reward (tip) tickets, valet tickets, cashout [e.g., ticket-in/ticket-out ticket or smart card], and/or transfer funds to other smart cards, etc. at will) could alleviate the dealer from doing so, thus relieving the gaming establishment of the cost of providing such manpower for such services. Furthermore, all the player's activities involving the player's monetary device 34 could be used to generate data about the player that in turn could be processed/analyzed/stored and/or retrieved by the computer system 38.

The player's monetary devices 34 could be constructed to incorporate the capabilities of a surface computing platform (e.g., the Microsoft® Surface™ and the like) that could scan currency as it is placed on the playing surface 24 of the table structure. Based on the dealer's commands inputted through to the computer system 38, the invention 10 could electronically exchange this currency (with the dealer retaining the tendered currency) for electronic game play credits. The dealer's commands could cause the invention 10 to attribute those credits to the tendering player's account.

The surface computing platform as incorporated into the player's monetary device 34 could also scan other items (e.g., a player's club card, a smart card, a coupon, a ticket [e.g., ticket-in/ticket-out ticket]; and the like) and send this data to the computer system 38 which in turn could react with the appropriate response to the correct player. The player's monetary device 34 could also have the elements of radio-frequency identification (RFID) capability incorporated into the player/smart card systems.

A substantially shown in FIG. 21, the invention 10 could further be comprised of a wireless gaming device 130 (e.g., hand-held) with a touch screen 48 that could support a player's electronic interface 32 that could allow one or more players to remotely participate in the wagering occurring at an electronic gaming table 22. The wireless gaming device 130 could communicate through a wireless modem (or other electronic device[s]) connected to the computer system 38. This capability could allow a player, somewhere in the gaming establishment (or in other areas that permit gaming according to jurisdictional gaming laws and regulations), to generally remotely observe and possibly directly engage in wagering on a player-selected electronic gaming table 22 (e.g., craps, roulette, and the like). The wireless gaming device 130 could be any suitable hand-held wireless gaming device 130 or wireless personal digital assistant (PDA) with the ability to support the player's electronic interface 32, and the like.

The wireless gaming device 130, through its player's electronic interface 32 could be configured with suitable computer system 38 programming to generally include a listing of all electronic gaming tables 22 throughout one or more gaming establishments with a number assigned to each gaming table. Upon looking up a specific table number, the player could sign onto (e.g., by swiping a smart card and the like) an electronic gaming table 22. The wireless gaming device 130 with a player's electronic interface 32 could then automatically display the indicia of the chosen electronic gaming table 22 along with the player's electronic game play credits. The player could then place a wager remotely through the player's electronic interface 32.

It is possible that the invention 10 could be configured so that the remote wagering done through the wireless gaming device 130 be conducted so as generally not to disrupt the actual game play, and the computer system 38 could be tasked to generally process the crediting and debiting of the remote players' accounts automatically. Depending on the configuration and implementation, the electronic table game (e.g., the playing surface 24 being a surface computing platform [e.g., Microsoft® Surface™ and the like]) that the remote player is wagering upon, may or may not display these remote bets. The wagering and table game play taking place through these wireless gaming device 130*s* could be subject to normal game play and house rules (e.g., starting and stopping of wagering periods and the like). Furthermore, the wireless gaming device's (with a player's electronic interface 32) software could be adapted so that it is in compliance with local, jurisdictional, state, and national gaming laws and regulations (e.g., a jurisdiction could possibly forbid automatic repetitive betting on hand-held, wireless electronic device with a player's electronic interface 32 and the like). The setup, programming, and components of these wireless gaming devices 130 with a player's electronic interface 32 could be determined by any person who has ordinary skill in the art.

Computer System 38

Figure 22:
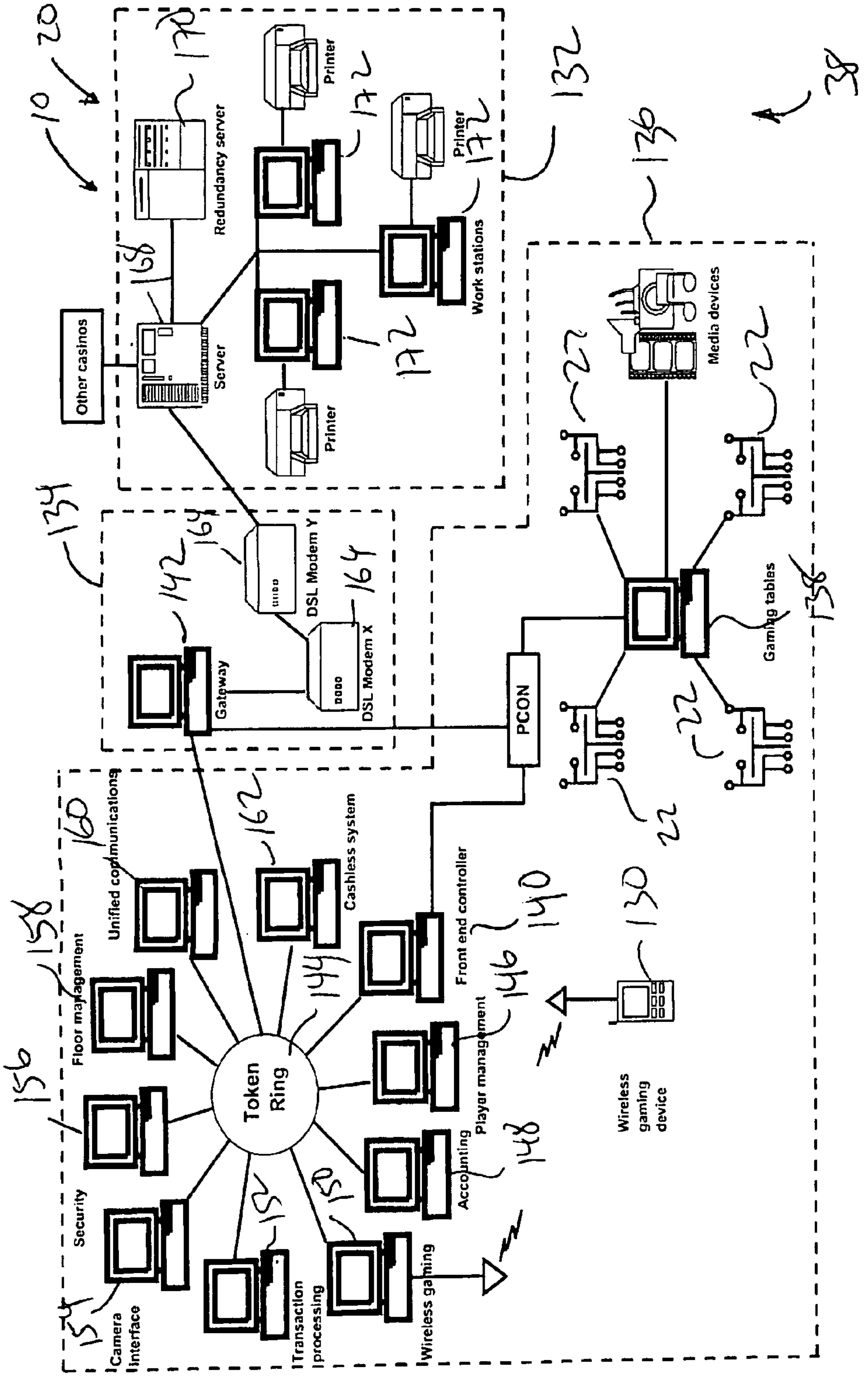
FIG. 22 is substantially shows a schematic of the computing system.
Figure 23:
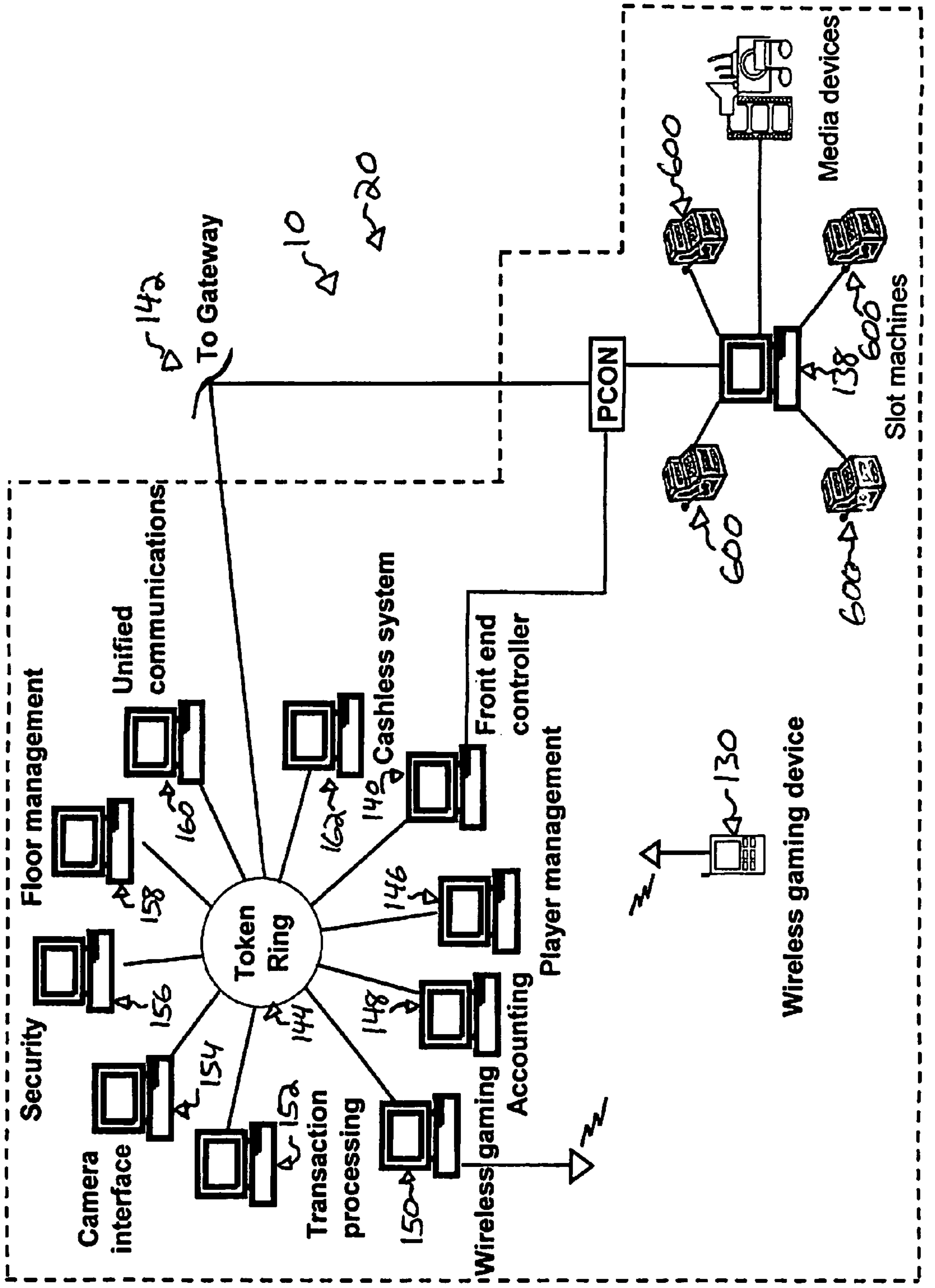
FIGS. 23 and 23A are substantially showing a schematic of the computing system.
Figure 23A:
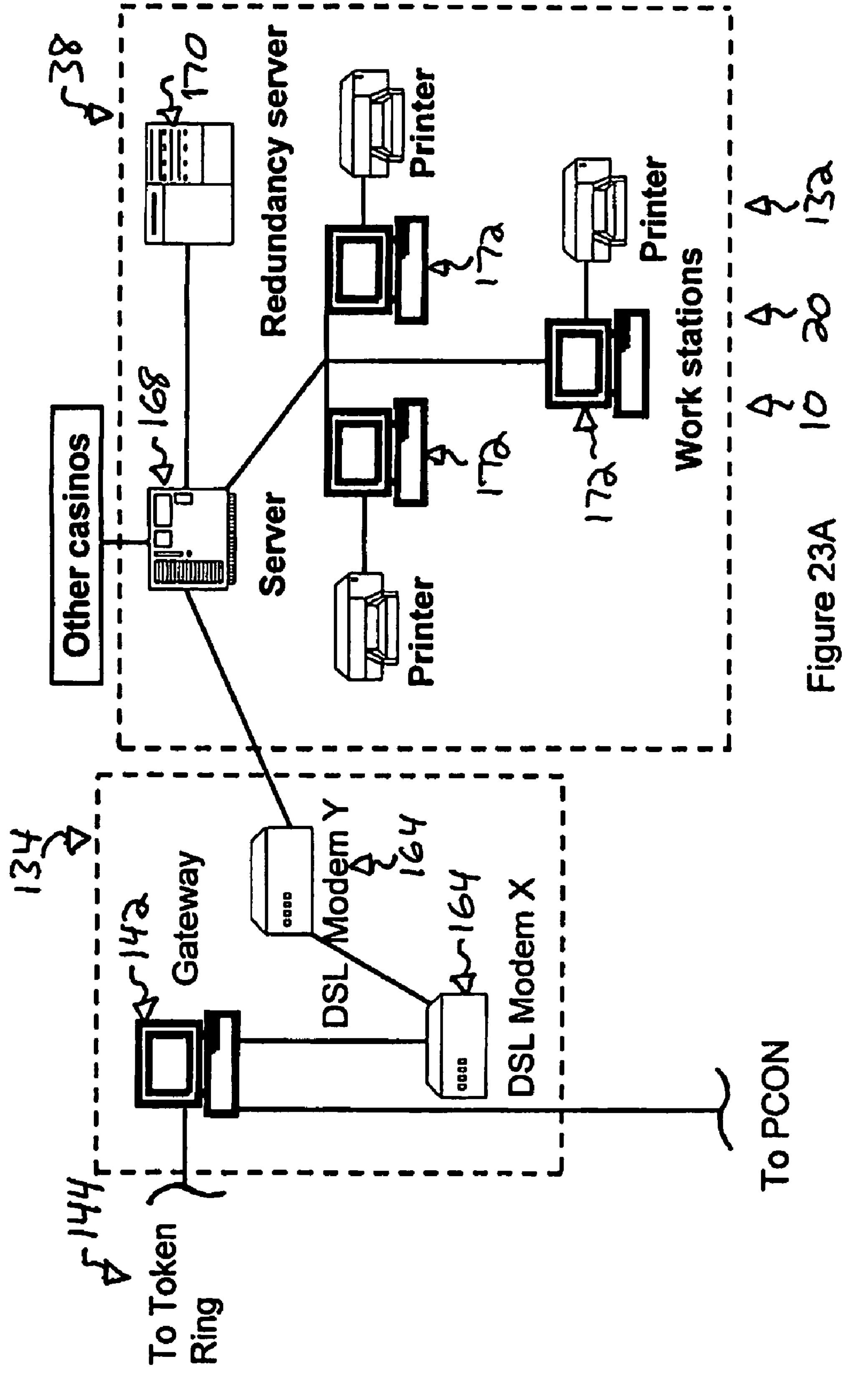
Figure 24:
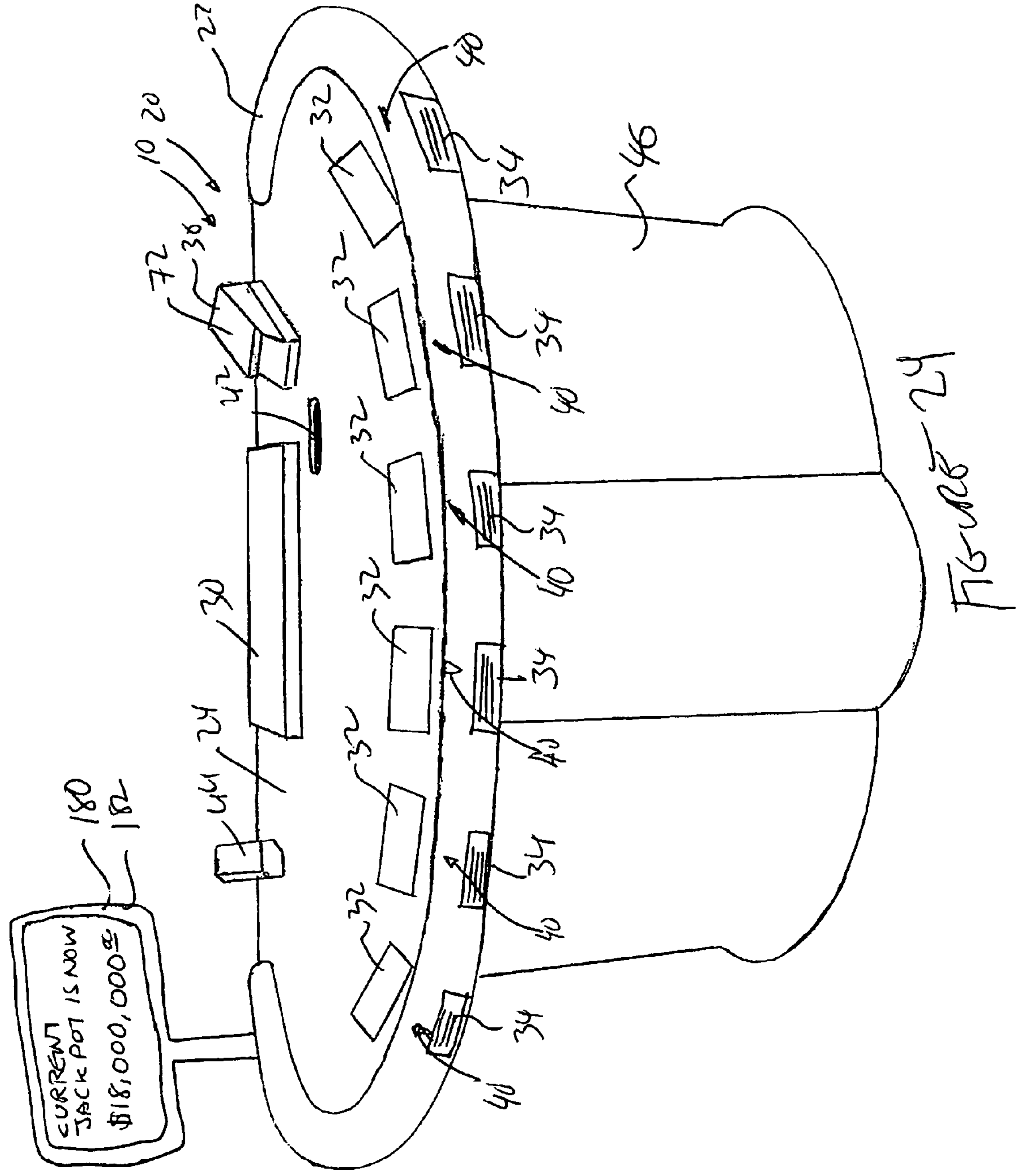

As substantially shown in FIGS. 22 and 23, 23A, the dealer's electronic interface 30, the player's electronic interface 32, the game element reader 36, and the player's monetary device 34, while used to communicate gaming information to one another on a table game could be connected to the computer system 38. This computer system 38 could be comprised of many electronic computer parts, which could create the network comprised of central processing system 132, gateway system 134 and a casino system 136 linked together. This network could begin with the casino system 136 comprising of the electronic gaming tables 22 being networked to a workstation's PC located in the one or more casino's pits and could be accessed by one or more pit bosses or other authorized gaming personnel. These electronic table games 22 and workstations 138 could be transmitting and receiving data to and from the front end controller 140 and gateway 142 of the computer system 38. The front end controller 140 could then transmit data to the computer system 38's token ring 144; the gateway 142 could transmit data to the operator's centralized computer system 132 (e.g., server) essentially at the same time. The token ring 144 could then be receiving data from not only the front end controller 140 but other servers as well. These servers could include, but not be limited to: the player management 146, accounting 148, wireless gaming 150, transaction processing 152, camera interface 154, security 156, floor management 158, unified communications 160, and a cashless system 162. The token ring 144 could be utilized as a very valuable tool in aiding the gaming establishment with system communication. This casino system 136 portion of the computer system 38 could be located in each gaming establishment, (for legal and security reasons) isolated from the gaming floor which could further communicate with the operator's computer system 38's server via a modem 164, gateway or other electronic computing devices.

The gateway 142 could allow communication from the token ring 144 directly to the operator's central processing system 132. This central processing system 132 could comprise of one or more server, such a main server 168 and redundancy server 170) connected to several work stations 172. This system 132 could be configured to allow the gateway system 134 to communicate directly with the main server 168 or the redundant server 170 and/or the operator's via a modem or other electronic computing devices. The operator's central processing system 132 could carry out many functions, such as, but not be limited to, control and the facilitation of the various modes of the single/multi-tier progressive bonus jackpot, with or without a cap. These modes could include, but not be limited to: operating the regular winning cycle mode, the first and second phase of the cap winning cycle mode and both predetermined winning criteria and the timed predetermined winning criteria.

Other data that could be transmitted to the token ring 144 could be the data from all wireless gaming devices 130 located throughout the gaming establishment. This data could first be received via the wireless gaming server 150 and then onto the token ring 144. Those who have ordinary skill in the art could implement the components, configuration, and networking of these electronic gaming tables 22 and electronic computing devices.

The physical components of the operator's central processing 132 could be (for legal and security reasons) located remotely and securely from the gaming establishment in a centralized location (e.g., the operator's central control center In such an embodiment, the electronic gaming tables 22 of this computer system 38 may be limited to only the necessary power as is needed to the run the electronic devices of the individual electronic gaming tables 22. In addition, in such an embodiment, the electronic gaming tables 22 may be limited to only the necessary power as is needed to run them. The computer system 38 equipment could then, while having the power to process, analyze, store, and/or retrieve the system(s) data, could simultaneously have the ability/power to run all of the system's necessary components along with normal gaming functions. The configuration of the computer system 38 could be highly redundant and may have remote management and remote reporting capabilities.

Furthermore, the computer system 38 could be open protocol, system-ready products, readily interfacing with other open protocols, system-ready products using either Game-to-System (G2S) protocol, System-to-System (S2S) protocol, and/or any other suitable protocol and the like—whatever protocol(s) and products that may be deemed appropriate as defined by the Gaming Standards Association (GSA), the Gaming Control Board (GCB), and/or other gaming jurisdictions/governing bodies. The components, configuration, and networking of the computer system 38 could be implemented by those who have ordinary skill in the art.

The invention's computer system 38 could have the ability to collect an unlimited amount of data from either some or all of its elements and convert the data into a format in which it could be processed (e.g., either in real-time or at a later date). The computer system 38 could further have the ability to upload, download, and/or save this data. This data could originate from either game play, non-game play (e.g., comps, bonuses, etc.), and wagering, and this data could be of that directly occurring at one or more electronic gaming tables 22 networked to the computer system 38, the single/multi-tier progressive bonus jackpot system(s), and/or any other form of gaming and wagering technologies that may be adaptable in light of the current invention 10. The invention 10 could also perform all of the normal computer data processing functions known to those who have ordinary skill in the art.

At least one or more embodiments of the invention's computer system 38 could utilize one or more several applications that may enable data mining. The computer system 38 could be configured and programmed to collect various types of data for the purpose of this data mining. This data could include/measure/be related to, but not be limited to: players' actions that are not directly related to wagering (e.g., how many times players play more than one hand at a card game table); wagering; historical game play; individual player's wagering habits; player's club card use; smart card use; what types of games players are preferring; player likes/dislikes; general player demographics; inner-gaming establishment commerce; the performance of gaming tables (individually and collectively); the gaming action of gaming tables (e.g., identifying overall operational patterns; compare and contrast theoretical and actual gaming probabilities; and the like); players' (individually and collectively) gaming behavior; how many gaming tables and the like are played per definite time period; how the players' demographics (e.g., age, race, etc, and whether they are local, tourists, or attending a convention, etc,) affect their playing habits; how many beverages (e.g., alcohol drinks) are consumed per player; total percentage of customers that use valet parking, restaurants, and other gaming establishment services; how often the single/multi-tier progressive bonus jackpot(s) is(are) won; if a winnings cap is placed on the single/multi-tier progressive bonus jackpot, how often the cap is reached; how long it takes to hit the single/multi-tier progressive bonus jackpot; how long it takes to hit a jackpot after its cap (if any) is reached; how many of the various dealt playing card combinations occur during a distinct time period; how player(s) played each hand during certain hand scenarios (e.g., did the player split a hand when they had the opportunity); what percentage of players have been counting cards (and who these players are [e.g., associated demographics]); how long game elements 26 last (e.g., the lifespan of a deck of cards, a ball, a pair of dice, etc.); how to calculate the total profit and total loss on all gaming tables during set time intervals; how to issue the appropriate tax requirement paperwork to players who legally must file with the Internal Revenue Service; how often players use the table to purchase show tickets/sporting events or hotel rooms; how to accurately measure the amount of comps/gratuities that are awarded to players by gaming establishment employees in relation to game play time; monitoring craps or roulette games for what numbers are bet on the most or the least; and the like.

The computer system 38 could have several custom applications that could aid the gaming establishment in analyzing this data in order to find trends and patterns. These same applications could also produce customized and/or standardized reports in various formats (e.g., both paper and electronic) and displays, whose resultant analysis could be accessible by various programs. These custom applications and reports are well known to those who are skilled in the art of data mining and analysis. One of the many results of this data mining and analysis could be, but not be limited to: aiding the gaming establishments to find ways of improving their environments to make them more exciting for the player and therefore more profitable for the establishments; identifying traditional and unique marketing opportunities; aiding gaming establishments in identifying cheaters and/or card counters; and the like.

This invention 10 could have but not be limited to the following capabilities: the capability to connect with other devices, programs, servers, systems, networks, data integration; and the like as needed. Through these capabilities, this invention 10 could import, export, store, retrieve, process, analyze, and share data as deemed necessary. These system connectivity, data integration, and data manipulation capabilities are well within the knowledge of persons having ordinary skill in the art.

Dealer's Electronic Interface examples

At least one possible embodiment of the invention 10 could have the dealer's electronic interfaces 30 be used on any electronic gaming table 22 where the game element 26 is playing cards (e.g., blackjack, pai-gow, baccarat, poker, and the like), could be of any type (e.g., style, look, color, and the like) used by any electronic gaming table 22 today (and (if necessary) could be fitted (e.g., programmed, designed, and the like by those with ordinary skill in the art) to accommodate the dealer so the dealer could interact with the computer system 38 to input data while facilitating an electronic gaming table 22 where playing cards are the game element 26 without interrupting or slowing down the flow of the gaming table's play. While the possibilities of how the dealer's electronic interface 30 could look and feel are almost endless (and by no means to be construed as limiting in any one specific design), this embodiment will attempt to describe one possible look, feel, and/or design of a dealer's electronic interface 30 that could be utilized on electronic gaming tables 22 where the game element 26 could be playing cards (e.g., blackjack, pai-gow, baccarat, poker, and the like).

For example, one possible illustration of what features, buttons 50, icons 52 (and the like) a dealer's electronic interface 30 could have, but may not be limited to, includes one or more clusters of buttons 50 (e.g., an animated box-like figure containing buttons 50 and/or icons 52 illustrating the number of hands [e.g., a player could play more than one hand during the same game] each player could play at any one single point of time during a round of play and the like); a number display for each player indicating that player's location (or position 40) on the electronic gaming table 22, which could be limitless depending on the design of the electronic gaming table 22; and possible hand combinations (e.g., if a player splits a hand or decides to play more than one hand, this information could be displayed on the dealer's interface).

Figure 5:
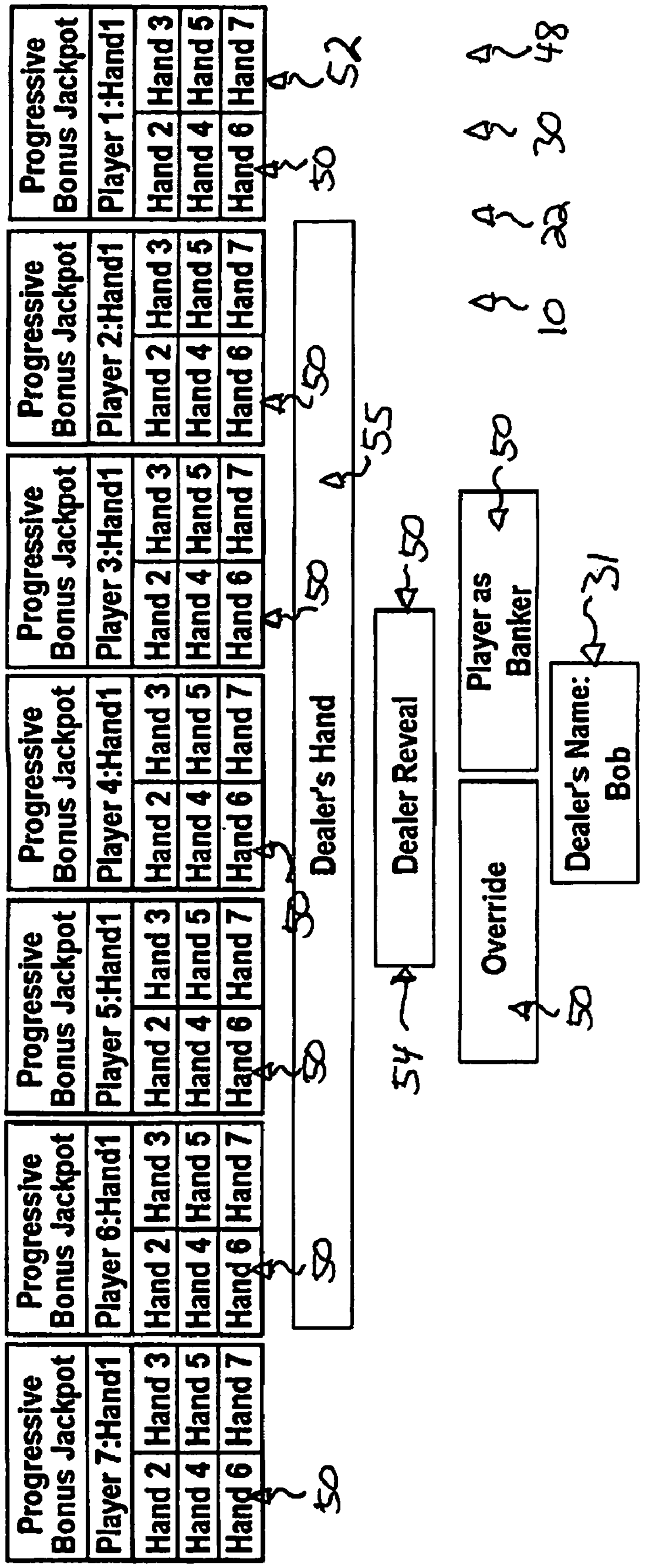
FIG. 5 is substantially pai gow and baccarat embodiments of the dealer's electronic interface.
Figure 5A:
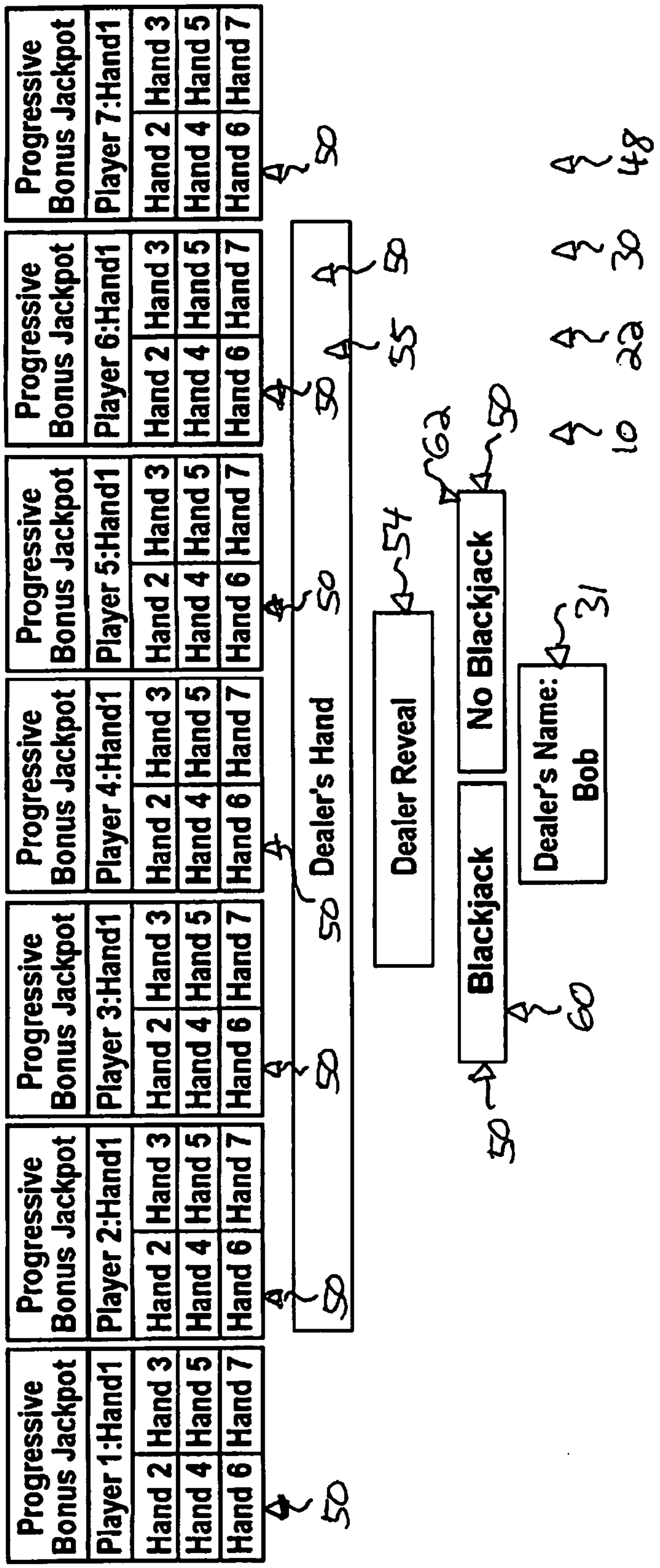
FIG. 5A is substantially blackjack embodiment of the dealer's electronic interface.

These buttons 50/and or icons 52 could also be used to indicate to which player the playing cards were dealt: one of these clusters of buttons 50 could be operated by first pressing one of these buttons 50 (or icons 52) (e.g., player 1, hand 1—see FIG. 5) before removing a card from the shoe and then dealing it to that specific player for one or more specific hand(s). This action (along with the data collected from the electronic shoe [e.g., the Shufflemaster® iShoe™ and the like] as the playing cards are removed and dealt) could allow the computer system 38 to record which player(s) have been dealt a specific card. A "dealer's hand" button 55 (e.g., an icon and the like) could be used to assist the dealer with recording information to tell the computer system 38 that the next card to be removed from the electronic shoe (e.g., the Shufflemaster® iShoe™ and the like) will go to the dealer.

The dealer's electronic interface 30 could have a "dealer reveal" button 55 (e.g., an icon and the like), which could allow the dealer to send the computer system 38 two important pieces of information: first, that the player(s) at the electronic gaming table 22 have completed their hand(s) and two, that the dealer is now ready to reveal his face down card to complete the round of the hand. The "dealer reveal" button 54 could prevent the computer system 38 from prematurely crediting or debiting the player(s) accounts before the hand is over. Once the dealer has pressed the "dealer reveal" button 54 (e.g., the icon and the like), the dealer could then reveal his/her face down card. If, after the dealer has revealed his/her face down card, the dealer needs one or more cards to complete the round of game play, the dealer could use the "dealer's hand" button 55 (e.g., an icon and the like) to (once again) indicate to the computer system 38 that the next card to be removed from the electronic shoe (e.g., the Shufflemaster® iShoe™ and the like) will go to the dealer.

The cluster of buttons 50 (e.g., icons 52 and the like) to designate a player's position could be arranged along the top half and/or the middle of the screen. These buttons 50 (e.g., an icon and the like) could be large enough in both size and font to make finding and pressing/touching them easy and efficient for the dealer. The location of the remaining buttons 50 (e.g., icons 52 and the like), (e.g., "dealer hand," "dealer reveal," and other possible buttons 50 [e.g., icons 52 and the like] as needed) could all be placed some where beneath (and/or in proximity to) the cluster of buttons 50 (e.g., icons 52 and the like) on the dealer's electronic interface 30.

For example, in the embodiment designed for the play and wagering of blackjack, two more buttons 50 (e.g., an icon and the like) could be added to the host of other buttons 50, icons 52, and the like to allow the dealer the unique ability to inform the computer system 38 if and when the dealer has been dealt a blackjack with an ace being the face up card. These two buttons 50 (e.g., an icon and the like) could be titled "blackjack" 60 and/or "No blackjack" 62. These two buttons 50 (e.g., an icon and the like) could be used by the dealer to inform the computer system 38 that, after an ace has been dealt face up for the dealer and after the players have been given the opportunity to purchase table "insurance," the dealer could use these two buttons 50 (e.g., an icon and the like) to inform the electronic gaming table 22 that the dealer has (or has not) been dealt a blackjack (e.g., two playing cards with the total value being no more, or less than 21). The location of the "blackjack" and "no blackjack" buttons 50 [e.g., icons 52 and the like]) could all be placed somewhere beneath (and/or in proximity to) the cluster of buttons 50 (e.g., icons 52 and the like) on the dealer's electronic interface 30.

"Dealer Reveal" 54, "Blackjack" 60, and "No Blackjack" 62 selections can be seen as means to mitigate the final steps to end the hand although the computer system 38 already knows what cards the player(s) and dealer are respectively holding (e.g., the computer system 38 has sufficient information to process the wagers for the round of play).

In another embodiment, the dealer's electronic interfaces 30 that could also be effectively used on any electronic gaming table 22 where the game element 26 may not be playing cards, for example, a pair of dice or a ball (e.g., craps, roulette and the like). These dealer's electronic interfaces 30 could be of any; type, style, look, feel and color, and could be fitted (e.g., programmed, designed, and the like in a manner known by those with ordinary skill in the art) to accommodate the dealer so the dealer could interact with the computer system 38 to input data while facilitating an electronic gaming table 22 where other types of game elements 26 could be used (e.g., a pair of dice for the game of craps, a ball for the game of roulette, and the like) without interrupting or slowing down the flow of the gaming table's play. While the possibilities of how the dealer's electronic interface 30 could look and feel are almost endless (and by no means to be construed as limiting in any one specific design), this embodiment will attempt to describe one possible look, feel, and/or design of a dealer's electronic interface 30 that could be utilized on non-playing card electronic gaming tables 22 where the game element 26 could be a pair of dice for the game of craps, a ball for the game of roulette, and the like.

One such example (see FIGS. 6 and 7) of what the dealer's electronic interface 30 for non-card table game could feature buttons 50, icons 52 (and the like) could have, but may not be limited to, includes one or more clusters of buttons 50 (e.g., an animated box-like figure containing buttons 50 and/or icons 52 illustrating a listing of all of the numbers that may be obtained utilizing the one or more game elements 26 (e.g., a pair of dice, a ball, and the like). These numbers could be listed in numerical order. One possible means of utilizing the dealer's electronic interface 30 for the game of craps, roulette, and the like could include pressing one of these buttons 50 after the results of a pair of dice being thrown, the number associated with the final resting spot of a ball on a roulette wheel, and the like. This action could allow the computer system 38 to record the results of when a pair of dice has been thrown in a game of craps, a ball landing on a roulette wheel, and the like. Two "wager lock out" buttons 56 (e.g., an icon and the like): "On" and "Off." These two buttons 50 could be used to assist the dealer in effectively facilitating when players could and could not place bets (e.g., wagers). By pressing one of these two buttons 50, the computer system 38 could send one of two messages to all players on their one or more dealer's electronic interfaces 30 and/or hand held wireless gaming devices 130. The first message or command (which is sent to the computer system 38 when the dealer presses the "On" button/icon) could be that bets (e.g., wagers) may now be allowed and encouraged; the second message (which is sent when the dealer presses the "Off" button/icon) could be that bets (e.g., wagers) are temporarily suspended. This "Off" button could prevent the system from accepting wagers from players after the dealer and the players have seen the results of game play and before a dealer could react by recording the results of game play.

Other options for buttons 50 (e.g., icons 52 and the like) could include "Pit Boss" button 68 which, when pressed, could send a signal to the pit boss in order to inform him or her that the dealer needs assistance. The cluster of buttons 50 (e.g., icons 52 and the like) listing of all of the numbers that may be obtained utilizing the one or more game elements (e.g., a pair of dice, a ball, and the like) could be arranged in the middle of the screen. These buttons 50 (e.g., an icon and the like) could be large enough in both size and font to make finding and pressing/touching them easy and efficient for the dealer. The location of the remaining buttons 50 (e.g., icons 52 and the like) (e.g., "On" or "Off [for the wager lockout]," "Pit Boss," and other possible buttons 50 [e.g., icons 52 and the like] as needed) could all be placed somewhere beneath (and/or in proximity to) the cluster of buttons 50 (e.g., icons 52 and the like) on the dealer's electronic interface 30.

The craps embodiment for the dealer's electronic interface (FIG. 7) could five more buttons 50 (e.g., icons 52 and the like) could be added to the host of other buttons 50, icons 52 and the like, to allow the dealer to inform the computer system 38 (through the point number button 58) what the point number is for the round of play (e.g., the first number the shooter has rolled at the start of the game. This would be the number the shooter will try to roll again). In order for the dealer to indicate to the computer system 38 what the point number will be for the round of game play, the dealer would press/touch the "point number" button 58 on his or her dealer's electronic interface 30 prior to pressing/touching the numbered button/icon 64 associated with that number.

For example, if the shooter has rolled the number 4 for his point number, the dealer would press/touch the "point number" button/icon 58 and then press/touch the number four button/icon 64. This action would then send the point number data to the computer system 38.

Another option of buttons 50 (e.g., an icon and the like) that could be unique to the dealer's electronic interface 30 on a crap table could be buttons 50 and/or icons 52 representing all of the "hard ways 68 (e.g., two 2's, two 3's, two 4' and two 5's)." These four buttons 68 (e.g., an icon and the like) could be used by the dealer to inform the computer system 38 that a pair of dice with the same number on each (e.g., two 2's, two 3's, two 4' and two 5's) have been rolled. These specific buttons 50/icons 52 could allow the computer system 38 to record, credit and/or debit those players who have bet (e.g., wagered) on a combination of dice that can only be rolled one way. The location of the "point number" button 58 and the hard way numbers buttons 66 (could all be placed somewhere beneath (and/or in proximity to) the cluster of buttons 50 (e.g., icons 52 and the like) on the dealer's electronic interface 30.

The location of these dealer's electronic interface 30*s* on any electronic gaming tables 22 that employs playing cards as its game element 26 could be located proximate where the chip tray (the tray that is used to hold casino chips) is currently located. This possible location of the dealer's electronic interfaces 30 could make it easier for the dealer to interact with the dealer's electronic interface 30. The dealer's electronic interfaces 30 that could be utilized on all electronic gaming tables 22 (e.g., blackjack, craps, roulette, pai-gow, baccarat, poker, and the like) could be of any type (e.g., style, look, color, and the like) and could be adapted to allow a player to wager on any possible combination of wagers allowed by the gaming establishment, and, if necessary, could be fitted (e.g., programmed, designed, configured, and the like) to accommodate (e.g., display) the indicia of any non-card gaming table (e.g., craps, roulette, and the like). The programming of these player's electronic interfaces 32 could be adapted or changed based on the requirements of the particular embodiment of the invention 10. These player's electronic interfaces generally allow players to interact with the computer system 38 by processing, recording data concerning: wagering, options, cashing out options, other possible non-gaming options (e.g., making restaurant reservations, purchasing show tickets, making a room reservation, retrieving a vehicle from valet, printing out tip tickets, ordering drinks from the bar, and the like) while allowing a player to enjoy the gaming table's live action without interrupting or slowing down the flow of the gaming table's action. Other functions of the dealer's electronic interface 30 could include, but not be limited to; receiving data from the dealer's electronic interfaces 30 (e.g., when players may or may not be allowed to place a wager, game play results, and the like).

The dealer's electronic interfaces 30 could easily be designed, programmed, configured, and/or installed by those with ordinary skill in the art to allow any and all selections (e.g., data entries) made by any player to be electronically processed/analyzed/stored and/or retrieved by the computer system 38.

Progressive Bonus Jackpot

Figure 25:
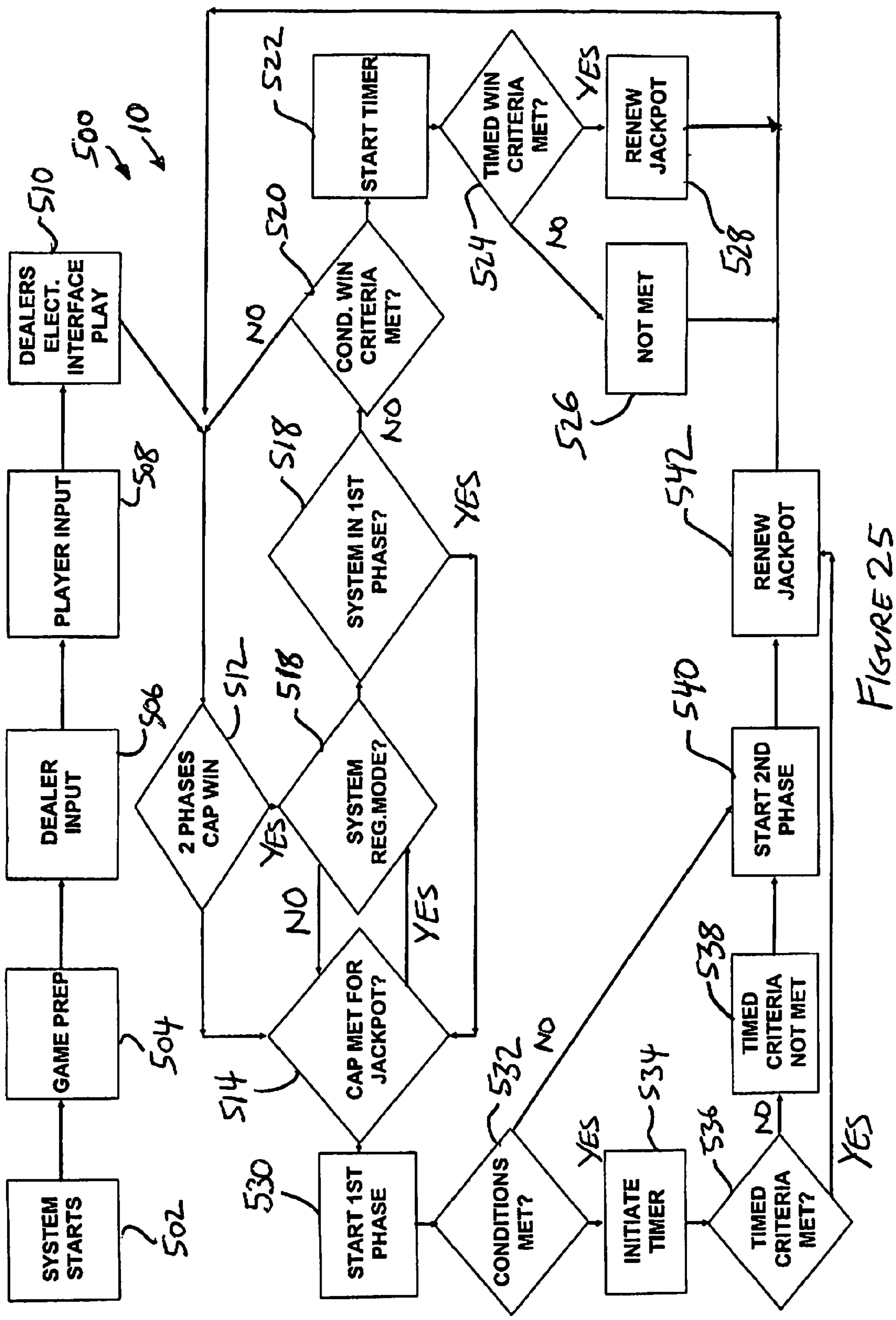
FIG. 25 is substantially shows a flow chart of one embodiment of the invention.

As substantially show in the flowchart of FIG. 25, the invention 10 could provide table games played on dealer run electronic gaming tables 22 with a single/multi-tier progressive bonus jackpot. This formulation of the single/multi-tier progressive bonus jackpot with an electronic table game 22 is substantially made possible due to the fact that this invention 10 provides the various means to: identify the player (e.g., through the player's one or more monetary devices, and the like); identify the amount of electronic game play credits that a player has wagered through the one or more player's electronic interface 32*s*; and verify that the predetermined winning criteria has been met using data which has been transmitted from the one or more dealer's electronic interfaces 30 (which has been entered by a human dealer) or the combination of the game element reader 36 and the one or more dealer's electronic interfaces 30 (which has been entered by a human dealer). This single/multi-tier progressive bonus jackpot feature could be installed either on one electronic gaming table 22, on multiple electric gaming tables 22 within the same gaming establishment, or across many different locations (e.g., either in one country or across multiple countries in accordance with jurisdictional and international laws and regulations).

The programming needed to establish the installation of the single/multi-tier progressive bonus jackpot feature with the electronic gaming tables 22 can be accomplished by those with ordinary skill in the art. The configuration and programming of the computer system 38 for providing the single/multi-tier progressive bonus jackpot feature could be generally analogous in nature to those progressive computer system 38*s* that are currently offered through electronic gaming machines, electronic lottery machines, and the like.

The single/multi-tier progressive bonus jackpot element of the invention 10 generally does not require any type of "side bet" to be eligible to win the single/multi-tier progressive bonus jackpot. In one embodiment of the invention 10, for a player to be eligible to win the single/multi-tier progressive bonus jackpot, all that a player could be required to do is simply place the minimum required bet (or more) needed to play at the electronic gaming table 22. Once that bet is made, the player is automatically eligible to win the single/multi-tier progressive bonus jackpot. Other embodiments could require that the player to first sign up for the gaming establishment's players' club card program and/or smart card program.

To win the invention 10's single/multi-tier progressive bonus jackpot, the player generally must meet a predetermined winning criterion. In the case of card games, a player may be required to win a wager with a predetermined set of cards. In one embodiment, the player wins the wager over this set of cards being dealt to the dealer. The set of cards may also be required to be in a specific order; in one or more hands; be dealt within a specific timeframe; and/or the like.

In the case of non-card games, a player (e.g., in a craps or roulette game) may be required to roll/land game element(s) 26 (e.g. a pair of dice or a ball) on a specific number or set of numbers. This/these number/numbers may be further required to be garnered in a specific order (e.g., if more than one number is to be acquired); in one or more rounds of game play; within a specific timeframe; and/or the like.

To fund the single/multi-tier progressive bonus jackpot (and/or for the payout of other comps, bonuses, etc.), the computer system 38 could be programmed to automatically deduct a percentage of all the monies wagered by the players on either all or some of the establishment's electronic gaming tables 22 of the invention 10. In another embodiment of the invention 10, a percentage of the winnings of the electronic gaming tables 22 located within a gaming establishment could be used to fund the single/multi-tier progressive bonus jackpot (and/or for the payout of other comps, bonuses, etc).

Other embodiments of this invention 10 could have several different versions of the single/multi-tier progressive bonus jackpot system: it could be limited to a single or multiple states, a single or multiple military installations, a single or multiple offshore gaming establishments (e.g., cruise lines, river boats, and the like), single or multiple country/countries; and the like.

One possible embodiment of the invention 10 could feature a single/multi-tier progressive bonus jackpot, with or without a cap could further have one or more communication means 180 could be networked within the computer system 38. This communication means 180, in one version, could be visually based, such as a large electronic sign or display 182 (e.g., a vacuum florescent display (VFD), liquid crystal display (LCD), or any other comparable display device) having a real-time counter display. The communication means 180 could be generally installed in proximity to one or more electronic gaming tables 22 (e.g., electronic gaming table 22 playing area or other areas as desired by the gaming establishment) for the purpose of creating playing interest and to educate the public (e.g., players and potential players) that a single/multi-tier progressive bonus jackpot (with or without a cap) has been introduced to the electronic gaming tables 22.

More specifically this means of communication could be used to communicate and publicly advertise information such as: the current jackpot amount of the single/multi-tier progressive bonus jackpot (with or without a cap); the current winning criteria (e.g., any requirement) to be achieved by the dealer, the player, and/or both (at the same time) for the player to win the single/multi-tier progressive bonus jackpot during normal game play; whether or not a cap has been introduced to the single/multi-tier progressive bonus jackpot; the current winning criteria for the player(s) during the 100 million dollar cap playoff; the amount needed to reach the 100 million dollar cap; the projected/estimated time until the 100 million dollar cap could be reached; the estimated date and time of when the odds for the 100 million cap may be changed in favor of the player; the names and faces of previous winners of the single/multi-tier progressive bonus jackpot (with or without a cap); and any advertising campaigns that could be associated with the gaming establishment (e.g., special comps, 2 for 1 show tickets, restaurants specials, special room rates, upcoming sporting/special events, etc.).

In addition to the visual communication means 180 such as signage, the gaming establishment may install audible alarms, flashing lights, balloon release mechanisms, and the like which is networked to the computer system 38 in order to draw more attention to single/multi-tier progressive bonus jackpot-related events, award winners, and other celebratory occasions concerning the operation of the invention 10 and such.

The single/multi-tier progressive bonus jackpot embodiment of the invention 10 could further offer a predetermined cap (and the like), the cap generally being a predetermined limit as to the amount that the single/multi-tier progressive bonus jackpot could reach. The purpose of the cap feature could be threefold: first, it could limit the amount of funds awarded to a winning player or pool of players; two, it could provide the operator with the funds collected by the surplus account (after the cap is reached); to possibly fund the next single/multi-tier progressive bonus jackpot; and three, it could allow the operator to possibly electronically alter the odds of winning (in favor of the player) the single/multi-tier progressive bonus jackpot (in accordance with jurisdictional laws and regulations) (e.g., lowering the payback odds from 40 to 1 to 7 to 1) in such a way as to favor the players more so than the single/multi-tier progressive bonus jackpot without the cap. This cap embodiment of the invention 10 could then award the single/multi-tier progressive bonus jackpot sooner rather than later, which in turn could increase the game play urgency, player participation, and player excitement for the invention 10.

In operation, the implementation of the single/multi-tier progressive bonus jackpot could require that the computer system 38 be programmed or otherwise modified to credit a small percentage of each wager placed by a table game player (also, as noted above, the operator of the invention 10 could limit the participation in the single/multi-tier progressive bonus jackpot [with or without a cap] to select table game players [e.g., such as those players participating in a gaming establishment's players' club]) into a single/multi-tier progressive bonus jackpot payout account. The sole purpose for the separate account is generally the funding of the payout of the single/multi-tier progressive bonus jackpot (with or without a cap). Alternative embodiments could have the funding of the single/multi-tier progressive bonus jackpot payout account for the single/multi-tier progressive bonus jackpot (with or without a cap) be provided by taking a portion of the gaming establishment's winnings or a combination of a small percentage of the players' placed wager(s) and the game establishment's winnings, and the like. The funds accumulated in the single/multi-tier progressive bonus jackpot payout account could be awarded to the winning player or a plurality of players in the form of an annuity or a reduced lump sum (whichever the winning player/players choose).

This funding of the progressive bonus jackpot payout account could continue until the single/multi-tier progressive bonus jackpot (with or without a cap) has been won; then, the single/multi-tier progressive bonus jackpot payout account could be used to provide the single/multi-tier progressive bonus jackpot payout. The single/multi-tier progressive bonus jackpot payout account could be emptied and otherwise reset (e.g., reseeded) with a base jackpot amount (e.g., 7 million dollars) to once again receive funding for a new single/multi-tier progressive bonus jackpot (with or without a cap).

The operation of the single/multi-tier progressive bonus jackpot could comprise of a cycle mode (e.g., sequence of events). The operation of the single/multi-tier progressive bonus jackpot with a cap feature could be comprised of two different cycle modes the "regular winning cycle mode" and a "cap winning cycle mode."

The regular winning cycle mode could begin when a predetermined winning criteria has been established on an electronic gaming table 22, the jackpot has been otherwise seeded, the table game play and wagering commenced with a small percentage of each wager could be earmarked (or any other similar monetary pooling method could be implemented) for the single/multi-tier progressive bonus jackpot payout account. This "regular winning cycle mode" could reset (e.g., start with a new, reseeded jackpot) when the single/multi-tier progressive bonus jackpot has been awarded. If the operator decides to implement a cap (e.g., the maximum allowable amount that the single/multi-tier progressive bonus jackpot can reach [e.g., 100 million dollars]), then a "cap winning cycle mode," with its own two distinct phases, could be introduced to the computer system 38. The first phase of this cap winning cycle mode, which could last for a brief time period (e.g., 24 hours), could be seen as a temporary supplement to the regular winning cycle mode. The second phase of the cap winning cycle mode could end when a player or a plurality of players wins the single/multi-tier progressive bonus jackpot with the cap in place.

Once the single/multi-tier progressive bonus jackpot reaches the pre-determined cap amount, the system could automatically switch to the first phase of the "cap winning cycle mode." In this first phase of the "cap winning cycle mode," the funds being collected for the single/multi-tier progressive bonus jackpot could be diverted into a surplus account (thereby making the level of funds in the single/multi-tier progressive bonus jackpot's payout account static at the cap amount). During the end of the "regular winning cycle mode" and throughout both phases of the "cap winning cycle mode," the gaming establishments could engage in various types of marketing campaigns in order to generate awareness, to engender a "party-like atmosphere, and to bring in more potential players. In the second phase of the cap winning cycle mode, the regular winning cycle mode could officially terminate, and the odds of the single/multi-tier progressive bonus jackpot with a cap could be progressively reduced in phases in ever-greater favor of the players (in order to create more excitement and interest in the game).

Winning the single/multi-tier progressive bonus jackpot during the regular winning cycle mode, depending on the type of table game being played through the computer system 38 (e.g., the play action generated at the table game would have to be such that the odds of achieving the predetermined winning criteria could greatly favor the gaming establishment rather than the player) could be predicated upon one or more non-timed predetermined winning criteria or one or more timed predetermined winning criteria.

The funds accumulated in the single/multi-tier progressive bonus jackpot payout account could be awarded to a winning player or a winning plurality of players in the form of an annuity or a reduced lump sum (whichever the player/players choose).

The ways of winning the single/multi-tier progressive bonus jackpot with a non-timed predetermined winning criteria (with or without a cap) could be prescribed based upon the number of game elements 26 (e.g., cards, ball, dice and the like) attributed to a gaming table multiplied by these elements' implementations (e.g., a single deck of cards could offer a variety of predetermined winning criteria: two, three, or four [or more] specific cards for the player with the possibility of the dealer having to have the same type of cards dealt to him or her; two, three, or four [or more] specific cards in a particular order; a certain hand for the player, the dealer and/or both; and the like). This feature could also be applied to non-playing card electronic gaming tables 22: for example, in craps, the player would have to roll three specific dice combinations in a row (e.g., a hard four, a hard six, and a hard eight in that order); in roulette, the ball would have to land on three specific numbers in three continuous games (e.g., a player could bet and win the ball landing on 18, 19, and 20 in that order.) As shown in these examples, the operator could choose numerous variations of predetermine winning criterion. The resultant odds (e.g., those based on the number of game elements 26 multiplied by the elements' implementation for use in the single/multi-tier progressive bonus jackpot [with or without a cap]) would have to be high enough in the house's favor to make them suitable for use in the gaming establishment.

The timed predetermined winning criteria could be applied to (but not limited to) those gaming tables whose game elements 26 have a much more limited range of wagering events with a corresponding limited range of odds (e.g., because of the limited number of game elements 26 and implementation of those game elements 26 into a predetermined winning criteria, the odds of winning the single/multi-tier progressive bonus jackpot are lessened). These games could be, but not be limited to, non-card games such as roulette and craps (e.g., roulette having only 37 or 38 slots [the European version (single zero) has 37; the American version (single zero and double zero) has 38]) with 14 possible betting combinations thus providing a very limited number of wagering events while craps relies upon a pair of six-sided dice that can provide only 36 different numerical combinations on a table that provides only approximately 100 different possible bets).

In one embodiment, the timed predetermined winning criteria for an electronic gaming table 22 (e.g., craps) that requires a die or a pair of die (e.g., dice) as the game element 26, could require a player, or a plurality of players, at one or more electronic gaming tables 22 to wager on, and win on snake eyes no less than 3 separate times in a winning time period (e.g., one hour). This methodology for a timed predetermined winning criterion could then also be applied to electronic gaming tables 22 requiring playing cards as its game elements 26.

For example, the timed predetermined winning criteria for gaming tables requiring playing cards (e.g., blackjack, paigow, baccarat and the like) could be a plurality of players, at one or more electronic gaming tables 22, gaming establishments and the like being dealt two (or more) specific playing cards along with the possibility of the dealer also being dealt two (or more) specific cards three separate times in a winning time period (e.g., one hour). As so demonstrated, the operator could choose numerous variations of predetermine winning criterion.

The timed predetermined winning criteria could have two parts: first an initiation predetermined winning wager made by one or more players that could activate one or more electronic timing devices (e.g., a countdown) that could be visible (or heard or both) in proximity of the electronic gaming tables 22 for the purpose of counting down a winning time period. Second, placing one or more payout predetermined winning wagers before the lapse of the winning time period.

In a timed predetermined winning criteria situation, the initiation predetermined winning wager (could be any suitable predetermined winning criteria made by one or more players) upon its occurrence, could cause the computer system 38 through various communication means 180 connected to it: 1) to broadcast various information (e.g., what additional winning criterion [in addition to what has already been acquired] is needed to be obtained by one or more players to win the single/multi-tier progressive bonus jackpot [with or without a cap] and the like) to one or more players and/or one or more potential players through various communication means 180 connected to the computer system 38; 2) to open a data pool supported by the electronic gaming system to collect player or player position 40 identification information for the player(s) who have made initiation and/or a plurality of payout predetermined winning wagers during this regular winning cycle mode; and 3) to start a countdown timer that, if applicable, will run for a predetermined period of time (e.g., a half-hour, an hour, etc.).

To win the single/multi-tier progressive bonus jackpot (with or without a cap), one or more players must wager, through the computer system 38 for that particular gaming table format, the initiation predetermined winning wager and/or a plurality of payout predetermined winning wagers prior to the timer counting down (if a timer is applicable, the timer may or may not only apply to the plurality of payout predetermined winning wagers).

If, after an initiation predetermined winning wager has been achieved, and if a plurality of predetermined winning wagers is made prior to the timer countdown ending (if a countdown is applicable), then the single/multi-tier progressive bonus jackpot (with or without a cap) could be paid out (e.g., from the single/multi-tier progressive bonus jackpot account—either to a solitary winning player or, in equal shares, to multiple winning players. Regardless of the gaming table or the gaming establishment wherein the gaming table is located in, one player may win or multiple players may win, depending upon the structure of the single/multi-tier progressive bonus jackpot's (with or without a cap) winning criteria] to a player or a plurality of players who made the initiation and/or the following predetermined winning wagers, The correct jackpot payout could be determined by the computer system 38 utilizing player and player position data garnered (via the token ring) from one or more player's electronic interfaces (and if otherwise required, from data inputted through one or more dealer's electronic interfaces 30). Once the jackpot payout occurs, the computer system 38 could cause the countdown timer, if applicable, to reset (e.g., be inactivated). The computer system 38 could then cause the broadcast of information about the payout/winning of the single/multi-tier progressive bonus jackpot. After this broadcast, the system could shut down the broadcast means and the, accredit the winning player(s) with the winning amount (or equal shares of the winning amount if there is a plurality of winning players) from the single/multi-tier progressive bonus jackpot payout account. The payout(s) could be made to the accounts of the winning player's/winning players' through the one or more player's electronic interfaces 32.

The system could then reset the single/multi-tier progressive bonus jackpot account to collect for the new single/multi-tier progressive bonus jackpot (with or without a cap), clear data from the winning pool (e.g., deleting and/or archiving the winning player(s) ID(s) and the player(s) position data). The computer system 38 could then reset to await the occurrence of the next initiation predetermined winning wager for the next single/multi-tier progressive bonus jackpot.

If the occurrence of all the timed predetermined winning criteria wagers does not occur before the countdown timer (if a timer is applicable) finishes its countdown, then the single/multi-tier progressive bonus jackpot (with or without a cap) may not be awarded to any player/players computer system 38. In such an instance, then the computer system 38 could cause the countdown timer (if a timer is applicable) to reset (e.g., be inactivated), communicate information (e.g., a short announcement or broadcast through visual and/or auditory means) regarding the ending of the regular winning cycle mode, and clear the winning pool (e.g., deleting the data [e.g., player Ids and player position data] of those player(s) that have been entered into a pool of those individuals who have placed and won one or more predetermined winning criteria wagers [this data could be archived]). The computer system 38 could then continue on with the regular winning cycle mode to await the occurrence of the next initiation predetermined winning wager(s).

Cap Embodiment of the Progressive Bonus Jackpot.

As stated in previous embodiments, if the operator decides to implement a cap (e.g., a predetermined maximum allowable jackpot payout amount [e.g., a 100 million dollars]) with the single/multi-tier progressive bonus jackpot, this cap could be used to ensure profitability for the operator in that any monies received after the cap is reached would go under the control of the operator and would not be given back as payout under the winning of the capped single/multi-tier progressive bonus jackpot. If the cap is placed on the single/multi-tier progressive bonus jackpot, then a two-phase cap winning cycle mode could be introduced to supplement the regular winning cycle mode. The two-phase cap winning cycle mode which, when introduced, could end the regular winning cycle mode when a predetermined cap to the single/multi-tier progressive bonus jackpot has been reached. This two-phase cap winning cycle mode could be applied to all formats of electronic gaming tables 22 regardless of the format's choice of game element 26.

As stated above, the two-phase cap winning cycle mode could be initiated (e.g., by the system) once the single/multi-tier progressive bonus jackpot payout has reached a certain level, amount, or cap with the possibility that the cap could conclude, at any time (e.g., the ending of a set time period to any time at the operator's discretion), or terminate with one or more players winning the single/multi-tier progressive bonus jackpot. This two-phase cap winning cycle mode could be comprised of: a first (e.g., initiating) phase and a second phase. The first phase could be initiated by the computer system 38 determining that the appropriate amount of funds (that have accumulated for the payout of the single/multi-tier progressive bonus jackpot payout) has reached a predetermined amount or "cap" (e.g., $100 million dollars). When the first phase is initiated, the computer system 38 could perform a series of functions (e.g., actions or tasks) in a specific amount of time (e.g., 24 hours) before engaging the second phase.

The system could engage the second phase of the cap winning cycle mode after determining that the single/multi-tier progressive bonus jackpot has not been awarded and/or after a specific set of tasks have not been performed (or achieved) by the first phase. The second phase of the cap winning cycle mode could end when the single/multi-tier progressive bonus jackpot is finally awarded to a game table player or a plurality of game table players. After the jackpot is awarded, the electronic gaming system could under take several tasks such as seeding the next single/multi-tier progressive bonus jackpot (e.g., 7 million dollars), clearing/archiving the data from the winning pool, and proceeding from the cap wining cycle mode back to the regular winning cycle mode.

Some of the functions (e.g., actions or tasks) undertaken by the electronic gaming system in the cap winning cycle mode in its first phase could be, but not be limited to, to hold or freeze the amount of single/multi-tier progressive bonus jackpot payout at its cap level and subsequently divert during the cap winning cycle mode any and all additional incoming funds from electronic table game wagering into a temporary surplus account.

The funds accumulated in the temporary surplus account could be used for various purposes by the operator of the invention 10 (as deemed appropriate or necessary and/or allowed by law in the gaming jurisdiction in which the gaming establishment is located). One such possible purpose could be to use all or part of the accumulated surplus funds to "seed" (e.g., begin) the next single/multi-tier progressive bonus jackpot (with or without a cap). Another purpose for the surplus account could be to fund comps, bonuses, rewards, or other activities as deemed appropriate or necessary by the operator of the invention 10.

Another function (e.g., actions or tasks) that could immediately be set in motion upon the activation of the first phase of the cap winning cycle mode could be, to activate a cap countdown timer (e.g., counting down a predetermined fixed period of time, if a countdown timer is employed). The countdown timer could be used to determine if and when the second phase of the cap winning cycle mode could be initiated.

In addition, another function (e.g., actions or tasks) that could be placed in motion by the first phase of the cap winning cycle mode could include all means of communication that might be introduced throughout the gaming establishment (e.g., visual, audible, and other medias) regarding the single/multi-tier progressive bonus jackpot and its metamorphosis toward the second phase of the cap winning cycle mode.

After the computer system 38 has determined that all of the functions (e.g., actions or tasks) of the first phase of the cap winning cycle mode have been exhausted and the single/multi-tier progressive bonus jackpot has not been awarded, the system could proceed to the second phase of the cap winning cycle mode.

Some of the functions (e.g., actions or tasks) that a cap winning cycle mode could introduce in its second phase could be, but not be limited to, broadcasting communication gaming establishment wide through a wide variety of means(s) (e.g., visually, audibly, and via other medias) to players and potential players that the single/multi-tier progressive bonus jackpot will now enter the second phase of the cap winning cycle mode wherein the single/multi-tier progressive bonus jackpot could now become increasingly (e.g., progressively) easier to win.

Another feature of the second phase function winning cycle mode could be to allow the operator (through the electronic gaming system) to increasingly (e.g., progressively) make it easier for the players (or potential players) to meet the predetermined winning criteria through either a timed or non-timed mode if the single/multi-tier progressive bonus jackpot has not been awarded during the first phase of the cap winning cycle mode. This option could be set so that the odds of winning the single/multi-tier progressive bonus jackpot could increasingly favor the players over a period time (e.g., in increments of weeks, months, a year, and the like). This option could be exercised by a variety of means such as progressively reducing, over a period or periods of time, the number of predetermined winning wagers needed to win the single/multi-tier progressive bonus jackpot (e.g., going from needing ten types of predetermined winning wagers to four types of predetermined winning wagers and the like); changing the number of predetermined winning wagers needed to win from low probability (e.g., a low chance of winning/highest odds against the player) to medium probability (e.g., a medium chance of winning/50/50 odds); or other means and various combinations of such means. Another function (e.g., actions or tasks) of the second phase of the cap winning cycle mode could be to motivate the gaming establishment to bring additional electronic gaming tables 22 online (e.g., made operative in the gaming establishment to handle the surge in anticipated game play activity). As the first phase cap countdown draws down to its end, thereby signaling the end of the first phase of the cap winning cycle mode and the beginning of the second phase, the gaming establishment could temporarily suspend gaming activity (both play activities and wagering activities) on the computer system 38 in order to allow a recitation of a "countdown" (e.g., "TEN!, NINE!, EIGHT!, etc.") by the players and potential players in proximity to the electronic gaming tables 22 in order to generally add more anticipatory excitement (e.g., a party like atmosphere) to the gaming environment. This player countdown could also be simultaneously visually displayed/audibly announced through networked communication means 180 in the gaming establishment in so that the precise moment of switching from the first phase of the cap winning cycle mode to the second phase could be recorded in the computer system 38 with a system-endorsed, computerized date/time stamp.

If the single/multi-tier progressive bonus jackpot is not won prior to the suspension of the gaming activity and after completion of the "countdown," the cap winning cycle mode could then proceed to the second phase. After the cap winning cycle mode has entered into the second phase, it may remain in this mode until the single/multi-tier progressive bonus jackpot has been awarded. During this phase, if the single/multi-tier progressive bonus jackpot is not awarded in a reasonable amount of time, the operator could have the option of making the single/multi-tier progressive bonus jackpot progressively easier to win. Throughout this cycle it is possible by those with ordinary skill in the art to broadcast communication through a wide variety of means(s) to players and potential players (e.g., visually, audibly, and via other medias) regarding any updates regarding the predetermined winning criteria: when this predetermined winning criterion may change and any other details associated with it.

Once a player, or a plurality of players, has obtained the predetermined winning criteria to be awarded the single/multi-tier progressive bonus jackpot and the winning criteria's authenticity and the player's identity has been verified (by the operator, the system, and any other gaming or legal personnel deemed necessary), the single/multi-tier progressive bonus jackpot account (e.g., jackpot amount) could be reset (e.g., reseeded) with a base jackpot (e.g., 7 million dollars) and the second phase of the cap winning cycle mode could then be terminated and return to the regular winning cycle mode for the purpose of, once again, receiving the funding for a new single/multi-tier progressive bonus jackpot (with or without a cap).

There could be circumstances in which the progression to the second stage of the cap winning cycle mode could be delayed: For example, in the event that an electronic gaming table 22 system's (e.g., an electronic craps gaming table system) single/multi-tier progressive bonus jackpot has reached its cap and is operating in the last remaining minutes of the first phase of the cap winning cycle mode, it is possible that a player, or a plurality of players could engage an electronic gaming table 22 on the same electronic table game system 20 in a timed predetermined winning cycle moments before the start of the cap winning cycle's second phase. This of course could prevent the second phase of the cap winning cycle on the electronic table game system 20 from starting at its predetermined, designated date/time. If this event were to take place, the second phase of the cap winning cycle could be temporarily suspended (e.g., placed on hold for a short amount of time) until the timed predetermined winning cycle has completed its normal function (e.g., actions or tasks).

If, during this timed predetermined winning cycle, the single/multi-tier progressive bonus jackpot is awarded, the jackpot could be seeded with a base jackpot (e.g., 7 million dollars), the data on the winning player or players could be cleared, and the cap wining cycle mode could return to the regular winning cycle mode. In the event the single/multi-tier progressive bonus jackpot is not awarded during the timed predetermined winning cycle, the computer system 38 could automatically advance into the second phase of the cap winning cycle (e.g., the second stage). As noted above, in at least one embodiment of the invention 10 could provide for having the electronic gaming system with the feature whereby progressive change(s) are made (automatically or manually) to increase the odds of winning the single/multi-tier progressive bonus jackpot during the second phase of the cap winning cycle mode. The automatic progressive changing of changing the predetermined winning criteria could be implemented by the computer system 38 using means known to those with ordinary skill in the art of gaming and/or a single/multi-tier progressive bonus jackpot and the like. The effect of dramatically increasing the odds of winning the single/multi-tier progressive bonus jackpot in the player's favor could have a corresponding increase in excitement (e.g., a highly charged, party-like atmosphere) and enjoyment of playing for the players along with any potential players and add to the overall atmosphere of the play action and wagering within the invention 10. Each change in the predetermined winning criteria that is implemented could be accompanied by communications by the invention 10 (or the gaming establishment) to the player and potential players, through various forms of networked communication means 180 (e.g., audible, visual and via other medias) of such changes and their effects throughout the gaming establishment.

In at least one embodiment (e.g., FIGS. 23A, 23B), this methodology of a progressive bonus jackpot with a cap could also be applied to electronic gaming machines (e.g., EGM) 600 using the knowledge of those by those with ordinary skill in the art so the invention 10 with or without a human dealer (e.g., incorporating an automated dealer on an electronic gaming machine for example, a dealer less, fully automated blackjack game machine). As such the steps normally take in the below process could be fully automated (in that the computer system 38 could b adapted to create game play rather than interpret data inputted on real world game action) so that the presentation of a electronic dealer would have those actions and steps that are generally and fundamentally indistinguishable from those taken by a human dealer.

Methodology

The process or methodology 500 of operating the invention 10 with a progressive bonus jackpot with a cap could commence with step 502: Activation of System. In this step 502 could commence with the initiation of the computer system 38 as well as other customary gaming system start up procedures, the table(s) and all of its components could be energized (e.g., the invention is turned on). This step 502 could include, but may not be limited to, the powering of all required and related equipment needed to implement and operate the computer system 38 and all of its related electronic computer accessories (e.g., the tables, the terminals [e.g., the pit boss' terminal], electronic playing card shufflers, any hardware related to the computer system 38, the interfaces [player and/or dealer], the player's monetary devices 34, wireless handheld gaming device chargers/battery chargers, the shoe [e.g., the iShoe™], any surface computers, all possible electronic signage or other electronic displays, any audible devices, and the like). During this start up, the computer system 38 could cause the one or more dealer's electronic interfaces 30, the one or more player's electronic interfaces 32, and all electronic signage to show appropriate initial startup presentations (e.g., welcome screens, gaming displays, wagering menus, selections, and the like).

In the progressive bonus jackpot embodiment, process 500 could have two different progressive bonus jackpot cycle modes (e.g., sequences of events): a "regular winning cycle mode" and (if a cap is introduced) a "cap winning cycle mode". The regular winning cycle mode could begin at system startup, the jackpot could be seeded, the game could begin, and a small percentage of each wager could be earmarked (or any other similar monetary pooling method could be implemented) for the single/multi-tier progressive bonus jackpot.

The jackpot could be seeded with a predetermined amount of money (e.g., 7 million dollars) to create immediate interest in the invention 10. As stated in above, the funding for the single/multi-tier progressive bonus jackpot (and/or for the payout of other comps, bonuses, etc.) could be accomplished without the need of an additional bet (e.g., side bet) by the players. The wide area progressive could be programmed to automatically deduct a percentage of all the monies wagered by the players on either all or some of the establishment's electronic gaming tables 22 (e.g., this invention 10). In another iteration, the funding for the single/multi-tier progressive bonus jackpot could be provided by a percentage of the winnings from the electronic gaming tables 22 located within a gaming establishment.

After step 502 has been substantially completed, the process 500 could generally proceed to step 504, game preparation.

In step 502, game preparation, the dealer could next initiate those gaming steps needed to prepare the playing surface 24 for game play. These steps, could include, but may not be limited to, obtaining and preparing playing cards (e.g., shuffling) through use of an electronic shuffler or manually (e.g., by hand), obtaining and placing sets of dice in a tray, obtaining and placing a roulette ball on the roulette table, and the like. After step 502 has been substantially completed, the process 500 could generally proceed to step 506, dealer/pit boss/player log in.

In step 506, dealer/pit boss/player log in, the dealer could log into the electronic gaming table through the dealer's electronic interface 30 through a wide variety of security means. These means could include, but not be limited to, dealer security or lockout menu(s) (not shown) for the one or more dealer's electronic interfaces 30. Such security measures could include, but not be limited to, keypad entry (e.g., entering a password) and other unique identifying security devices (e.g., radio frequency identification [RFID] implementations and/or other unique identifiers which could include, but not be limited to: fingerprints, hand geometry, earlobe geometry, retina and iris patterns, voice waves, DNA, and signatures which could allow for almost instantaneous personal identification that could be used separately, as a pair, or three or more collectively). One or more of these means could be employed to generally allow the operator, gaming establishment or authorized personnel (e.g., the dealer, pit boss, etc.) to pass through one or more security lockout measures of the computer system 38 to gain access to the electronic gaming table 22 via the dealer's electronic interface 30 or any remote computer.

In this manner, the computer system 38 could identify (and possibly record for reporting purposes) the individual operating (or generally having control over or logged into) a remote terminal, the dealer's electronic interface 30, and/or a dealer's electronic interface 30 on a particular table.

Once a dealer, pit boss, or other personnel authorized by the gaming establishment has been identified by the invention 10, these people could be given certain unrestricted capabilities by the gaming establishment or the operator, which may include, but not be limited to: to remove the currency from the table (e.g., the bill validator cashbox); authorize various types of overrides based on standardized computer security schemas (e.g., the pit boss could have certain override capabilities that may include, but not be limited by, the ability to re-boot an individual gaming table and/or certain gaming table components; to transfer a player's or players' current game/game status/gaming history/and the like to a specific gaming table; to fix a dealer's/player's data-entry error; to credit a player's account in the case of a system malfunction/player dispute; and the like); and the like. These capabilities could give the operator and the gaming establishment, a record of activity that provides an extra layer of security needed in the event someone has tampered with the invention 10.

For the player to be recognized by the invention 10, the player (after deciding to participate in the action of the electronic gaming table 22) could begin by deciding which player position 40 (e.g., a vacant player position/seat) that he/she wishes to occupy at the electronic gaming table 22 or by choosing to participate in a non-card gaming table by checking out a handheld wireless gaming device 130 somewhere within the gaming establishment. The player could identify his/her presence to the computer system 38 by inserting one or more devices that could be used to download electronic game play credits onto the electronic gaming table 22. These devices could be, but not be limited to, a smart card, a player's club card, a ticket-in/ticket-out ticket, currency, and the like into the one or more player's monetary devices 34. Other options that could be used to convert currency into electronic game play credits or to read the bar code on a ticket-ticket-out ticket, to read a player's club card, or to read a smart card could include one or more surface computing types of platforms (e.g., Microsoft® Surface™ and the like). At this point, the player has loaded the electronic gaming table 22 and/or a handheld wireless gaming device 130 with electronic game play credits.

In at least one embodiment, if a player chooses not to participate in the gaming establishments player's club card or smart card program(s), the system could be programmed to still recognize the player's presence via their interaction with the players monetary device (e.g., by inserting currency). The computer system 38 could process that a player is present at the player's position, but not necessarily pairing the player with a particular player's database identification file/profile/data file.

In at least one embodiment, the use of a player's club card or smart card in the compounds of this invention 10 could be programmed to automatically qualify players to win the single/multi-tier progressive bonus jackpot, with or without a cap. This practice could encourage players to participate in the gaming establishment's players club card and/or smart card program, thus enhancing the gaming establishment's ability to mine data related to the players' gaming patterns and behaviors.

After step 506 has been substantially completed, the process 500 could generally proceed to step 508, Player Places Wagers and Inputs Supplemental Game Play Responses Via the One or More Player's Electronic Interfaces.

At step 508, Player Places Wagers and Inputs Supplemental Game Play Responses Via the One or More Player's Electronic Interfaces, the could now use his or her electronic game play credits to place a wager via the one or more player's electronic interfaces 32. The player could also input supplemental game play responses (e.g., touching which playing cards to split, selecting to buy insurance, and the like) via the same one or more player's electronic interfaces 32. These one or more player's electronic interfaces 32, in at least one embodiment of the invention 10, could be a touch screen 48 similar to the ones used by the dealer.

The player's electronic interfaces 32 could offer a player several different options. These options may include, but not be limited to: using electronic game play credits to wager; inputting data (either directly or indirectly) into the computer system 38; receiving data from the computer system 38(*s*); placing one or more wagers at once; playing one or more hands at once; repeating a wager without having to manually type in the amount; cashing out; accessing help; being the table's banker; buying insurance; splitting playing cards; doubling down; choosing the number of hands to play; tipping the dealer; selecting the Off option (e.g., in craps); viewing the credit counter; betting on the dealer, the player, and/or a tie; and other options (e.g., non-gaming options); and the like. After step 508 is substantially completed the process could proceed to step 510, Playing Through the Dealer's Electronic Interfaces.

In step 510, Playing Through the Dealer's Electronic Interfaces, the dealer commences game play utilizing the dealer's electronic interface (and other devices). Before any player's begins game play on an electronic gaming table 22, the players have already inserted one or more of the following items into the player's monetary device 34: their player's club cards or smart card, currency, one or more ticket-in-ticket-out tickets, etc., and the players have placed a bet (e.g., wager).

One possible embodiment could be applied to the playing card table games of blackjack, pai gow, and/or baccarat. The dealer's electronic interface 30 (e.g., touch-screen) could be used, but not be limited to, the following functionality example: This example assumes that there are two players at the table. These two players are seated at positions 1 (Player 1) and 4 (Player 4).

After the playing cards have been shuffled and placed in the card-recognition system's shoe (e.g., iShoe), the dealer could begin by touching or pressing the PLAYER #1: HAND #1 button (e.g., icon and the like) on the dealer's electronic interface 30. Next, the dealer could remove the first playing card from the shoe, and deals it to player 1. Next, the dealer could touch or press the PLAYER #4: HAND #1 button (e.g., icon and the like). The dealer could then remove the second playing card from the shoe and deals it to player 4. Next, the dealer could then touch or press the DEALER'S HAND button (e.g., icon and the like). The dealer could then remove a playing card from the shoe and deals the third playing card to himself/herself. The second round of dealing could then begin by repeating the aforementioned steps: the dealer touching or pressing the PLAYER #1: HAND #1 button (e.g., icon and the like), removing the fourth playing card from the shoe, and dealing the playing card to player 1. Touching or pressing the PLAYER #4: HAND #1 button (e.g., icon and the like), removing the fifth playing card from the shoe, and dealing the playing card to player 4. Touching or pressing the DEALER'S HAND button (e.g., icon and the like), removing the sixth playing card from the shoe, and dealing it to himself or herself.

For the table games embodiments of the invention 10 for baccarat and pai gow, after all of the necessary playing cards have been dealt, the game could be considered over. The rules of baccarat and pai gow dictate that, after the playing cards have been dealt, the player has no decision-making abilities (e.g., to discard, ask for additional playing cards, split a hand, and the like); therefore, the identification of winning hands are based upon standard game rules and are immutable and automatic. The electronic gaming system could be programmed by those skilled in the art to automatically match a player's hand to that of the dealer and automatically identify the winning hand(s), and the system could then automatically debit or credit the players' game credit amounts accordingly.

For the blackjack embodiments of the invention 10, however, the players have some decision-making capabilities (e.g., to discard, ask for additional playing cards, split a hand, and the like). If and when this occurs, the players could request additional playing cards with the traditional verbal/nonverbal communications (e.g., "Hit me!"). The dealer could then respond by repeating this "touch or press button (e.g., icon and the like)/deal process" over and over again until all of the players at the table are satisfied with the final result of their hand(s). At this point, the dealer could be obligated to reveal his or her face down playing card. Prior to flipping over his or her playing card, the dealer could then touch or press the DEALER'S REVEAL button (e.g., icon and the like). This button (e.g., icon and the like) could be used to communicate to the electronic gaming system that all the playing cards have been dealt to the players and that the dealer could now reveal his or her facedown playing card. If, after revealing the dealer's face down playing card, the dealer requires additional playing cards, the dealer could touch or press the DEALER'S HAND button (e.g., icon and the like) and then deals himself or herself a playing card. The dealer could repeat this process until, according to in-house rules, the dealer reaches 17 or "busts" (e.g., goes over 21 in points). The electronic gaming system could (by those with ordinary skill in the art) automatically recognize who has the winning hand(s) and could automatically debit or credit the players' accounts accordingly.

Another embodiment could have players who choose to play multiple hands using the dealer's electronic interface 30. This embodiment could also be applied to the table games of blackjack, pai gow, and/or baccarat (in the event the gaming establishment's house rules permit/allow).

For this embodiment, there is one player at the table who is seated at position 1 (Player 1) and who has decided to play two hands simultaneously. The player has indicated this decision both by touching and/or pressing the NUMBER OF HANDS button (e.g., icon and the like) and the number 2 button (e.g., icon and the like) on his/her dealer's electronic interface 30 and by verbally indicating this decision to the dealer (e.g., "I wish to play two hands."). After the playing cards have been shuffled and placed in the card-recognition system's shoe (e.g., iShoe), the dealer could begin by touching or pressing the PLAYER #1: HAND #1 button (e.g., icon and the like) on the dealer's electronic interface 30. The dealer could then remove the first playing card from the shoe (e.g., iShoe) and deal it to player 1 for the first hand. The dealer could then touch or press the PLAYER #1: HAND #2 button (e.g., icon and the like), remove the second playing card from the shoe, and deal it to player 1 for the second hand. The dealer could then touch or press the DEALER'S HAND button (e.g., icon and the like), remove a playing card from the shoe, and deal the third playing card to himself or herself. The second round of dealing could copy the first round's dealing action with the dealer repeating this "touch or press button (e.g., icon and the like) and deal process" over and over again until all of the playing cards for the player's two hands have been dealt. After all of the playing cards have been dealt, the dealer could reveal his or her facedown playing card using the same actions as stated earlier in this embodiment.

This next example will attempt to illustrate the process of dealing, using the dealer's electronic interface 30, to a player who has chosen to split his or her first two playing cards into two separate hands. This example could be applied to the table game of blackjack (in the event the gaming establishment's house rules permit/allow this action).

In this scenario, there is one player at the table who is seated at position 1 (Player 1). The player has been dealt two playing cards of the same value (e.g., two aces) and has decided to split the hand by touching or pressing the SPLIT button (e.g., icon and the like) on the dealer's electronic interface 30. When the player selects this option, the dealer's electronic interface 30 may display a confirmation prompt asking the player if he or she wishes to split the two playing cards, thereby creating two separate hands. The player could select either the YES or the NO button (e.g., icon and the like) (e.g., in this example, the player would select YES), and the electronic gaming system could automatically place a bet of equal value (e.g., equal to the original hand's bet) on the newly created hand. As traditional blackjack game play dictates, the player could then flip over both playing cards face up to indicate to the dealer that the player wishes to split the hand (this action may be conveyed either verbally or non-verbally as well). During this process, the dealer's electronic interface 30 could indicate that the player is now playing two hands (e.g., PLAYER 1, HAND 1 and PLAYER 1, HAND 2). The dealer could then touch or press the PLAYER #1: HAND #1 button (e.g., icon and the like) on the dealer's electronic interface 30, and deal it to the player's first hand (e.g., completing the player's first hand). The dealer could then touch or press the PLAYER #1: HAND #2 button (e.g., icon and the like), remove the second playing card from the shoe, and deal it to the same player to complete the second hand. After all of the playing cards have been dealt, the dealer could reveal his or her facedown playing card using the same actions as stated earlier in this embodiment.

For the embodiments where the player is allowed to be a banker (e.g., take the role of the dealer on a pai gow and/or a baccarat table), the dealer could press or touch the PLAYER AS DEALER button (e.g., icon and the like) to allow a specified player to have its respective dealer's electronic interface 30 present a dealer's display showing the respective individual player menus to allow the player (who has now become the banker/dealer) to deal the playing cards and activate the respective selections to indicate to the computer system 38 which players and/or himself/herself (e.g., the player as dealer) the respective playing card(s) could be dealt. Once the PLAYER AS DEALER option has been selected by the dealer, the computer system 38 could ask the dealer to select which player (e.g., Player 1) has requested to play the role of the dealer for the next upcoming round of play. By selecting which player could be taking on the role of dealer, the computer system 38 could automatically transfer control of the game to the selected player (e.g., meanwhile, the electronic gaming system could be programmed so that the default dealer could retain sufficient command of the system in order to take back control of the dealer/banker capability and to move this capability back to the himself or herself or to transfer this capability to another player).

The player utilizing the dealer's electronic interface 30 (or a player as banker using the dealer's electronic interface 30) could activate the proper selection (as generally described above) to indicate which player (e.g., player position 40) could receive the next playing card, or next set of playing cards (e.g., pai gow or baccarat). The player as banker could then remove from the game element reader 36 (e.g., the Shufflemaster® iShoe™) a playing card, or a plurality of playing cards, which would then be dealt to the player at the players' positions (which have been previously identified to the invention 10 [to further associate the read playing cards as going to the appropriate respective players]). The player as banker could then physically transfer the dealt playing card(s) to the appropriate respective players. The player as banker could repeat this action for the remaining players at the table. The player as banker could then deal to him or herself after identifying to the invention 10 that the player as banker was the next recipient of the next dealt playing card(s) (by touching/pressing the "DEALER'S HAND" button [e.g., icon and the like]). This set of actions could be repeated until all the playing cards (or set of playing cards) had been dealt in the round (including multiple hands, and the like).

When a player takes on the role of banker/dealer, the computer system 38 could be programmed to have his or her account automatically credit or debit the other remaining players' (e.g., those that are actively participating in the normal game play at that table) accounts based upon the outcome of each round of game play.

The computer system 38 could have the ability to evaluate the account of the player who wishes to become the banker/dealer to determine whether or not the player (who wishes to take on the role/responsibility of the banker/dealer) has sufficient funds in his/her account to cover any possible bets placed on the table for the next round(s) of game play. This evaluation could be based upon several pieces of criteria (e.g., the average wager amount that has been bet on that one table for the past several hands). If the computer system 38 determines that such a player has insufficient funds for such activity, the system could automatically notify the gaming establishment's gaming employee (e.g., the dealer) that transference of the banker/dealer role could not be wise and access could be denied.

When a player takes on the role of banker/dealer, there could be a safeguard in place for the default dealer to have the ability to take back control, as the dealer, during the course of a game. It is recommended that a DEALER'S OVERRIDE button (e.g., icon and the like) be installed on the dealer's electronic interface 30 which could allow the dealer to take control of the table as a dealer either when a player is finished with his or her turn of being the game's banker or in the event of a system malfunction/player error during the player's turn of being the game's banker.

Craps

For the embodiments of the invention 10 for playing craps, the known positions of the craps players are not important to the dealer(s) as a player may place a bet on any number and any combination or line (e.g., Pass, Don't Pass, Come and Don't Come) from any location on the table utilizing their player's electronic interface or from any handheld wireless gaming device 130.

Figure 7:
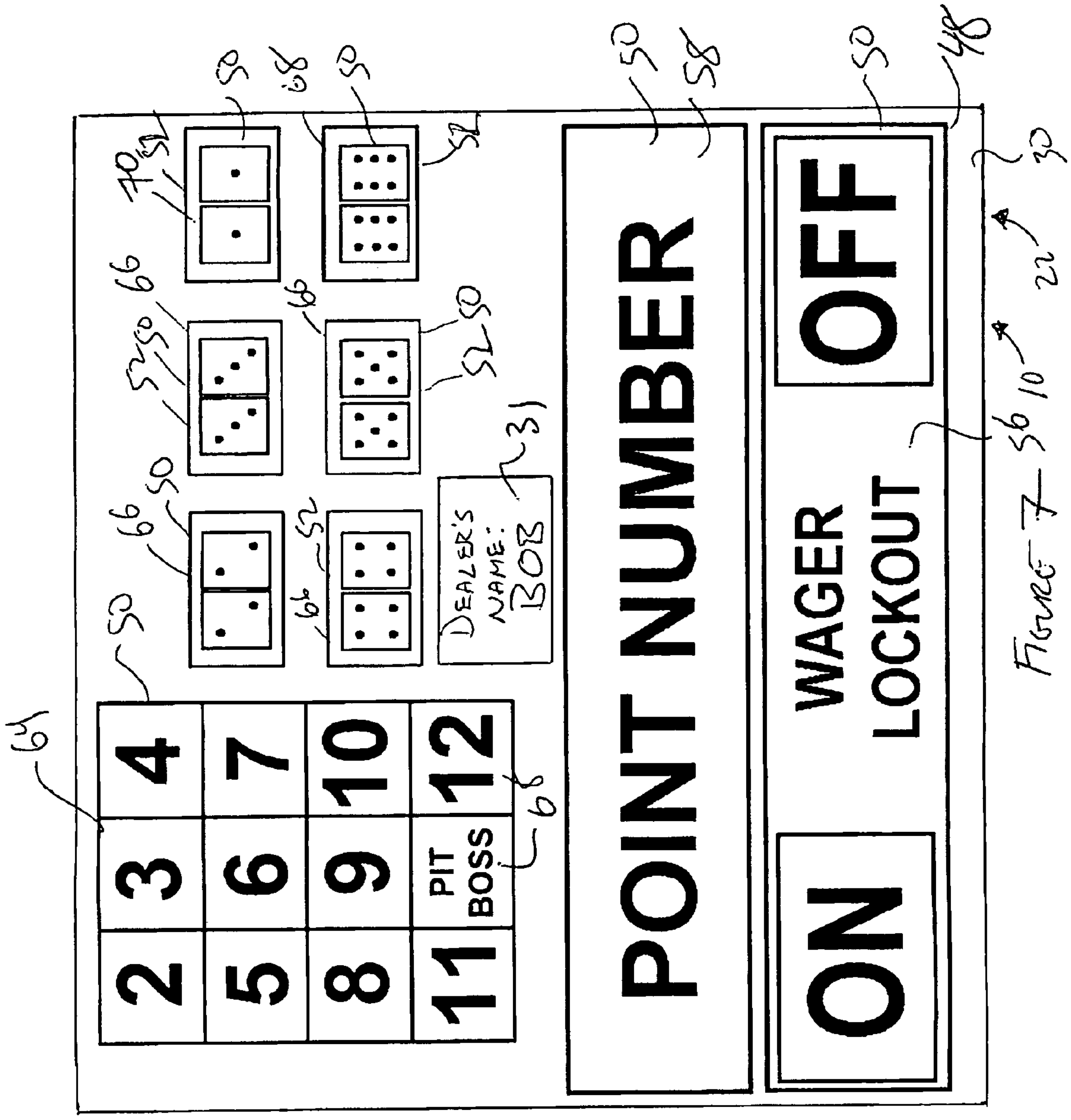
FIG. 7 is substantially shows a view of craps embodiment of the dealer's electronic interface.

A new game begins with a shooter (e.g., the player who rolls the dice) rolling the dice for the purpose of making a "point number." It is understood (for those players who are knowledgeable with the rules of craps) that the "point number" is any number other than 2, 3 and/or 12. Although achieving a "point number" is not necessary in betting on, winning, or losing in the game of craps. It should be understood (to those players who are knowledgeable with the rules of craps), this "point number" is merely the number on which players bet that the shooter may or may not roll again before rolling the number 7. When a shooter has rolled the "point number," the dealer could respond by pressing the "POINT NUMBER" button (e.g., icon and the like) on his or her dealer's electronic interface 30 (as shown in FIG. 7) followed by the number that was rolled. For example, if a shooter rolls the number 4 at the beginning of the game, the dealer could press the "POINT NUMBER" button (e.g., icon and the like) and then the number 4 button. If, on the first roll of the dice, the shooter rolls a 2, 3, or 12, the dealer could respond by pressing the coinciding number on his dealer's electronic interface 30 (e.g., this number entry is not preceded with the "POINT NUMBER" button [e.g., icon and the like]) entry. After a "point number" has been rolled by the shooter (e.g., the player who rolls the dice), the dealer could respond to each roll of the dice by pressing the coinciding number button on his or her dealer's electronic interface 30 and retrieving the dice so that the shooter could roll again.

The dealer's electronic interface 30 could also include buttons 50 (e.g., icons 52 and the like) with specific number combinations (e.g., two 2s, two 3s, two 4s, two 5s [e.g., "the hard ways"] in addition to two 1's [e.g., snake eyes] and two 6's). In addition, other buttons 50 (e.g., icons 52 and the like) could be included on the dealer's electronic interface 30. These buttons 50 (e.g., icons 52 and the like) could include, but not be limited to, ON, OFF, and PIT BOSS. The ON and OFF buttons 50 could be used to assist the dealer in effectively facilitating when players could and could not place bets (e.g., wagers). By touching or pressing one of these two buttons 50 (e.g., icons 52 and the like), the computer system 38 could send one of two messages to all players on their one or more dealer's electronic interfaces 30 and/or handheld wireless gaming devices 130. The first message (which is sent when the dealer presses the ON button [e.g., icon and the like]) could be that bets (e.g., wagers) may now be allowed and encouraged; the second message (which is sent when the dealer presses the OFF button [e.g., icon and the like] could be that bets (e.g., wagers) are temporarily suspended. This OFF button (e.g., icon and the like) could prevent players from placing a bet (e.g., wager) after the dealer and the players have seen the results of game play and before a dealer could react by recording the results of game play. Other options for buttons 50 (e.g., icons 52 and the like) could include PIT BOSS, which, when pressed, could send a signal to the pit boss in order to inform him or her that the dealer needs assistance.

During game play, a player is able place all kinds of bets and place one or more bets simultaneously during the course of a game. As the player places a bet on their dealer's electronic interfaces 30 (as shown in FIGS. 4-7) or handheld gaming device (as shown in FIG. 21) and after the dealer has entered any number that has been rolled by the shooter into the one or more dealer's electronic interfaces 30, the computer system 38 could be programmed (by those with ordinary skilled in the art) to record all bets (e.g. wagers), whether it be one bet (e.g., wager) or more bets (e.g., wagers) in a series and then credit and/or debit each player's account in reference to each individual bet (e.g., wager) after each round of game play. The game ends when the shooter has rolled the number 7; however, wagering can still continue regardless of the round being over (e.g., "the hard ways").

Roulette

For the roulette embodiments of the invention 10*s*, after all players have placed their bets, the dealer launches the ball and waits for the ball to drop and land on a number. Once the ball has landed, the dealer enters the number that the ball has landed upon into the one or more dealer's electronic interfaces 30. At this point, the electronic gaming table 22 could automatically debit or credit the player's accounts accordingly.

Figure 6:
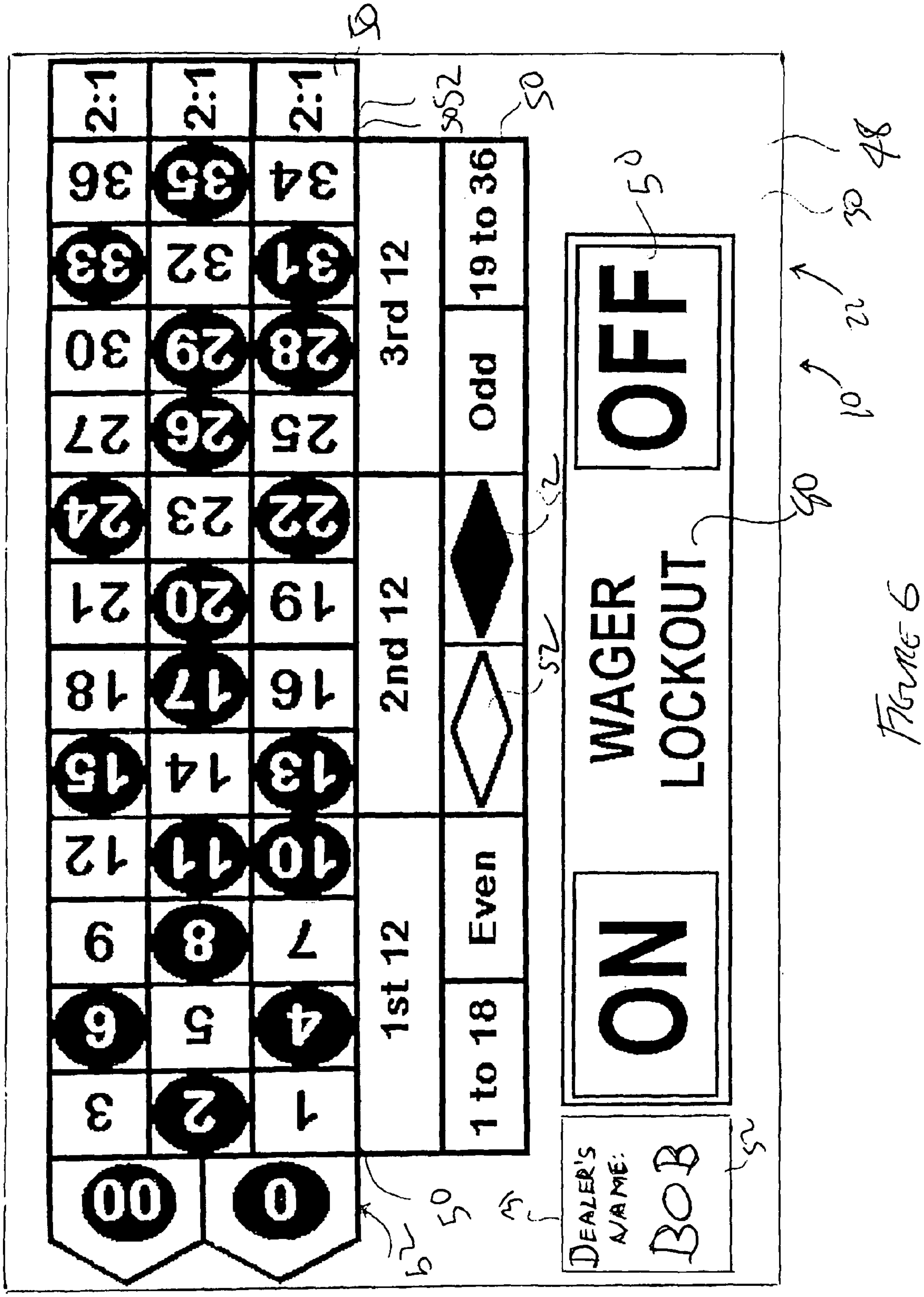
FIG. 6 is substantially shows a view of roulette embodiment of the dealer's electronic interface.

In addition, other buttons 50 (e.g., icons 52 and the like) could be programmed into the system to appear on the one or more dealer's electronic interfaces 30 (FIG. 6). These buttons 50 (e.g., icons 52 and the like) could include, but not be limited to, ON, OFF, and PIT BOSS. The ON and OFF buttons 50 could be used to assist the dealer in effectively facilitating when players could and could not place bets (e.g., wagers). By pressing one of these two buttons 50, the computer system 38 could send one of two messages to all players on their one or more dealer's electronic interfaces 30 and/or handheld wireless gaming devices 130. The first message (which is sent when the dealer presses the ON button (e.g., icon and the like) could be that bets (e.g., wagers) may now be allowed and encouraged; the second message (which is sent when the dealer presses the OFF (e.g., icon and the like) could be that bets (e.g., wagers) are temporarily suspended. This OFF button (e.g., icon and the like) could prevent players from placing a bet (e.g., wager) after the dealer and the players have seen the results of game play and before a dealer could react by recording the results of game play.

Other options for buttons 50 (e.g., icons 52 and the like) could include PIT BOSS which, when pressed, could send a signal to the pit boss in order to inform him or her that the dealer needs assistance.

After substantial completion of step 510, the process could proceed to step 512, The Two Phases of the Cap Winning Cycle Mode.

In step 512, The Two Phases of the Cap Winning Cycle Mode, if so desired by the operator, steps 512 through 542 could be programmed into the computer system 38 to add a single/multi-tier progressive bonus jackpot to the invention 10. If desired by the operator, a cap could also be added, by those with ordinary skill in the art, to the single/multi-tier progressive bonus jackpot.

In step 512, could be utilized if the computer system 38 is operating with a cap (e.g., the maximum allowable payout amount that a single/multi-tier progressive bonus jackpot could reach [e.g., 100 million dollars]). If a cap is not implemented, the computer system 38 could proceed directly to Step 516.

In step 516, Is the Computer System 38 Still Operating in the Regular Winning Cycle Mode? If, however the computer system 38 is operating with a cap, the computer system 38 could continue to run in its normal cycle mode (e.g., the regular cycle mode). The computer system 38 could be programmed (by those with ordinary skill in the art) to constantly be checking to see if the single/multi-tier progressive bonus jackpot has reached its cap. If the answer is no, the computer system 38 could then continue to operate in its regular winning cycle mode and proceed to Step 514

In step 514, Has the Cap for the Single/Multi-tier Progressive Bonus Jackpot Been Reached? However, if the answer to the query is yes, the computer system 38 could automatically proceed into the first of the cap winning cycle mode's two phases.

In step 514, Has the Cap for the Single/Multi-tier Progressive Bonus Jackpot Been Reached, could be activated if the answer to the query in Step 512 is no. At this point, the computer system 38 could inquire, "Has the Cap for the Single/Multi-tier Progressive Bonus Jackpot Been Reached?" If the answer to this query is no, the computer system 38 could automatically continue on to Step 516.

In step 516, is the Computer System 38 Still Operating in the Regular Winning Cycle Mode? If however, the answer to the query is yes, the computer system 38 could automatically continue on to Step 530: Initiate the First Phase of the Cap Winning Cycle Mode.

In step 516, Is the Computer system 38 Still Operating in the Regular Winning Cycle Mode? The computer system 38 could automatically query itself, "Is the computer system 38 still operating in the regular winning cycle mode?" If the answer to this query is yes, the computer system 38 could automatically continue on to Step 514: Has the Cap for the Single/Multi-tier Progressive Bonus Jackpot Been Reached? If, however, the answer to the query is no, the computer system 38 could automatically continue on to Step 518: Is the Computer System 38 Operating in the First Phase of the Cap Winning Cycle Mode?

In step 518, Is the Computer System 38 Operating in the First Phase of the Cap Winning Cycle Mode? The computer system 38 could automatically query itself "Is the Computer system 38 Operating in the First Phase of the Cap Winning Cycle Mode?" If the answer to this query is yes, the computer system 38 could automatically continue on to Step 514: Has the Cap for the Single/Multi-tier Progressive Bonus Jackpot Been Reached? If the answer to the query is no, the computer system 38 could automatically continue on to Step 520: Has the Conditions for the Timed Predetermined Winning Criteria Been Met?

In step 520, Has the Conditions for the Timed Predetermined Winning Criteria Been Met? The computer system 38 could automatically query itself, "Has the conditions for the timed predetermined winning criteria been met?" If the answer to the query is yes, the computer system 38 could automatically continue on to Step 522: "Initiate the Timer for the Timed Predetermined Winning Criteria" If, however, the answer to the query is no, the computer system 38 could automatically continue on to Step 512: "The Two Phases of the Cap Winning Cycle Mode".

In step 522, Initiate the Timer for the Timed Predetermined Winning Criteria, in a timed predetermined winning criteria situation, the initiation predetermined winning wager (made by one or more players) could be any suitable predetermined winning criteria that, upon its occurrence, could cause the computer system 38 to: 1) broadcast various information (e.g., what additional winning criteria [in addition to what has already been acquired] is needed to be obtained by one or more players to win the single/multi-tier progressive bonus jackpot [with or without a cap] and the like) to one or more players and/or one or more potential players through various communication means 180 connected to the computer system 38; 2) open a data pool to collect player and/or player position identification information for the player(s) who have made the initiation and/or a plurality of payout predetermined winning wager(s) during this regular winning cycle mode; and 3) start a countdown timer that, if applicable, could run for a predetermined period of time (e.g., a half-hour, an hour, etc.). The computer system 38 could then proceed to Step 524: "Has the Timed Predetermined Winning Criteria Been Met?"

In step 524, Has the Timed Predetermined Winning Criteria Been Met?, if, after an initiation predetermined winning wager has been achieved, and, if a plurality of predetermined winning wagers is made prior to the timer countdown ending (if a countdown is applicable) (e.g., the predetermined winning criteria has been met), the single/multi-tier progressive bonus jackpot (with or without a cap) could be paid out (e.g., from the single/multi-tier progressive bonus jackpot account) to a player or a plurality of players in the form of an annuity or a reduced lump sum (whichever the player/players choose). The computer system 38 could automatically continue on to Step 528: "The Single/Multi-tier Progressive Bonus Jackpot is Renewed" If the occurrence of the series of predetermined winning criteria wagers (e.g., three sets of snake-eyes winning wagers for craps) does not occur before the countdown timer (if a timer is applicable) finishes its countdown, then the single/multi-tier progressive bonus jackpot (with or without a cap) may not be awarded to any player/players. At this point, the computer system 38 could then proceed to Step 526: "If the Timed Predetermined Winning Criteria Has Not Been Met".

In step 526, IF THE TIMED PREDETERMINED WINNING CRITERIA HAS NOT BEEN MET, Once the countdown timer (if a timer is applicable) has completed its countdown without the single/multi-tier progressive bonus jackpot (with or without a cap) being won, then the computer system 38 could cause the countdown timer (if a timer is applicable) to reset (e.g., until an initiation predetermined winning wager occurs, the timer could remain at zero. After the initiation predetermined winning wager, the timer could reset to a predetermined fixed period of time [if a timer is deemed appropriate]), communicate information (e.g., a short announcement or broadcast through visual and/or auditory means) regarding the ending of the regular winning cycle mode, and clear the winning pool (e.g., clear the data [e.g., player IDs and player position data] [e.g., this data could be archived] of those player(s) that have been entered into a pool of those individuals who have placed and won one or more predetermined winning criteria wagers). The computer system 38 could then proceed to Step 512: "The Two Phases of the Cap Winning Cycle Mode".

In step 528, The Single/Multi-tier Progressive Bonus Jackpot is Renewed, If the predetermined winning criteria has been achieved (e.g., the single/multi-tier progressive bonus jackpot has been "hit" or "won") during the timed predetermined winning cycle, the computer system 38 could cause the countdown timer (if a timer is applicable) to reset (e.g., until an initiation predetermined winning wager occurs, the timer could remain at zero. After the initiation predetermined winning wager, the timer could reset to a predetermined fixed period of time [if a timer is deemed appropriate]). The computer system 38 could then broadcast information (e.g., visually or audibly) about the single/multi-tier progressive bonus jackpot payout (e.g., once a player, or a plurality of players, has obtained the predetermined winning criteria needed to be awarded the single/multi-tier progressive bonus jackpot, the win has been verified [by the operator, the system, and any other gaming or legal personnel deemed necessary], and the player's/players' identity/identities have been confirmed [by the operator, the system, and any other gaming or legal personnel deemed necessary], the single/multi-tier progressive bonus jackpot could be paid out [e.g., from the single/multi-tier progressive bonus jackpot account to the accounts of the winning player's/winning players' through the one or more player's/players' electronic interfaces] to a player or a plurality of players in the form of an annuity or a reduced lump sum [whichever the player/players choose]), then shut down the broadcast means; clear the winning pool (e.g., clear the winning player(s) ID(s) and the player(s) position data [this data can be archived]); reseed the single/multi-tier progressive bonus jackpot (e.g., 7 million); and begin again to collect a small percentage of each wager, which could be earmarked (or any other similar monetary pooling methods which could be implemented) for the single/multi-tier progressive bonus jackpot (with or without a cap). The computer system 38 could then reset itself to await the occurrence of the next initiation predetermined winning wager. The computer system 38 could then proceed to Step 512: "The Two Phases of the Cap Winning Cycle Mode".

In step 530, Initiate the First Phase of the Cap Winning Cycle Mode, as stated in previous embodiments, if the operator decides to implement a cap (e.g., the maximum allowable payout amount that a single/multi-tier progressive bonus jackpot could reach [e.g., 100 million dollars]), then a two-phase cap winning cycle mode could be introduced as a means to facilitate the actions or steps of the cap and as a supplement to the regular winning cycle mode which, when introduced, this mode could start once the single/multi-tier progressive bonus jackpot payout has reached a certain level, amount, or cap and could end the regular winning cycle mode when a predetermined cap to the single/multi-tier progressive bonus jackpot has been reached. The first phase of this cap winning cycle mode could last for a brief period of time (e.g., 24 hours). Once the single/multi-tier progressive bonus jackpot reaches the pre-determined cap amount, the system could automatically switch to the first phase of the cap winning cycle mode. In this first phase of the cap winning cycle mode, the funds being collected for the single/multi-tier progressive bonus jackpot could be diverted into a temporary supplemental or surplus account (thereby making the single/multi-tier progressive bonus jackpot's amount static). This two-phase cap winning cycle mode could be applied to all gaming tables regardless of the choice of game element 26. The cap could conclude, at any time (e.g., the time period could be any amount of time that the operator desires) or terminate with one or more players winning the single/multi-tier progressive bonus jackpot. This two-phase cap winning cycle mode could be comprised of a first (e.g., initiating) phase and a second phase. When the first phase is initiated, the computer system 38 could perform a series of functions (e.g., actions or tasks) in a specific amount of time (e.g., 24 hours) before automatically engaging the second phase. One of the many functions (e.g., actions or tasks) of a cap winning cycle mode in its first phase could be, but not be limited to, holding the single/multi-tier progressive bonus jackpot payout at its cap level and then immediately divert any and all additional funds that are received during the cap winning cycle mode into a temporary second or surplus account. Another function (e.g., action or task) that could immediately be set into motion upon the activation of the first phase of the cap winning cycle mode could be, to activate a cap countdown timer (e.g., counting down a predetermined fixed period of time [if a timer is deemed appropriate]) to determine if and when the second phase could be initiated. In addition, another function (e.g., actions or tasks) that could be placed in motion by the first phase of the cap winning cycle mode could include all means of communication that might be introduced throughout the gaming establishment (e.g., visual, audible, and other medias) regarding the single/multi-tier progressive bonus jackpot and its metamorphosis toward the second phase of the cap winning cycle mode (e.g., The count down could be visually displayed/audibly announced in the gaming establishment so that the precise moment of switching from the first phase of the cap winning cycle mode to the second phase could be recorded in the computer system 38 with a system-endorsed, computerized date/time stamp). Another function (e.g., action or task) of the first phase of the cap winning cycle mode could be to motivate the gaming establishment to bring additional electronic gaming tables 22 online (e.g., made operative in the gaming establishment to handle the surge in anticipated game play activity when the second phase of the cap winning cycle mode is activated). After the computer system 38 has determined that all of the functions (e.g., actions or tasks) of the first phase of the cap winning cycle mode have been exhausted and the single/multi-tier progressive bonus jackpot has not been awarded, the second phase of the cap winning cycle mode could be engaged but not before the computer system 38 proceeds onto Step 532: Has the Conditions for Any Timed Predetermined Winning Criteria Been Met?"

IN STEP 532: HAS THE CONDITIONS FOR ANY TIMED PREDETERMINED WINNING CRITERIA BEEN MET? At this point, the computer system 38 could automatically query itself, "Has the conditions for any timed predetermined winning criteria been met?" If the answer to the query is yes, the computer system 38 could automatically continue on to Step 534: "Initiate the Timer for the Timed Predetermined Winning Criteria" If, however, the answer to the query is no, the computer system 38 could automatically continue on to Step 540: "Initiate the Second Phase of the Cap Winning Cycle Mode."

IN STEP 534, INITIATE THE TIMER FOR THE TIMED PREDETERMINED WINNING CRITERIA, In a timed predetermined winning criteria situation, the initiation predetermined winning wager (made by one or more players) could be any suitable predetermined winning criteria that, upon its occurrence, could cause the computer system 38 to: 1) broadcast various information (e.g., what additional winning criteria [in addition to what has already been acquired] is needed to be obtained by one or more players to win the single/multi-tier progressive bonus jackpot [with or without a cap] and the like) to one or more players and/or one or more potential players through various communication means 180 (e.g., both audible and visual) connected to the computer system 38; 2) open a data pool to collect player or player position identification information for the player(s) who have made initiation and/or a plurality of payout predetermined winning wagers during this regular winning cycle mode; and 3) start a countdown timer (if a countdown timer is applicable) that could run for a predetermined period of time (e.g., a half-hour, an hour, etc.). The computer system 38 could then proceed to Step 536: "Has the Timed Predetermined Winning Criteria Been Met?"

IN STEP 536, HAS THE TIMED PREDETERMINED WINNING CRITERIA BEEN MET? If, after an initiation predetermined winning wager has been achieved, and, if a plurality of predetermined winning wagers is made prior to the timer countdown ending (if a countdown is applicable) (e.g., the predetermined winning criteria has been met), the single/multi-tier progressive bonus jackpot (with or without a cap) could be paid out (e.g., from the single/multi-tier progressive bonus jackpot account) to a player or a plurality of players in the form of an annuity or a reduced lump sum (whichever the player/players choose). The computer system 38 could automatically continue on to Step 542: "The Single/Multi-tier Progressive Bonus Jackpot is Renewed". If the occurrence of the series of predetermined winning criteria wagers (e.g., three sets of snake-eyes winning wagers for craps) does not occur before the countdown timer (if a timer is applicable) finishes its countdown, then the single/multi-tier progressive bonus jackpot (with or without a cap) may not be awarded to any player/players. At this point, the computer system 38 could then proceed to Step 538: If the Timed Predetermined Winning Criteria Has Not Been Met".

IN STEP 538, IF THE TIMED PREDETERMINED WINNING CRITERIA HAS NOT BEEN MET. Once the countdown timer (if a timer is applicable) has completed its countdown without the single/multi-tier progressive bonus jackpot (with or without a cap) being won, then the computer system 38 could cause the countdown timer (if a timer is applicable) to reset (e.g., until an initiation predetermined winning wager occurs, the timer could remain at zero. After the initiation predetermined winning wager, the timer could reset to a predetermined fixed period of time [if a timer is deemed appropriate]); communicate information (e.g., a short announcement or broadcast through visual and/or auditory means) regarding the ending of the regular winning cycle mode; and clear the winning pool (e.g., clear the data [e.g., player IDs and player position data] [this data could be archived] of those player(s) that have been entered into a pool of those individuals who have placed and won one or more predetermined winning criteria wagers). The computer system 38 could then proceed to Step 540: "Initiate the Second Phase of the Cap Winning Cycle Mode".

In step 540, Initiate the Second Phase of the Cap Winning Cycle Mode. As the first phase cap countdown draws down to its end, thereby signaling the end of the first phase of the cap winning cycle mode and the beginning of the second phase, the gaming establishment could temporarily suspend gaming activity (both playing and wagering activities) on the computer system 38 in order to allow a recitation of a "countdown" (e.g., "TEN!, NINE!, EIGHT!, etc) by the players and potential players in proximity to the electronic gaming tables 22 in order to generally add more anticipatory excitement (e.g., a party like atmosphere) to the gaming environment. This countdown could also be simultaneously visually displayed and/or audibly announced in the gaming establishment so that the precise moment of switching from the first phase of the cap winning cycle mode to the second phase could be recorded in the computer system 38 with a system-endorsed, computerized date/time stamp. If the single/multi-tier progressive bonus jackpot is not won prior to the suspension of the gaming activity and after completion of the "countdown," the cap winning cycle mode could then proceed to the second phase of the cap winning cycle mode. After the cap winning cycle mode has entered into the second phase, it may remain in this mode until the single/multi-tier progressive bonus jackpot has been awarded. Throughout this cycle, it is possible, by those with ordinary skill in the art, to broadcast communication through a wide variety of means(s) (e.g., visually, audibly, and via other medias) to players and potential players regarding any updates about the predetermined winning criteria (e.g., when this predetermined winning criteria may change and any other details associated with it). During this phase, if the single/multi-tier progressive bonus jackpot is not awarded in a reasonable amount of time, the operator could have the option of making the single/multi-tier progressive bonus jackpot progressively easier to win through either a timed or a non-timed predetermined winning cycle. The increasingly easier method to win the single/multi-tier progressive bonus jackpot could be set so that the odds of winning could increasingly favor the players over time (e.g., in increments of hours, days, weeks, months, a year, and the like). This criteria could be accomplished by a variety of means such as progressively reducing, over a period or periods of time, the number and/or types of predetermined winning criteria needed to win the single/multi-tier progressive bonus jackpot (e.g., going from needing ten types of predetermined winning criteria to four types of predetermined winning criteria and the like), thus changing the odds needed to win from a low probability (e.g., a low chance of winning/highest odds against the player) to a medium probability (e.g., a medium chance of winning/50/50 odds) to a high change of probability (e.g., a high chance of a player or players winning the single/multi-tier progressive bonus jackpot) and the like; or other means and various combinations of such means. Another illustration of how the odds of winning could increasingly favor the players over time could be the transitioning of the timed predetermined winning cycle (in accordance with regulatory and jurisdictional laws and regulations) to a non-timed predetermined winning cycle so that, in one round of game play, a player could easily win the single/multi-tier progressive bonus jackpot. Once a player, or a plurality of players, has obtained the predetermined winning criteria needed to be awarded the single/multi-tier progressive bonus jackpot, the win has been verified (by the operator, the system, and any other gaming or legal personnel deemed necessary), and the player's/players' identity/identities have been confirmed (by the operator, the system, and any other gaming or legal personnel deemed necessary), the single/multi-tier progressive bonus jackpot could be paid out (e.g., from the single/multi-tier progressive bonus jackpot account to the accounts of the winning player's/winning players' through the one or more player's/players' electronic interfaces) to a player or a plurality of players in the form of an annuity or a reduced lump sum (whichever the player/players choose). At this point, the computer system 38 could automatically proceed to Step 542: The Single/Multi-tier Progressive Bonus Jackpot is Renewed".

In step 542, The Single/Multi-tier Progressive Bonus Jackpot is Renewed. If the predetermined winning criteria has been achieved (e.g., the single/multi-tier progressive bonus jackpot has been "hit" or "won") during the timed predetermined winning cycle (during the first or second phase of the cap winning cycle mode), the computer system 38 could cause the countdown timer (if a timer is applicable) to reset (e.g., until an initiation predetermined winning wager occurs, the timer could remain at zero. After the initiation predetermined winning wager, the timer could reset to a predetermined fixed period of time [if a timer is deemed appropriate]). The computer system 38 could then broadcast information about the single/multi-tier progressive bonus jackpot payout (e.g., once a player, or a plurality of players, has obtained the predetermined winning criteria needed to be awarded the single/multi-tier progressive bonus jackpot, the win has been verified [by the operator, the system, and any other gaming or legal personnel deemed necessary], and the player's/players' identity/identities have been confirmed [by the operator, the system, and any other gaming or legal personnel deemed necessary], the single/multi-tier progressive bonus jackpot could be paid out [e.g., from the single/multi-tier progressive bonus jackpot account to the accounts of the winning player's/winning players' through the one or more player's/players' electronic interfaces] to a player or a plurality of players in the form of an annuity or a reduced lump sum [whichever the player/players choose]), then shut down the broadcast means; clear the winning pool (e.g., clear the winning player (s) ID(s) and the player(s) position data [this data can be archived]); reseed the single/multi-tier progressive bonus jackpot (e.g., 7 million); begin again to collect a small percentage of each wager, which could be earmarked (or any other similar monetary pooling methods which could be implemented) for the single/multi-tier progressive bonus jackpot (with or without a cap), and clear the winning pool (e.g., deleting the winning player(s) ID(s) and the player(s) position data [this data can be archived]). The computer system 38 could then reset itself to await the occurrence of the next initiation predetermined winning wager. The second phase of the cap winning cycle mode could then be terminated and reset back to the regular winning cycle mode. Although the description above contains many specifications, these should not be construed as limiting to the scope of the invention but as merely providing illustrations of some of the presently preferred embodiments of this invention. Thus, the scope of the invention 10 and these embodiments could be determined by their legal equivalents rather than by the examples. The computer system 38 could then proceed to Step 512: "The Two Phases of the Cap Winning Cycle Mode".

CONCLUSION

Although the description above contains many specifications, these could not be construed as limiting the scope of the invention but as merely providing illustrations of some of the presently preferred embodiments of this invention. Thus, the scope of the invention could be determined by the appended claims and their legal equivalents rather than by the examples given.

What is claimed:

1. An electronic table game system comprising of:

(A) one or more electronic gaming tables, each gaming table having a playing surface 24 that supports one or more game elements of a table game;

(B) one or more dealer's electronic interfaces, the dealer's electronic interface being proximate to the playing surface and allowing one or more dealers to input data, the data containing information on one or more actions of game play for a table game being played upon the playing surface;

(C) one or more player's electronic interfaces, the player's electronic interface being proximate to the playing surface and allowing one more players to input data, the data containing information on one or more wagers on the table game being played upon the playing surface; and (D) a computer system connected to the dealer's electronic interface and the player's electronic interface to process the inputted data to indentify a winner of the table game;

wherein the computer system processes the inputted data to additionally run a progressive jackpot, a portion of every wager placed with the table game is added to the progressive bonus jackpot.

2. The electronic table game system of claim 1 further comprising a game element reader located proximate to the dealer's electronic interface, the game element reader connects to the computer system to transmit data to the computer system, the data transmitted containing information regarding the value of the game element or the position of the game element upon the table game's playing surface.

3. The electronic table game system of claim 2 wherein data transmitted further contains time stamp information for the one or more game elements.

4. The electronic table game system of claim 1 further comprising a player's monetary device that is proximate to the player's electronic interface, the player's monetary device connects to the computer system to transmit data, the data containing player identification information that identifies a player with one player's position from a plurality of player's positions proximate to the playing surface.

5. The electronic table game system of claim 1 wherein the data inputted by the dealer further contains one or more information from a set of information consisting of: the value of the game element; the position of the game element upon the table game's playing surface; the identity of the player who receives a game element dealt by the dealer; the identity of the dealer assigned to the dealer's electronic interface; the dealer's actions with one or more game elements; the point number on a craps table game; that dealer holds a blackjack hand.

6. The electronic table game system of claim 1 wherein the data inputted through the dealer's electronic interface furthers contains a command to the computer system from a set of commands to the computer system consisting of: to block further wagers from being placed on the table game through the one or more player's electronic interfaces; to allow wagers to be placed through the one or more player's electronic interfaces.

7. The electronic table game system of claim 1 wherein the playing surface is a touch screen that connects to the computer system and forms one or more electronic devices from a set of electronic devices consisting of: the dealer's electronic interface, the player's electronic interface, a player's monetary device connecting to the computer system, a game element reader connecting to the computer system, one or more wireless gaming devices 130 wirelessly connecting to the computer system.

8. The electronic table game system of claim 7 wherein the computer system can be programmed to change the playing surface from providing the configuration for one table game to the configuration of another table game.

9. The electronic table game system of claim 1 wherein the computer system in processing the inputted data creates one or more databases from a group of databases consisting of: historical game play, the overall performance of the various types of gaming tables; headcount data, wagering data, individual player's wagering habits data, individual player preferences data, individual player dislikes.

10. A method of operating an electronic table game system comprising of the steps, but not necessarily limited to the order shown:

(A) providing one or more electronic gaming tables, each gaming table having a playing surface for supporting game elements for the play of a table game with one or more player's electronic interfaces and one or more dealer's electronic interfaces, the interfaces being proximate to the playing surface, the electronic interfaces being further connected to a computer system;

(B) transmitting through the dealer's electronic interface by a human dealer to the computer system data concerning one or more actions of game play for the table game;

(C) transmitting through the player's electronic interface to the computer system data concerning one or more wagers placed by the player in the table game;

(D) processing the inputted data to indentify any winning player for the table game; and (E) processing the inputted data to run a progressive bonus jackpot wherein a portion of every wager placed at the table game is placed within the progressive bonus jackpot.

11. A method of operating an electronic table game system comprising of the steps, but not necessarily limited to the order shown:

(A) providing one or more electronic gaming tables, each gaming table having a playing surface for supporting game elements for the play of a table game with one or more player's electronic interfaces and one or more dealer's electronic interfaces, the interfaces being proximate to the playing surface, the electronic interfaces being further connected to a computer system;

(B) transmitting through the dealer's electronic interface by a human dealer to the computer system data concerning one or more actions of game play for the table game;

(C) transmitting through the player's electronic interface to the computer system data concerning one or more wagers placed by the player in the table game;

(D) funding a single/multi-tier progressive bonus jackpot payout account from wagering activities at the table game;

(E) processing the inputted data to indentify any winning player for the table game;

(F) processing the inputted data to further indentify any winning player for the table game as being a winner of the single/multi-tier progressive bonus jackpot; and (G) stop funding the single/multi-tier progressive bonus jackpot payout account when it has reached a predetermined monetary amount and instead fund a surplus account from wagers placed in the table game, the funds from the surplus account not being given to the one or more winners of the single/multi-tier progressive bonus jackpot.

12. A method of claim 11 wherein the funding is accomplished by deducting automatically a portion of wager placed by a player in the table game.

13. A method of claim 11, wherein the funding is accomplished by deducting automatically a portion of the gaming establishment's winnings from the table game.

14. The method of claim 11 further comprising of a step of initiating a winning time period by the winning player for a table game that places an initial predetermined winning wager.

15. The method of claim 11 wherein identifying the winner of the single/multi-tier progressive bonus jackpot as being that winning player who places a predetermined winning wager prior to the expiration of the winning time period.

16. A method of claim 11 wherein the identifying of the winner of the single/multi-tier progressive bonus jackpot as being that winning player obtaining a specific number of predetermined winning game element combinations in a row.

17. A method of operating an electronic table game system comprising of the steps, but not necessarily limited to the order shown:

(A) providing one or more electronic gaming tables, each electronic gaming table having a playing surface for supporting game elements for the play of a table game with one or more player's electronic interfaces and one or more dealer's electronic interfaces, the interfaces being proximate to the playing surface, the electronic interfaces being further connected to a computer system;

(B) transmitting through the dealer's interface to the computer system data concerning one or more actions of game play for the table game;

(C) transmitting through the player's electronic interface to the computer system data concerning one or more wagers placed by the player in the table game;

(D) funding a single/multi-tier progressive bonus jackpot payout account from wagering activities conducted at the table game;

(E) processing the inputted data to indentify any winning player for the table game;

(F) processing the inputted data to indentify any winning player for the table game as being a winner of the single/multi-tier progressive bonus jackpot; and (G) changing the predetermined winning criteria for single/multi-tier progressive bonus jackpot to increase the odds of winning the single/multi-tier progressive bonus jackpot.

18. The method of claim 17 further comprising of a step of seeding a subsequent single/multi-tier progressive bonus jackpot with funds collected in the surplus account.

19. The method of claim 17 further comprising of a step of funding a complementary program for the gaming establishment using funds collected in the surplus account.

20. The method of claim 17 further comprises a step of starting a countdown timer, which controls when the public is informed that the predetermined winning criteria for single/multi-tier progressive bonus jackpot will be changed to increase the odds of winning the single/multi-tier progressive bonus jackpot.

21. The method of claim 20 further comprises a step of continuing to alter the predetermined winning criteria to increase the chances of winning the single/multi-tier progressive bonus jackpot after the countdown timer has expired.

22. A method of operating an electronic game system comprising of the steps, but not necessarily limited to the order shown:

(A) providing two or more electronic gaming machines, with each gaming machine having one or more player's electronic interfaces, the electronic interfaces being further connected to a computer system that creates the game play for the gaming being conducted on the machine, the game play occurring without the interaction of a human dealer;

(B) transmitting through the player's electronic interface to the computer system data concerning one or more wagers placed by a player at the electronic gaming machine;

(C) funding a single/multi-tier progressive bonus jackpot payout account until the amount of a single/multi-tier progressive bonus jackpot payout account reaches a cap;

(D) funding a surplus account after the single/multi-tier progressive bonus jackpot account reaches the cap;

(E) indentifying any winning player for the table game; and (F) indentifying any winning player for the table game as being a winner of the single/multi-tier progressive bonus jackpot.

23. The method of claim 22 further including a step of starting a countdown timer after the cap is reached, wherein if the single/multi-tier progressive bonus jackpot is not won prior to the rundown of the countdown timer, the predetermined winning criteria for winning of the single/multi-tier progressive bonus jackpot will be changed to increase the odds of winning the single/multi-tier progressive bonus jackpot.

24. The method of claim 22 further including a step of changing the predetermined winning criteria after the rundown of the countdown timer without the winning of the single/multi-tier progressive bonus jackpot to increase the odds of winning the single/multi-tier progressive bonus jackpot until the jackpot is won.

25. The method of claim 22 further including a step of continuing to changing the predetermined winning criteria to further increase the odds of winning of the single/multi-tier progressive bonus jackpot until the jackpot is won.

26. The method of claim 22 further including a step of communicating to public after the cap is reached, information from a set of information consisting of: the amount of the cap, that the predetermined winning criteria will be changed to increase the odds of winning the single/multi-tier progressive bonus jackpot, and that the predetermined winning criteria will continue to be so changed until the single/multi-tier progressive bonus jackpot is won.

27. The method of claim 22 further including a step of seeding a subsequent single/multi-tier progressive bonus jackpot with funds accumulated in the surplus account.

* * * * *